March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 1

INVENTOR.
RUDOLPH F. STEHLIK

BY

Chas. W. Candy

ATTORNEY

March 21, 1950

R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947

21 Sheets-Sheet 2

INVENTOR.
RUDOLPH F. STEHLIK

BY
*Chas. W. Candy*

ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 3

INVENTOR.
RUDOLPH F. STEHLIK

BY Chas. L. Cassidy [signature]

ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 4

INVENTOR.
RUDOLPH F. STEHLIK

BY Chas. W. Candy

ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 5

INVENTOR.
RUDOLPH F. STEHLIK

BY Chas. L. Candy

ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 6

INVENTOR.
RUDOLPH F. STEHLIK

BY [signature]

ATTORNEY

INVENTOR.
RUDOLPH F. STEHLIK
BY Chas. [signature] Candy
ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 8

INVENTOR.
RUDOLPH F. STEHLIK

BY

ATTORNEY

INVENTOR.
RUDOLPH F. STEHLIK
BY
Chas. W. Candy
ATTORNEY

INVENTOR.
RUDOLPH F. STEHLIK

BY Chas. W. Candy

ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 11

*INVENTOR.*
RUDOLPH F. STEHLIK

*BY* [signature]

ATTORNEY

INVENTOR.
RUDOLPH F. STEHLIK
BY
ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 13

INVENTOR.
RUDOLPH F. STEHLIK

BY Chas. Tu. Candy.

ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 14

INVENTOR.
RUDOLPH F. STEHLIK

BY Chas. K. Candy

ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 15

INVENTOR.
RUDOLPH F. STEHLIK

BY

ATTORNEY

INVENTOR.
RUDOLPH F. STEHLIK
BY Chas. Le. Canly
ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 17

INVENTOR.
RUDOLPH F. STEHLIK

BY Chas. W. Candy

ATTORNEY

*INVENTOR.*
RUDOLPH F. STEHLIK

BY *Chas. W. Candy*
ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 19

INVENTOR.
RUDOLPH F. STEHLIK

BY

Chas. W. Candy

ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 20

*INVENTOR.*
RUDOLPH F. STEHLIK

*BY* [signature]

ATTORNEY

March 21, 1950 R. F. STEHLIK 2,501,546

AUTOMATIC PRIVATE BRANCH EXCHANGE TELEPHONE SYSTEM HAVING TRANSFER AND NIGHT SERVICE

Filed Sept. 12, 1947 21 Sheets-Sheet 21

INVENTOR.
RUDOLPH F. STEHLIK

BY

ATTORNEY

Patented Mar. 21, 1950

2,501,546

UNITED STATES PATENT OFFICE 2,501,546

AUTOMATIC PRIVATE BRANCH EXCHANGE TELEPHONE SYSTEM HAVING TRANSFER AND NIGHT SERVICE

Rudolph Frank Stehlik, Antwerp, Belgium, assignor to Automatic Electric Laboratories, Inc., Chicago, Ill., a corporation of Delaware Application September 12, 1947, Serial No. 773,610

40 Claims. (Cl. 179—26)

Figure 1:
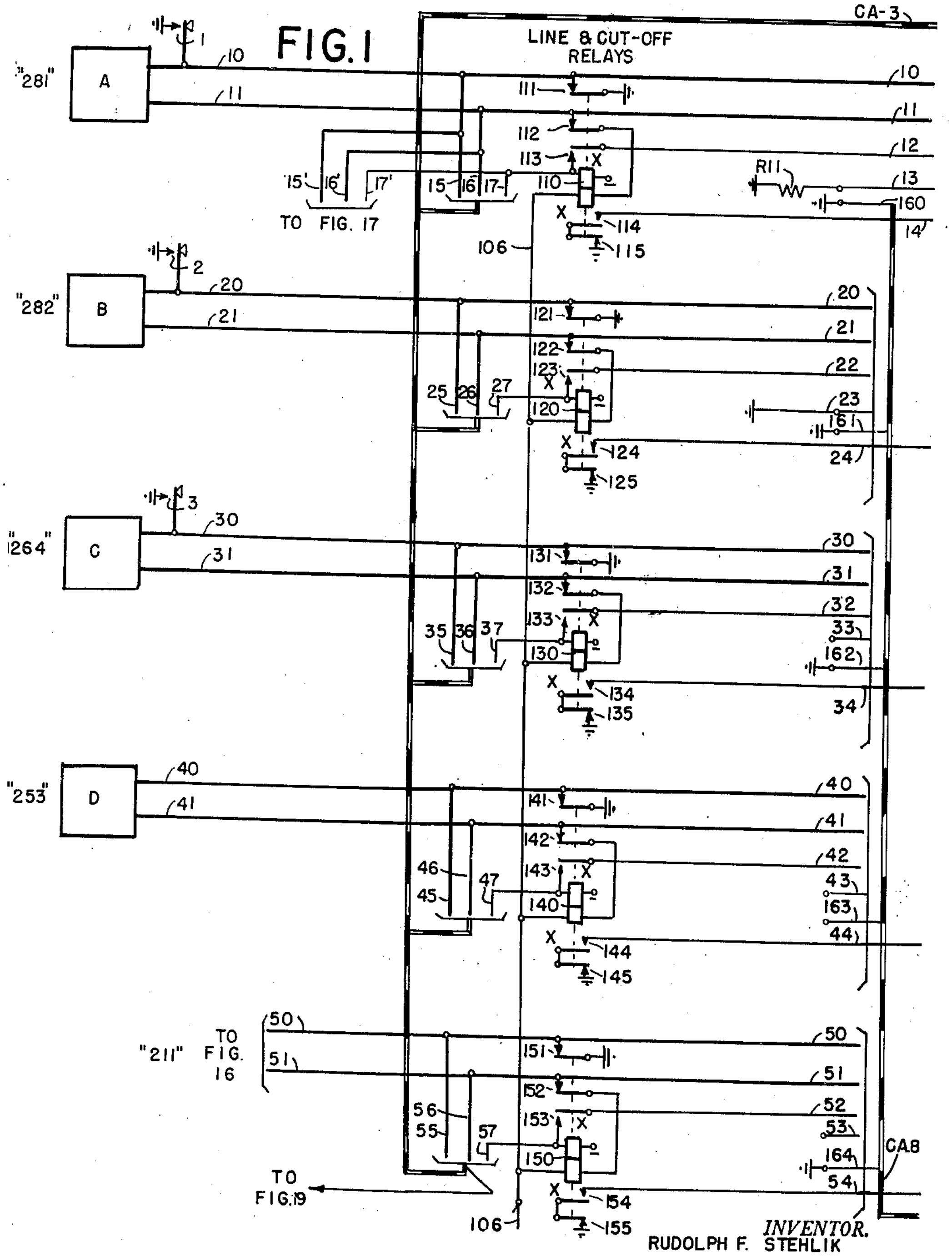

This invention relates to automatic telephone systems, and particularly to a private branch exchange system of this type, with facilities for transferring trunk calls from one branch office station to another, along the general lines of U. S. Patent No. 2,056,752 issued to John H. Voss on October 6, 1936.

The aforementioned Voss patent related to a small automatic system of this class, using rotary switch type finder-connector links for making the local connections, and a small number of special trunks equipped also with individual rotary type finders for setting up trunk calls to and from the main exchange. Incoming calls operated a signal at a special attendant's station, or one or more general signals, depending on the position of a control key at the special station. With the attendant away, any one of several privileged stations, provided with push-button telephones, could answer such a call by removing their receiver to seize a local link and then dialling the digit "8" to set the local connector to the trunk answering position. This caused a common trunk distributor to find the calling trunk, whereupon the trunk's finder switch proceeded to find the answering station. The local link then released, and the trunk distributor moved on to an idle trunk. To transfer the call to another station, the answering station pressed the special button on their telephone. This locked up the trunk, and again seized the local switch train, through the inward end of the trunk. The answering station then dialled the number of the wanted party, who then picked up the call by also operating the special button on his telephone. This caused a common transfer distributor to find this trunk, whereupon the trunk finder proceeded to find the second station, and the local link again released. The first party then hung up. Outgoing calls were made by dialling a "9" into the local switch train. This caused the trunk distributor to start a preselected trunk finder, which then found the calling station and released the local link as before. The attendant's station was little more than a somewhat special regular station, provided with half a dozen miscellaneous keys and a lamp, which transferred calls in the same general manner as the other privileged stations.

The main object of the present invention is to provide similar call transferring facilities in a larger system of this general class, utilizing the well known Strowger type two motion switch for completing the connections, and comprising both a local and an incoming switch train.

Another object of the invention is the incorporation into this system of a regular attendant's position, which normally receives all incoming calls, and extends them to the wanted local station through the incoming switch train.

Another object of the invention is the provision of means for marking various classes of privileged stations to both the local and incoming switch trains, for setting up restrictions as to the making and receiving of trunk calls.

Another object of the invention is the incorporation into this system, of a number of night service arrangements, any or all of which may be applied to the same switchboard, and controlled by a single key at the attendant's position.

A further object of the invention is the provision of a single type of very versatile trunk circuit for this system, which handles all of the regular and special services and features provided, without conflict.

Still another object of the invention is to make the extension and transferring of trunk calls as simple as possible, with a minimum of dialling, and without overlapping or possible interference with outgoing calls, and with no special equipment required at the privileged stations beyond a simple push button for grounding the line as required.

One feature of the invention is accordingly the provision of means whereby all extensions and transfers of trunk calls are made entirely through the incoming switch train, without involving the local switch train in any way, except with one particular form of night service, where certain privileged stations may answer incoming calls on certain trunks by dialling an "0" over the local switch train, and for a first transfer of an outgoing call.

Another feature of the invention is the inclusion of two incoming link finders in each trunk, which can be used alternately to transfer a call an indefinite number of times.

Another feature of the invention is the inclusion of novel automatic means for completing the connection on an incoming call handled through the attendant's position, whether or not the operator stays on the trunk until the called station answers.

Another feature is the ease with which the regular operator can come back in on a trunk connection, although in this case a special warning tone is always placed on the connection. This tone is removed when the operator again disconnects.

A further feature is the provision of a special signal to the operator in case of an attempted extension of a trunk call to a station not privileged to receive trunk calls.

Another feature is the provision of means whereby a station engaged in a trunk call can recall the operator at the attendant's position at any time, by operating their grounding button for a longer time than normally required for transferring or picking up a trunk call.

Still another feature is the use of vertical banks and wipers in the local selectors for extending privileged station markings, in the setting up of outgoing trunk calls.

Still another feature is the use of vertical banks and wipers in the local finders to extend other markings on local calls, whereby certain privileged stations can cut in on a busy line. Here again however a warning tone is placed on the connection, as notice of the intrusion.

Other objects and features of the invention will be apparent from the description and claims which follow, when considered in conjunction with the appended drawings, comprising the Figures 1 to 22 inclusive. These drawings, when arranged as indicated in Figure 22, show by means of the usual circuit diagrams, sufficient of the equipment involved to permit the invention to be described and understood.

Figure 2:
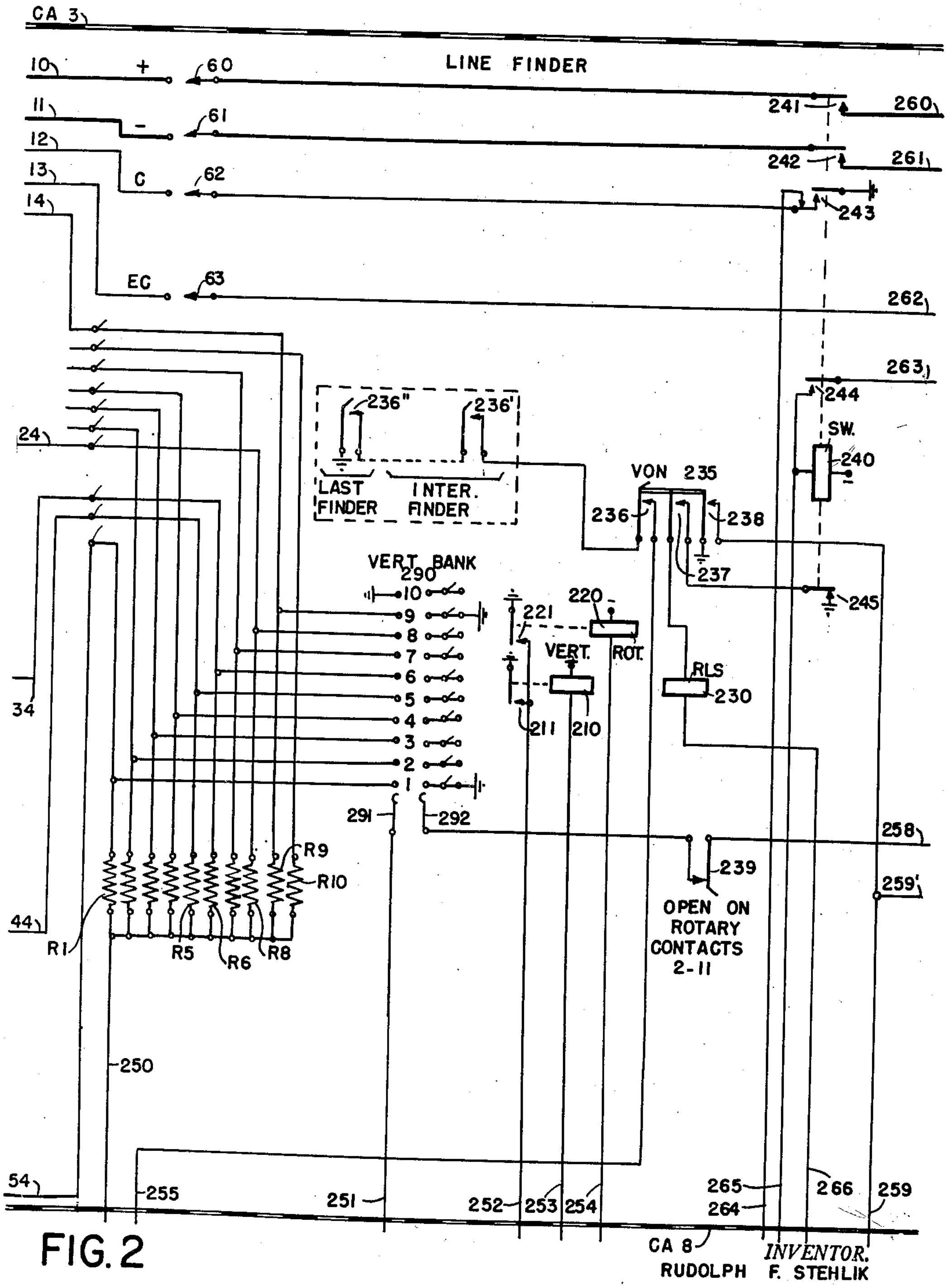
Figure 3:
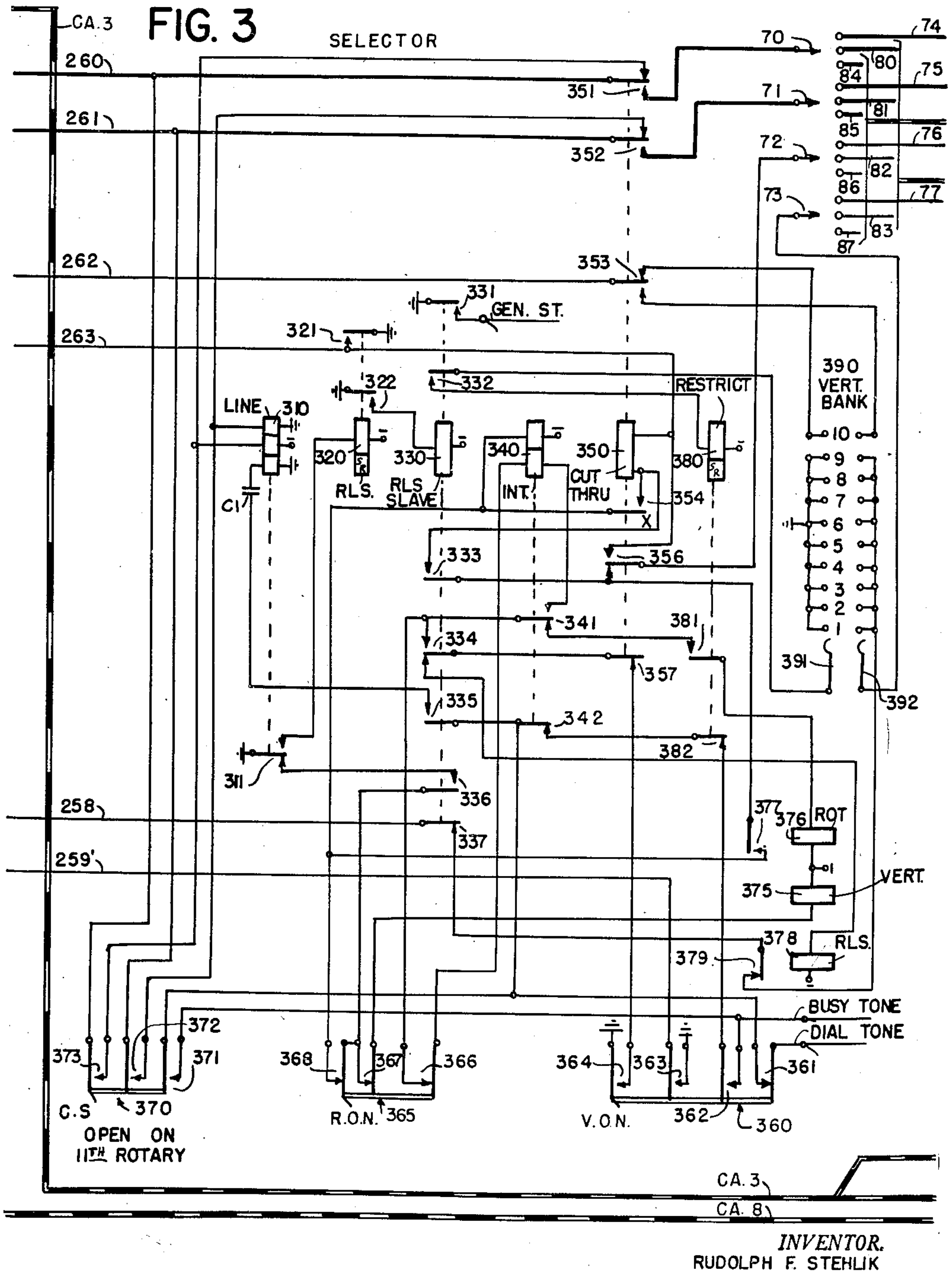

With reference to the general plan or layout of the drawings, Figure 1 shows a number of subscribers' stations, and their associated line circuits, which are connected to the incoming terminals of a finder-selector link of the well known Strowger type, comprising a linefinder per Figure 2, and an associated local selector per Figure 3, for initiating local and outgoing calls.

Figure 4:
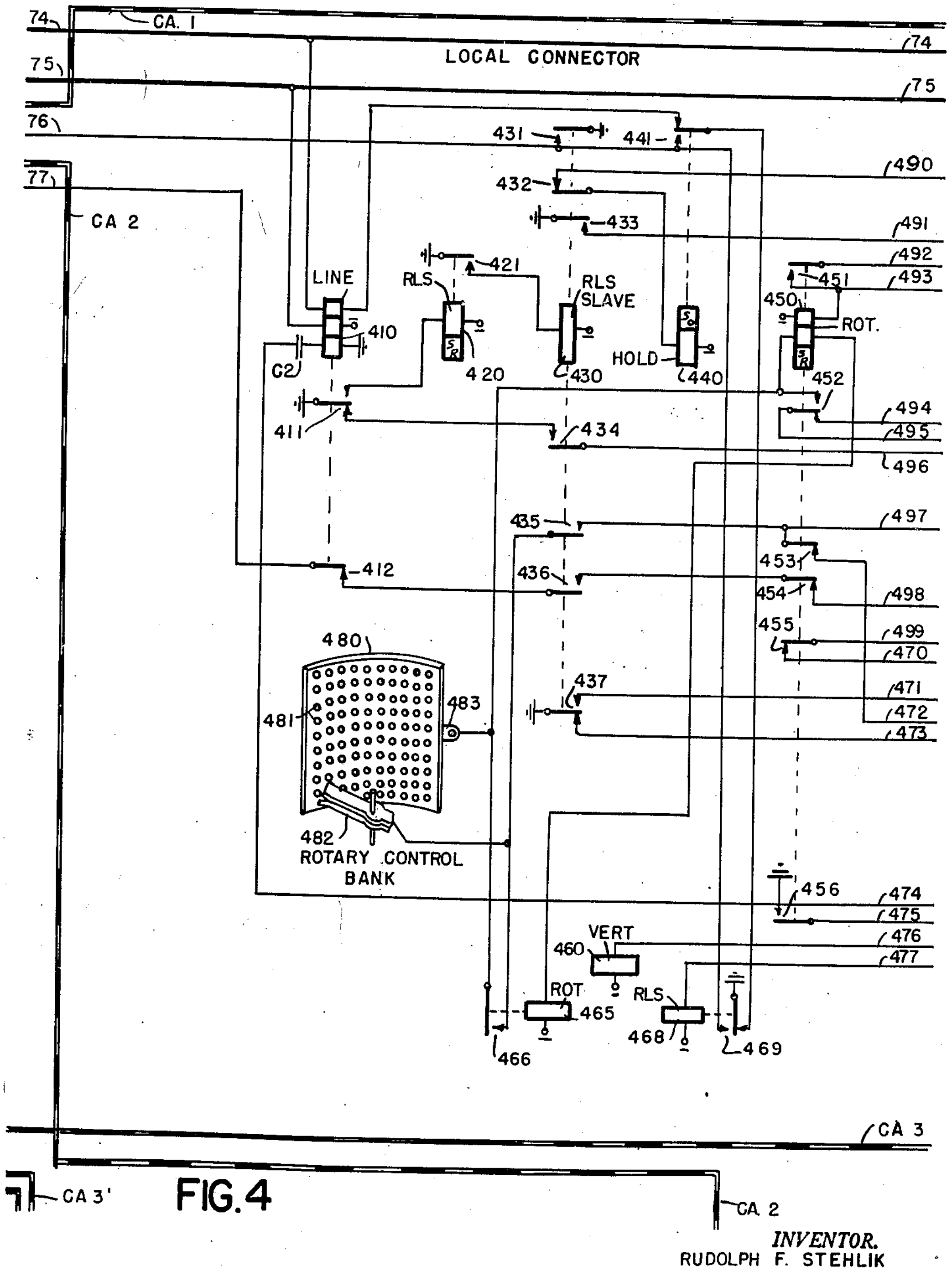
Figure 5:
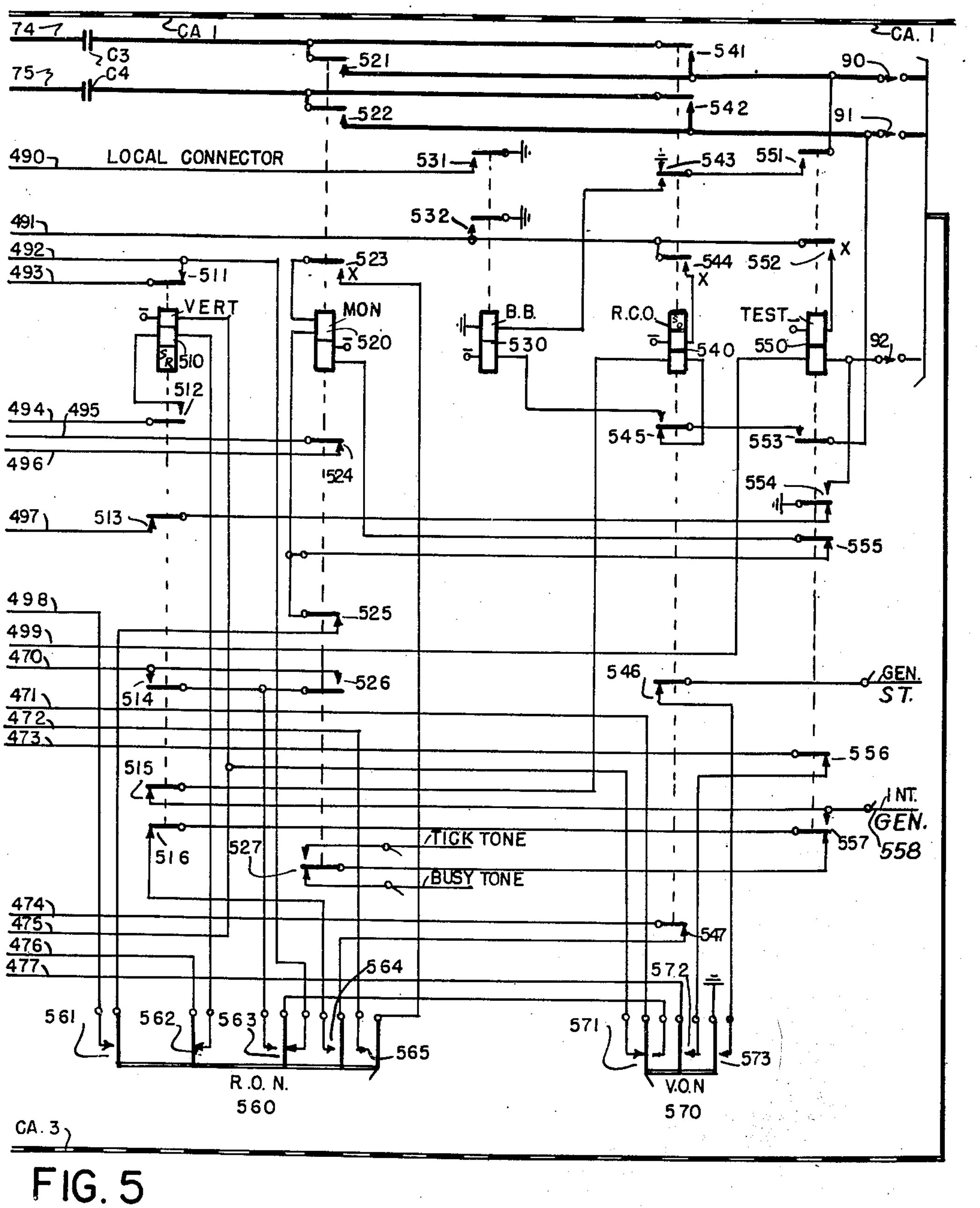

Figures 4 and 5 comprise one of the local connectors accessible to the selector switch of Figure 3, and to other similar selectors, not shown, for completing local calls.

Figure 6:
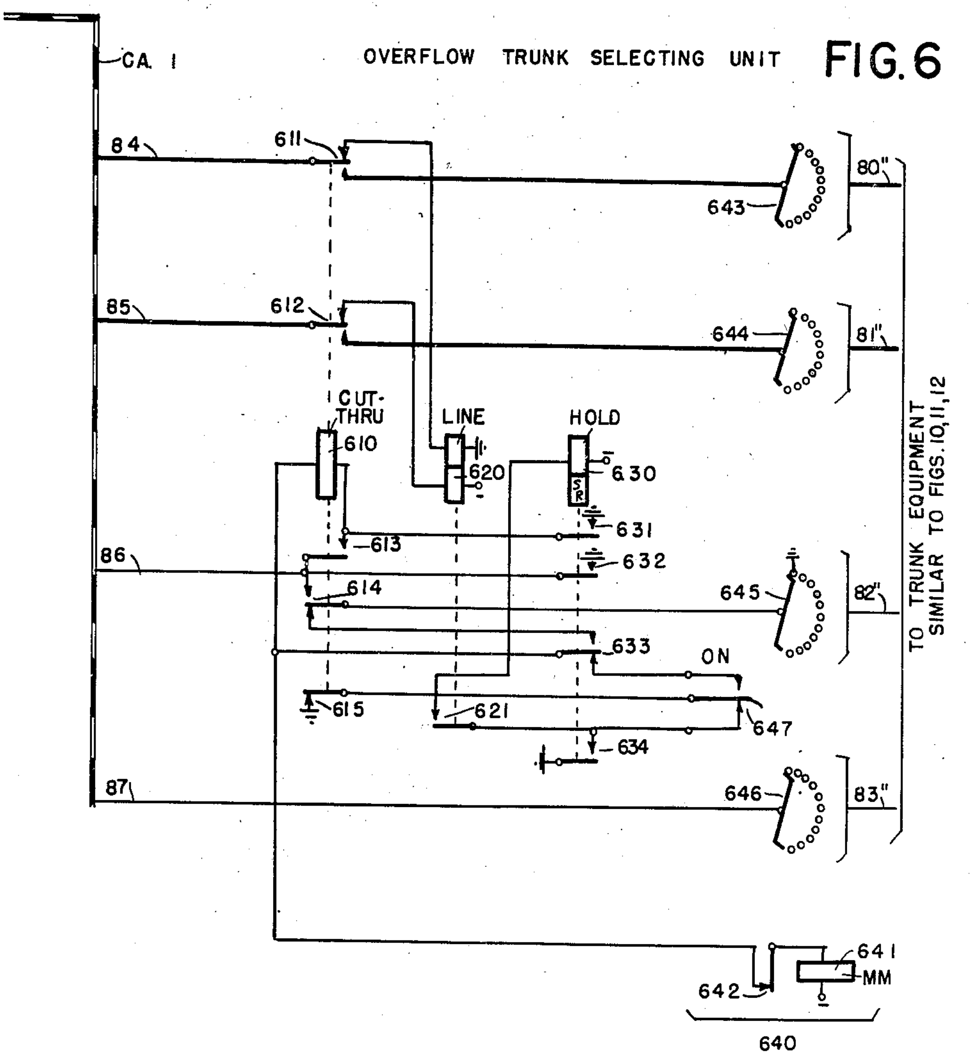
Figures 7, 22:
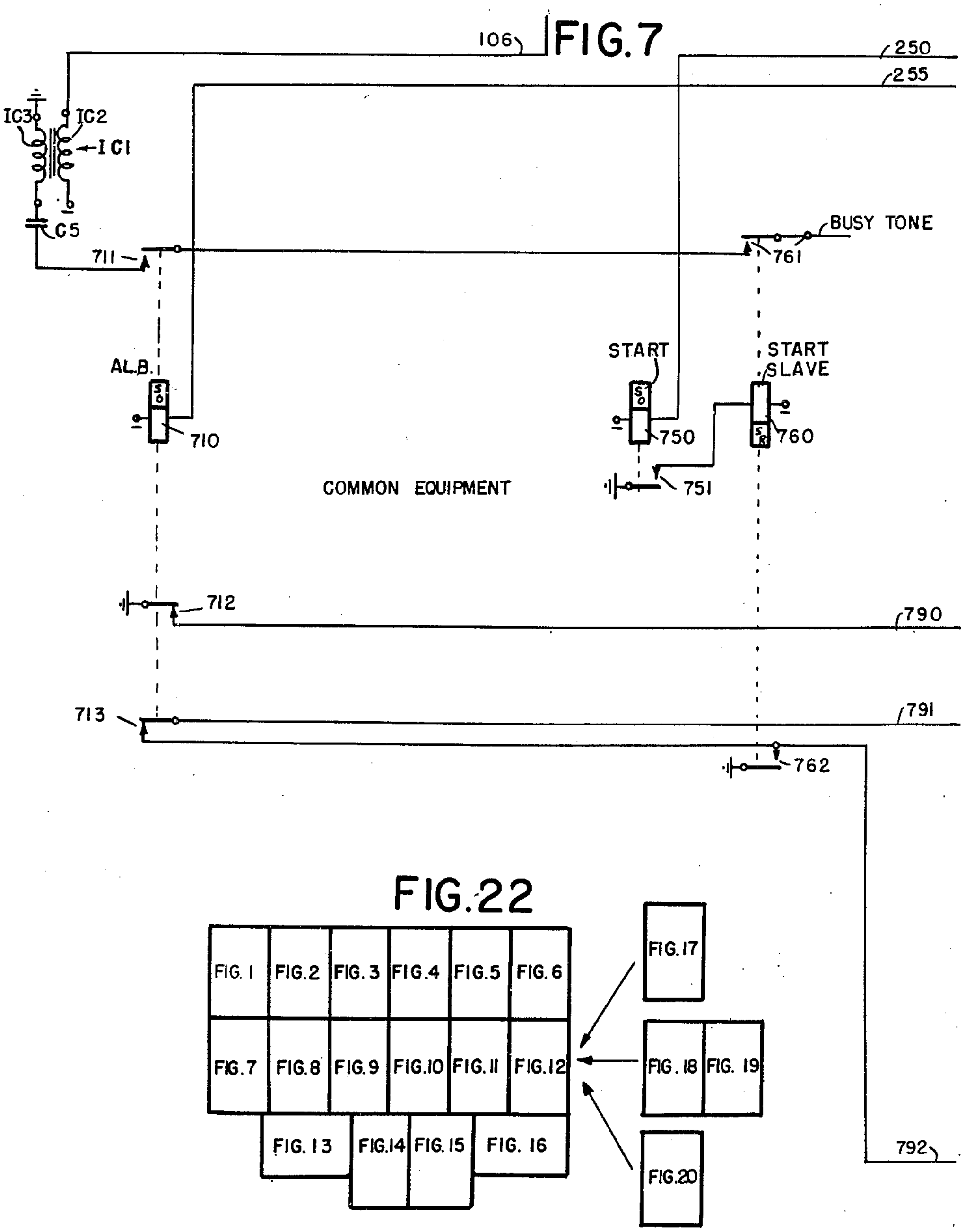

In Figure 6 is shown a trunk selecting unit controlled from the local selectors for providing access to an overflow group of outgoing trunks.

Figure 8:
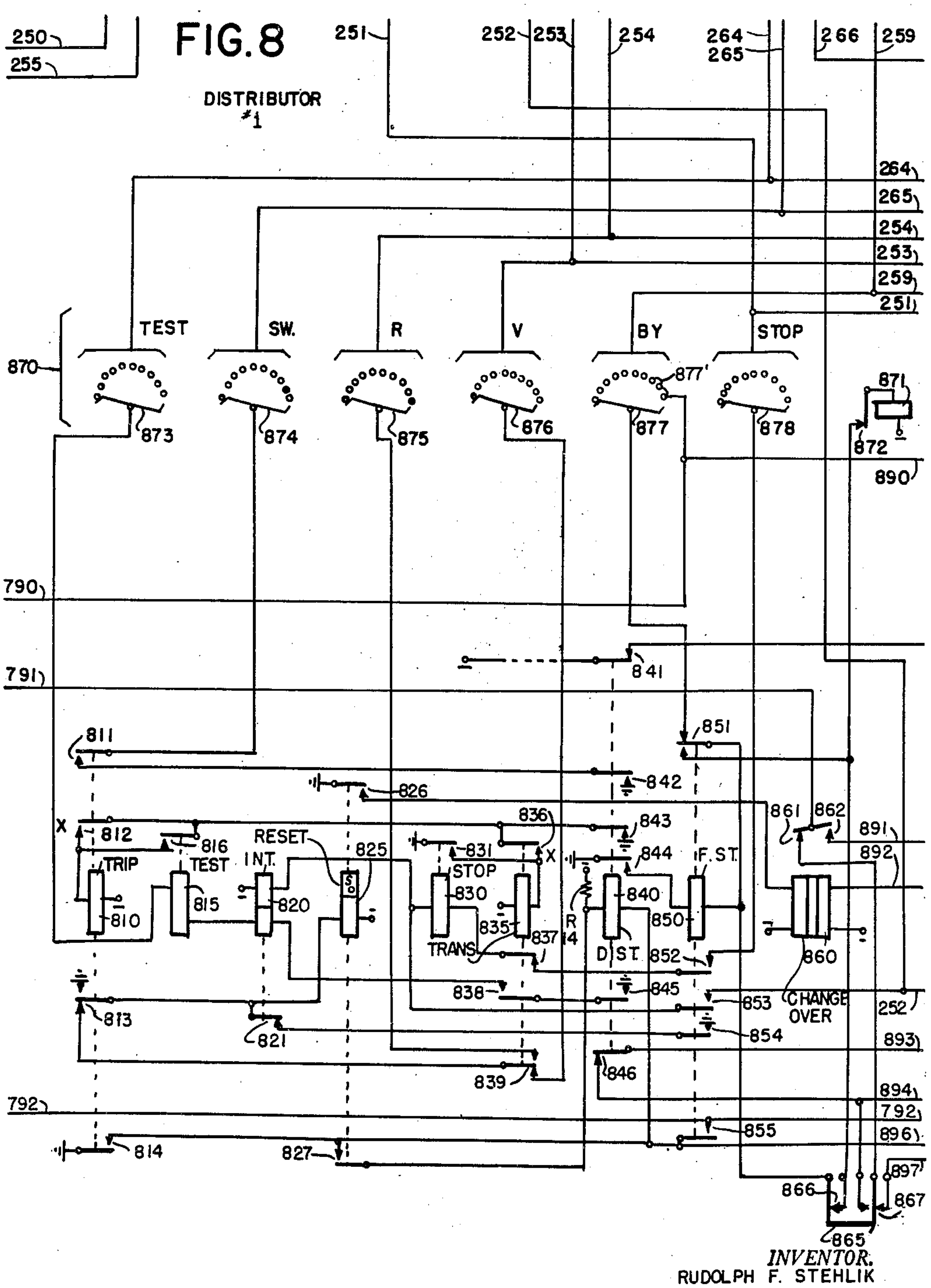
Figure 9:
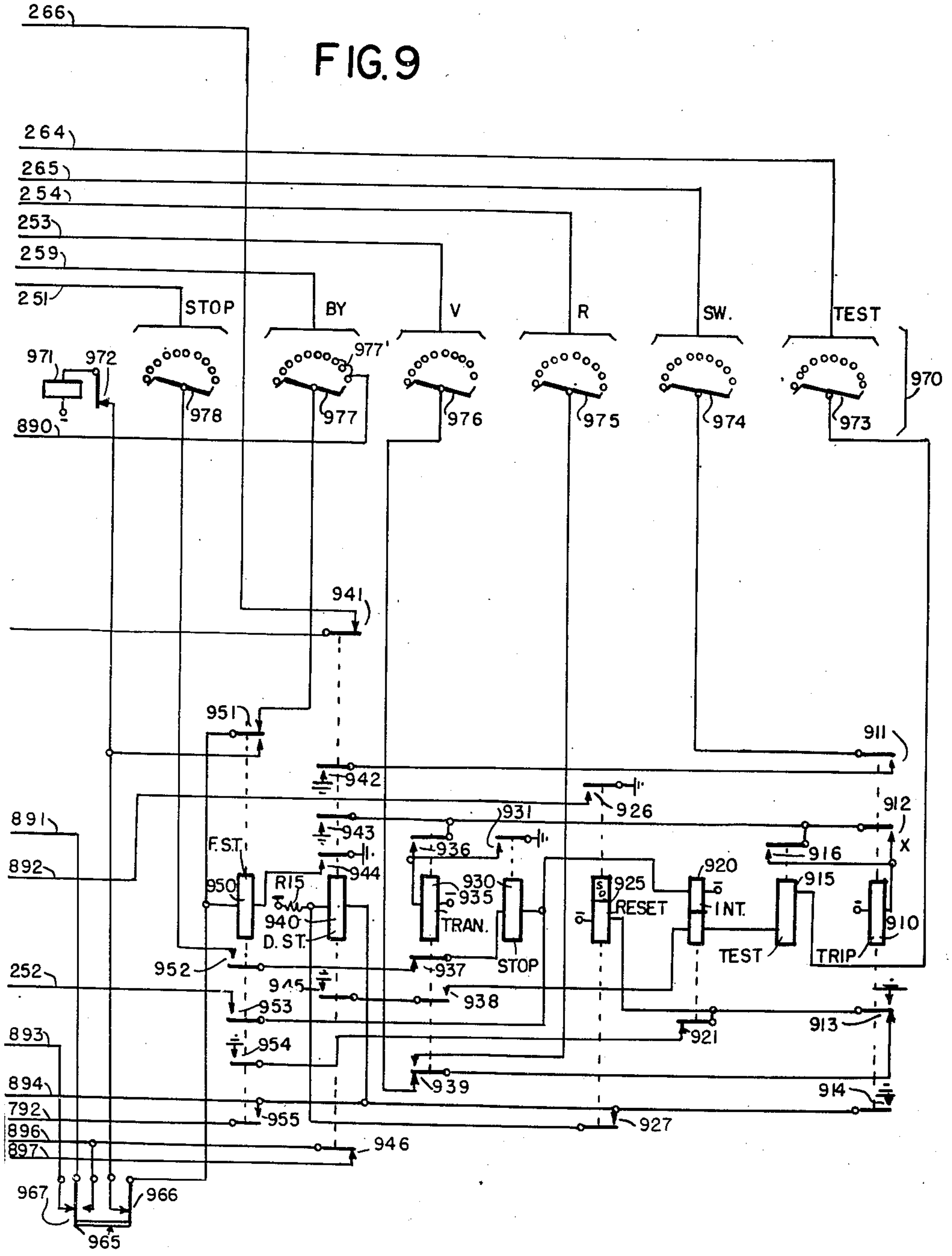

In Figures 7, 8 and 9 are shown two link distributors, which respond as required to the initiation of calls of local origin, to select an idle linefinder, such as that of Figure 2.

Figure 10:
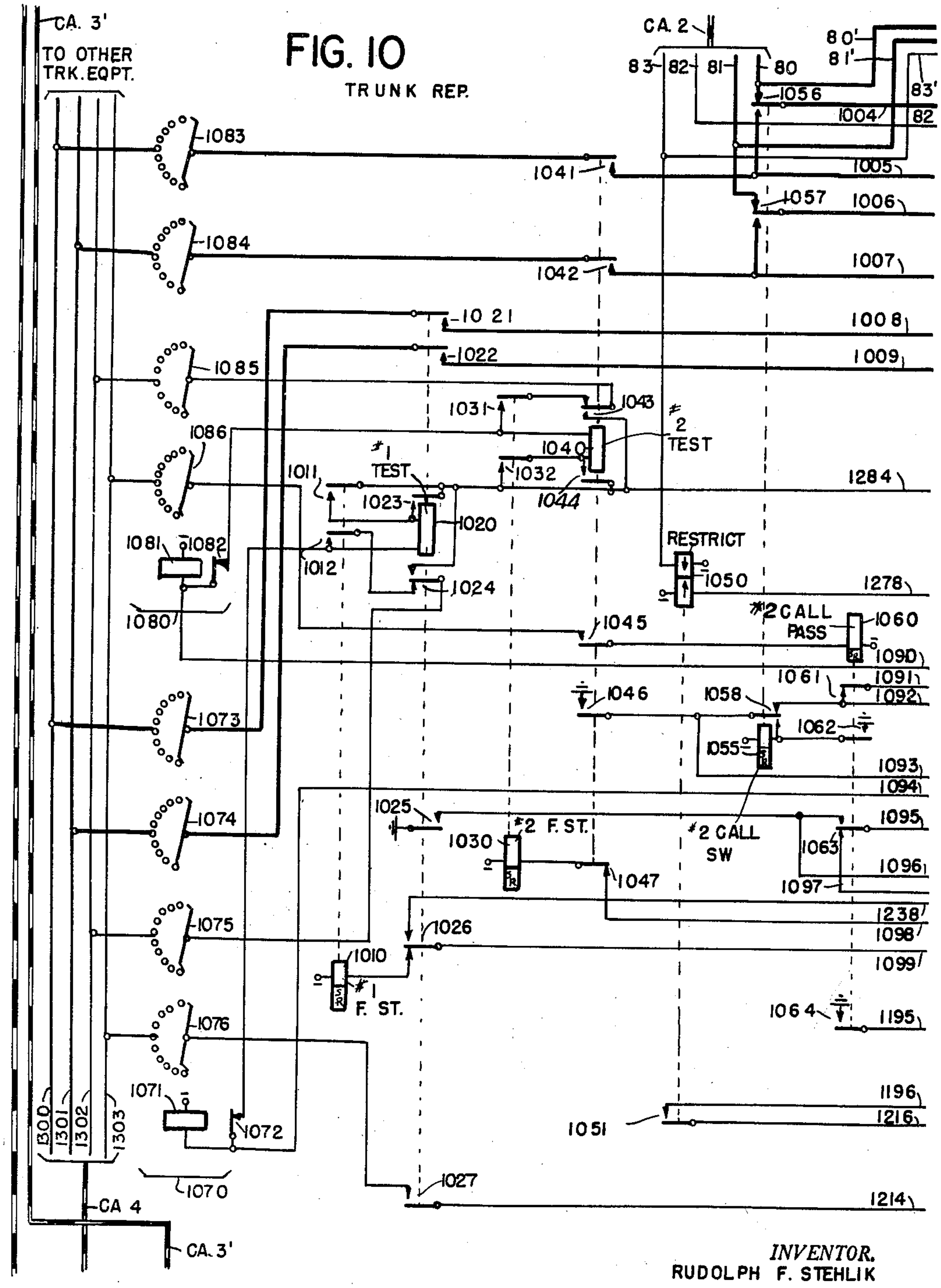
Figure 11:
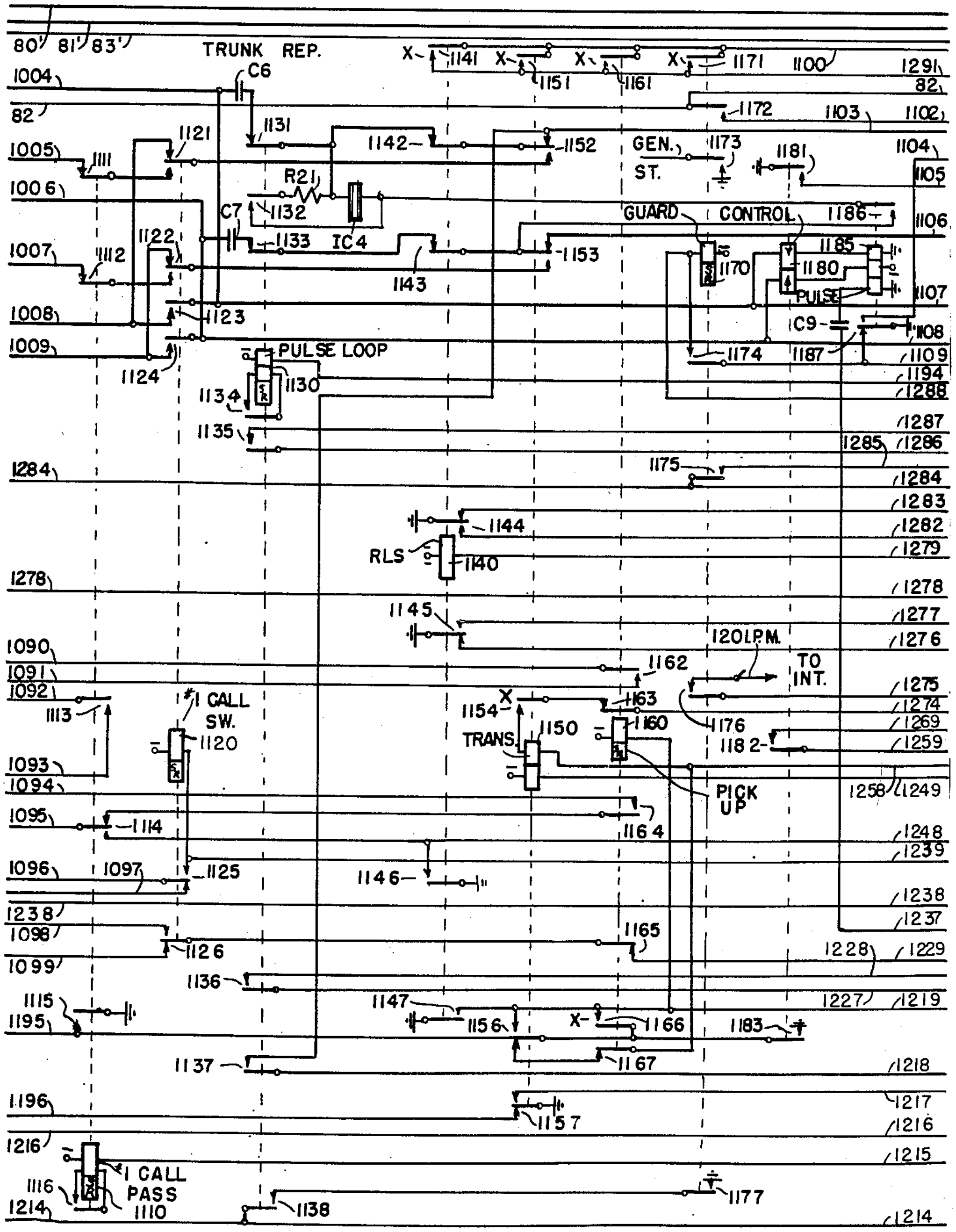
Figure 12:
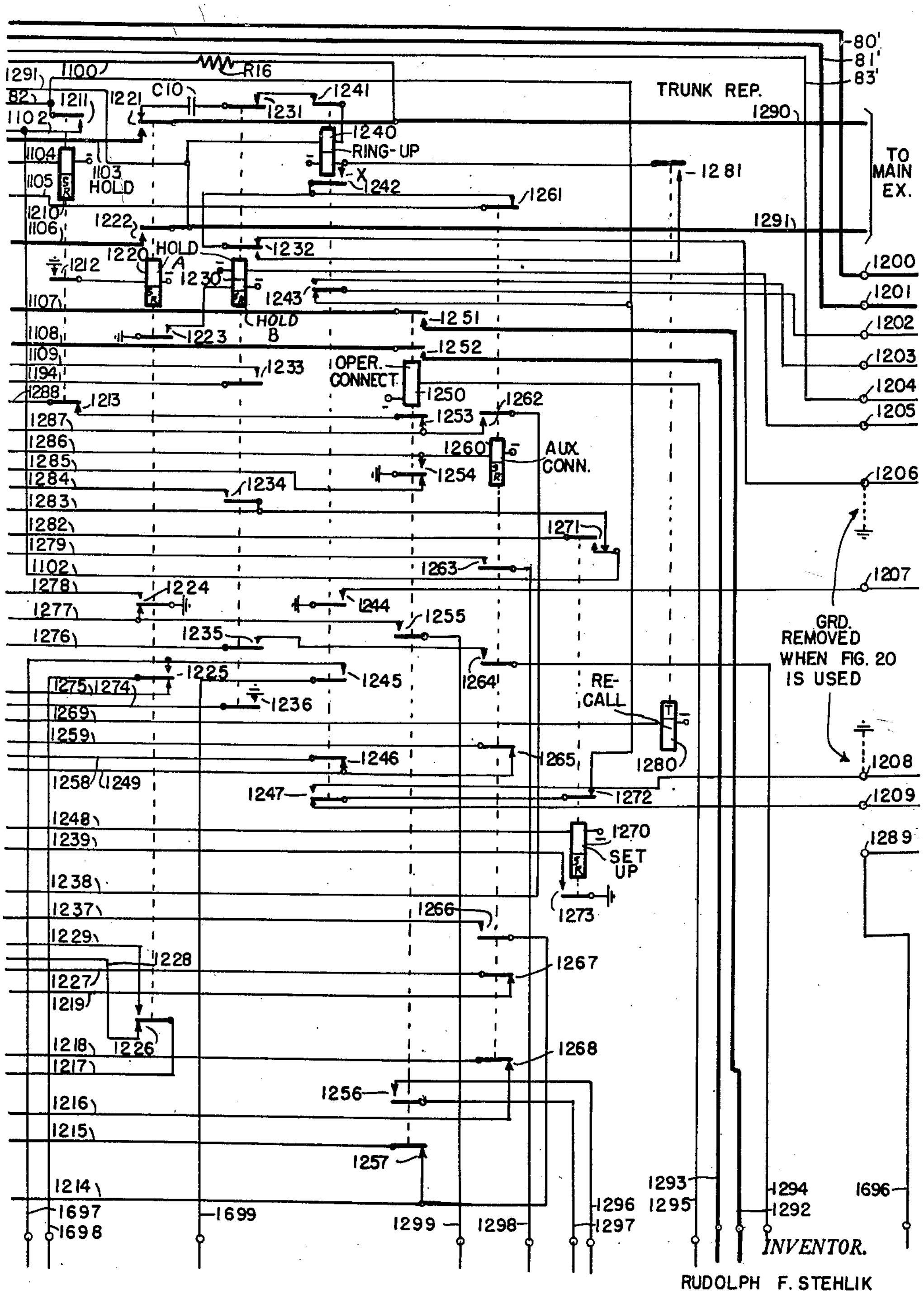

Figures 10, 11 and 12 show one of the special two-way inter-office trunks connecting the P. A. B. X with the central exchange.

Figure 13:
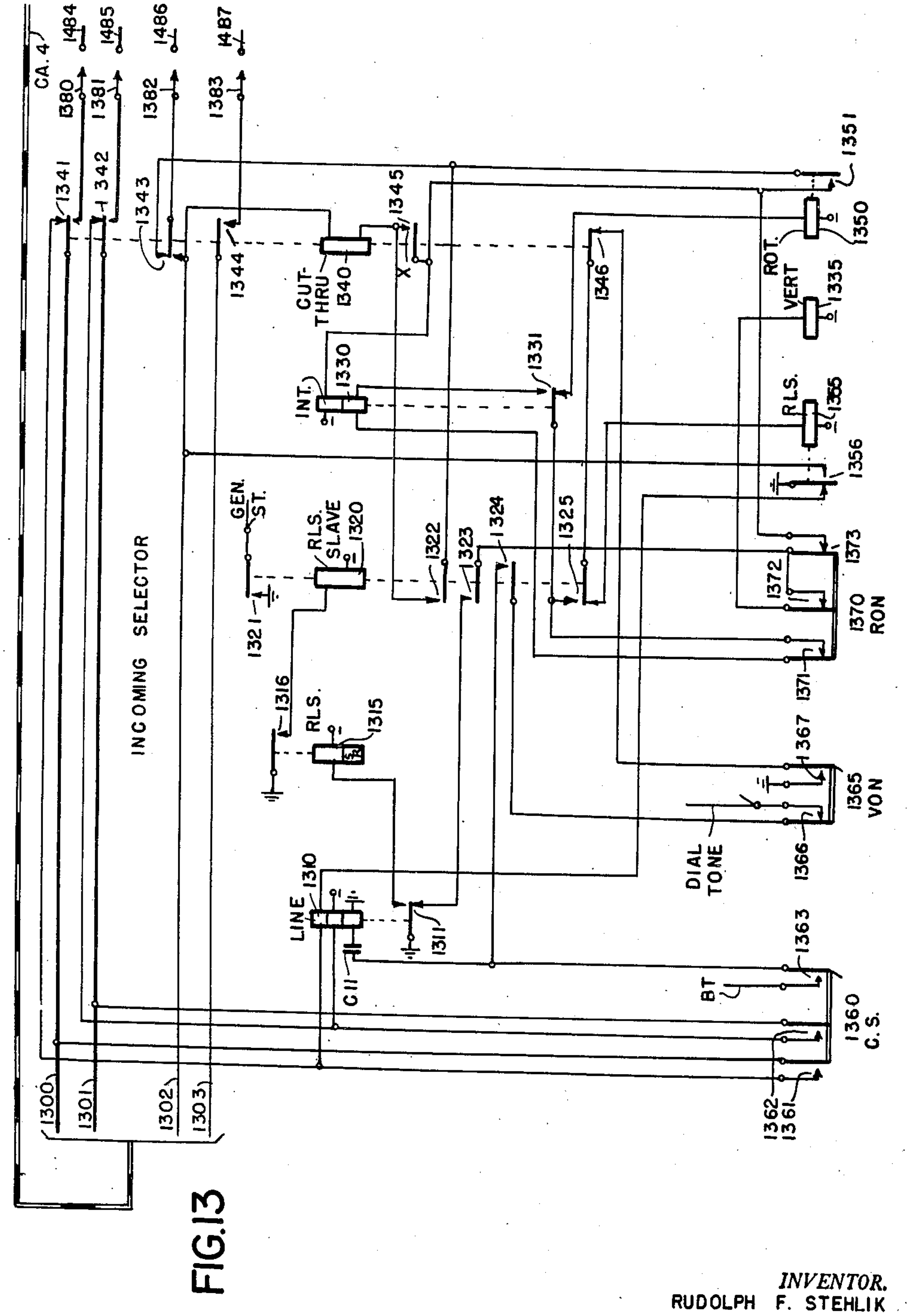

Figure 13 shows one of a number of incoming selectors accessible from the trunk of Figures 10, 11 and 12 and other similar trunks, not shown, for receiving incoming calls.

Figure 14:
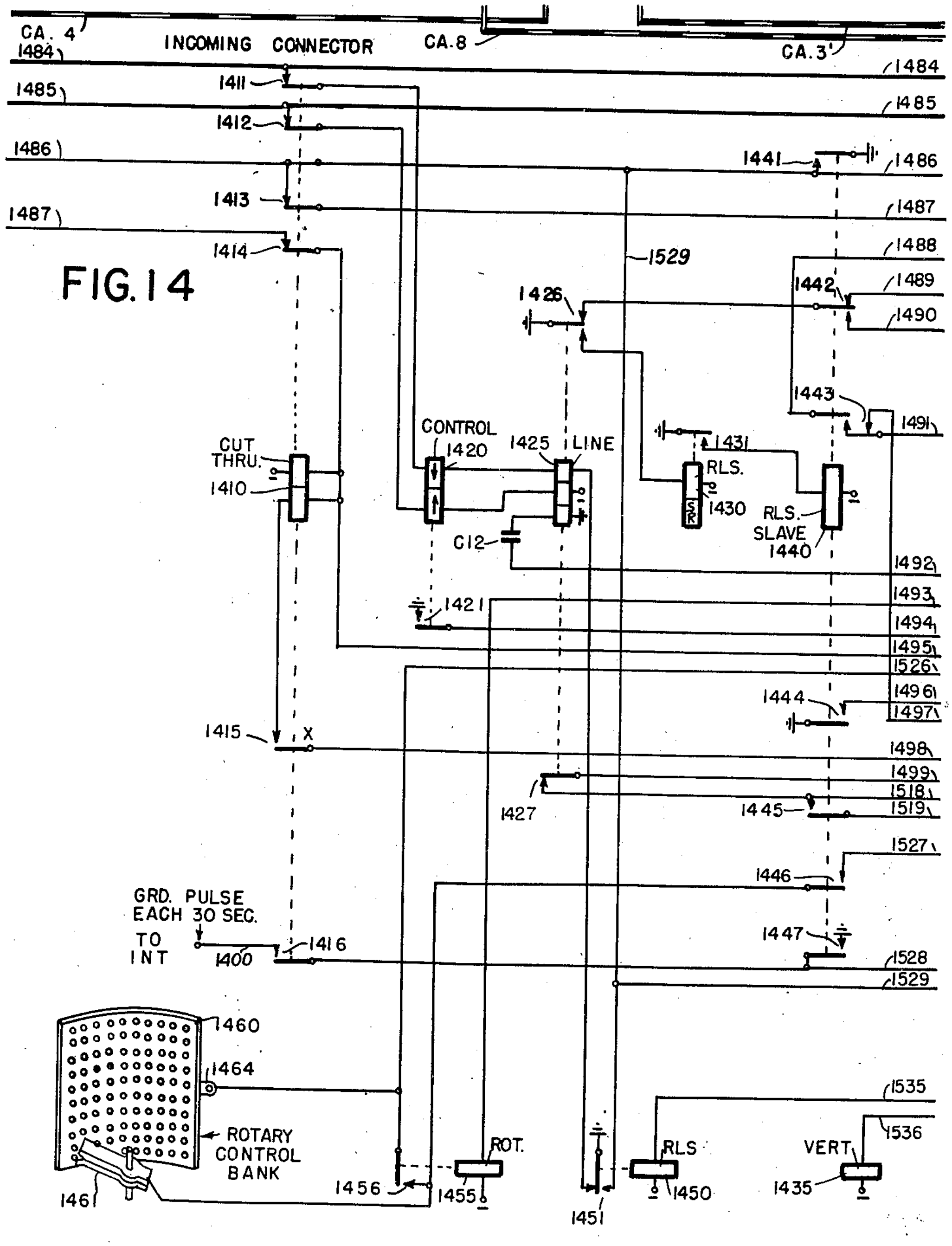
Figure 15:
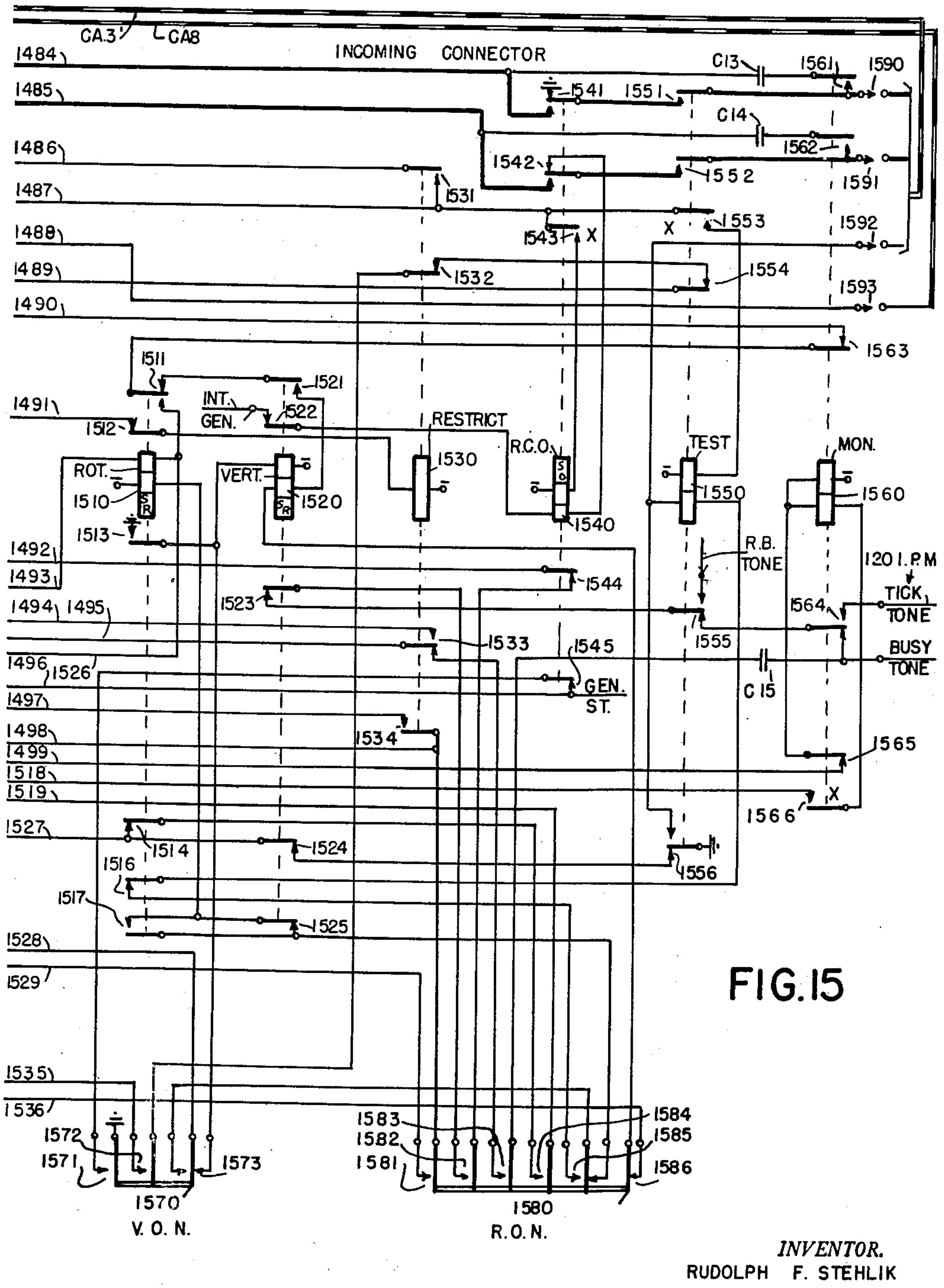

Figures 14 and 15 comprise one of the incoming connectors accessible to the incoming selectors for the completion of incoming calls.

Figure 16:
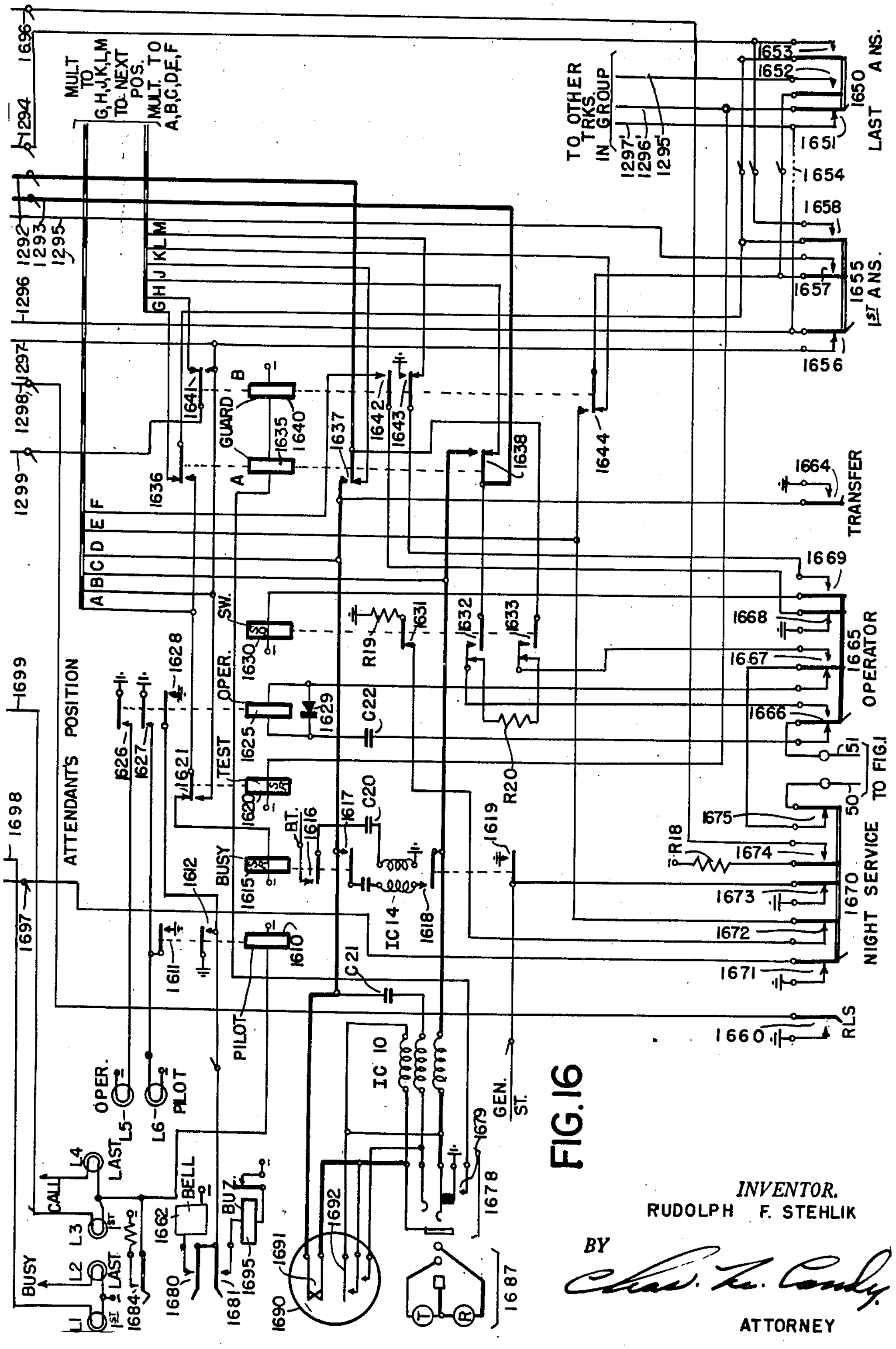

Figure 16 shows a P. A. B. X attendant's position, which is indicated as being associated with other similar positions, not shown.

Figure 17:
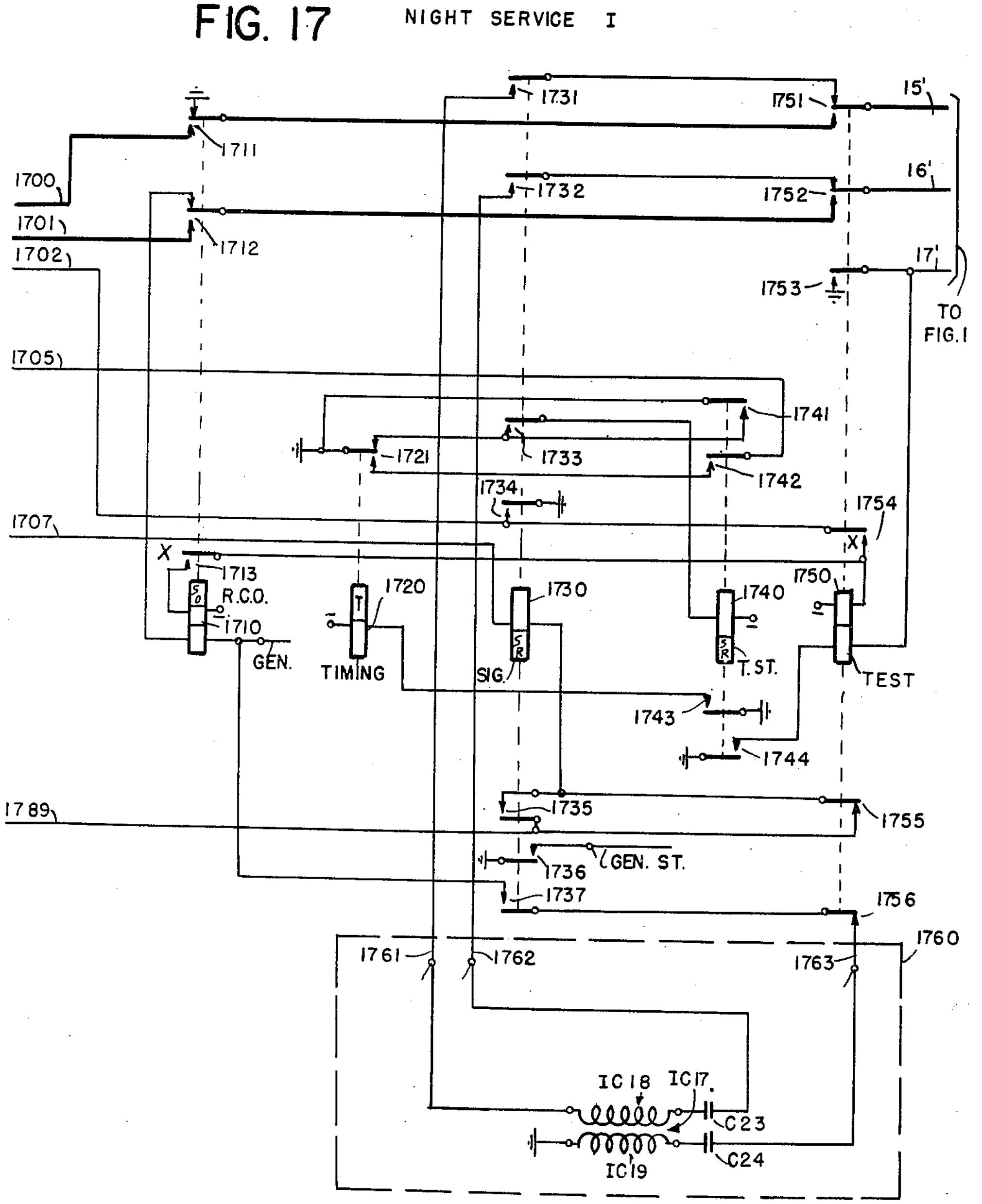

Figure 17 shows a night service circuit for connecting a special P. A. B. X station to a particular trunk for night service. The relationship of this circuit to its trunk may be seen by placing it on the right of Figure 12, with those lines abutting whose numeral designations have the same last two digits, such as for example, 1200 and 1700.

Figure 18:
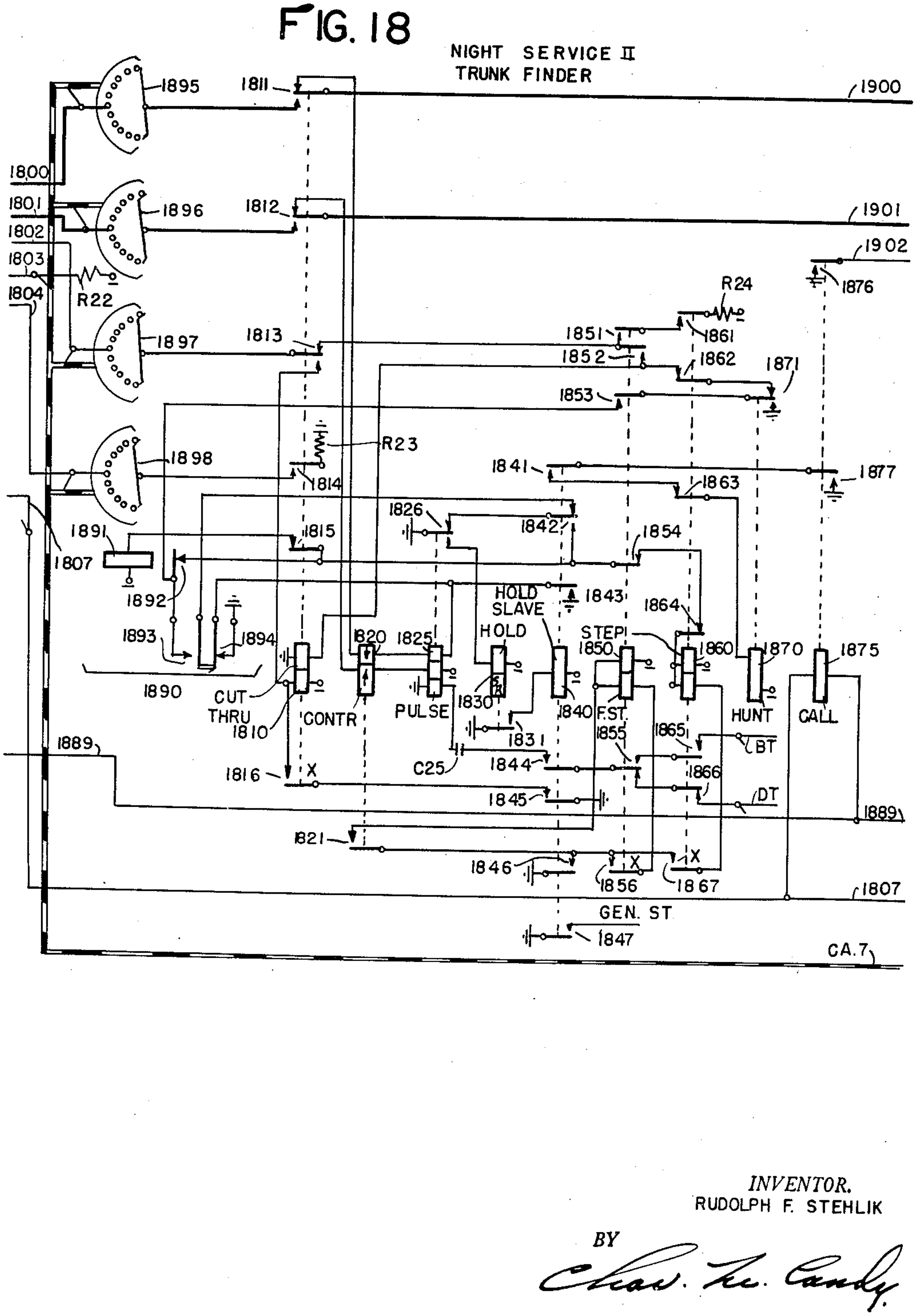
Figure 19:
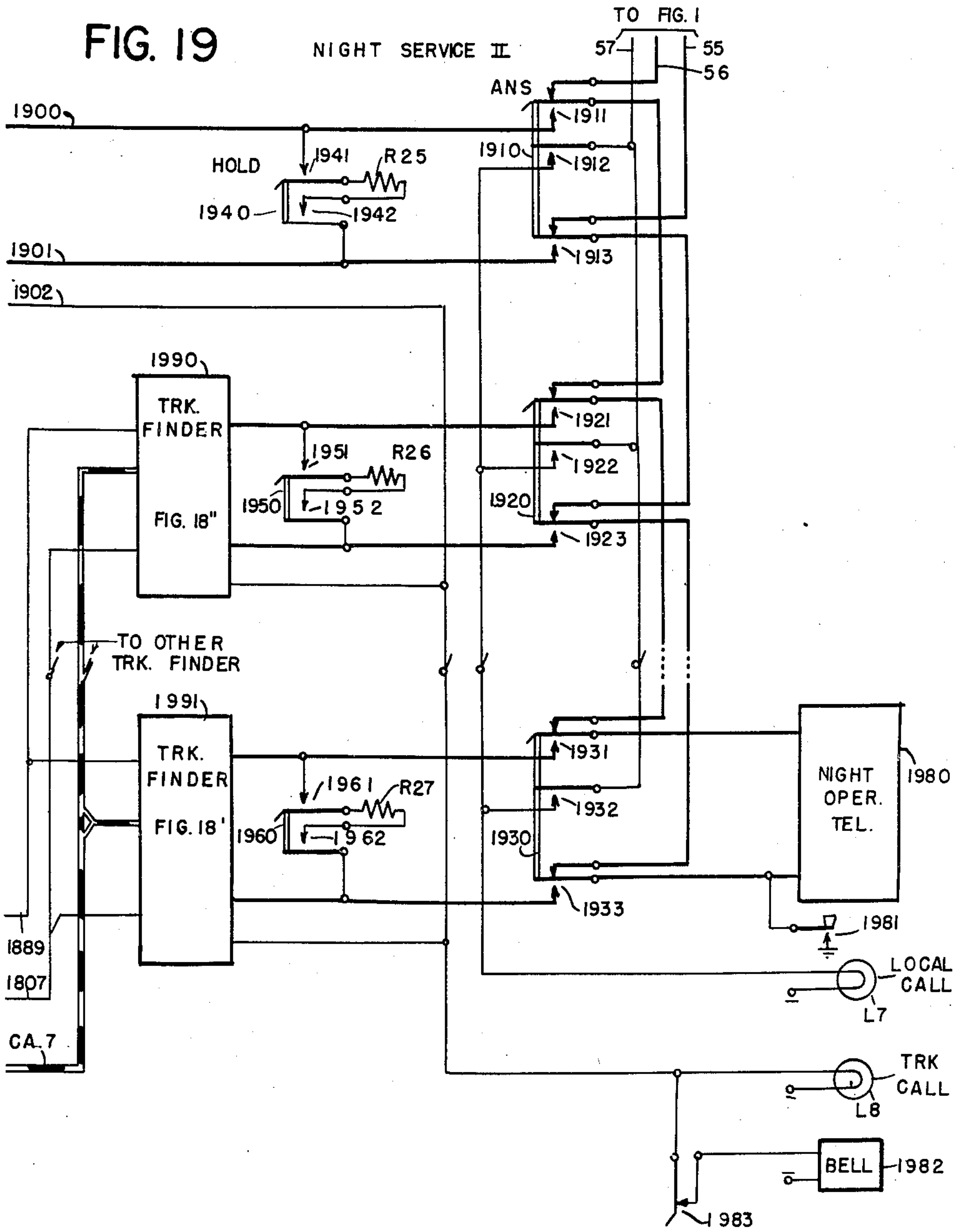

Figures 18 and 19 show a night service circuit for giving a night operator access to a number of trunks assigned for night service, through the banks of two or more rotary type finder switches, as required. The relationship of this circuit to the trunks involved may be seen by placing Figure 18 on the right of Figure 12, with correspondingly numbered conductors adjoining in the manner stated in the preceding paragraph, it being understood that each night trunk is connected similarly to the other contacts of the rotary finder shown, and multipled to contacts of the other rotary finders, not shown. Figure 19 goes on the right of Figure 18.

Figure 20:
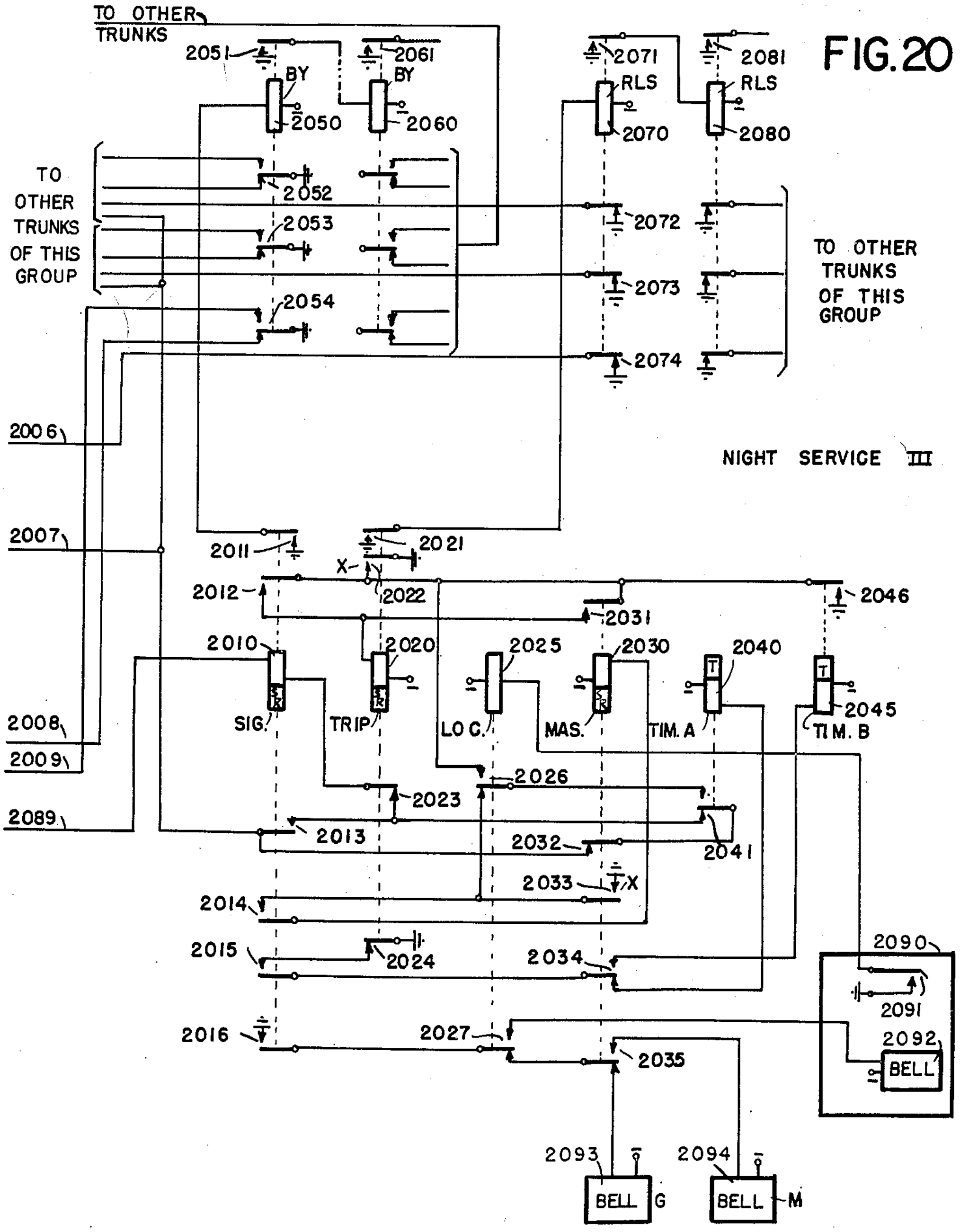

Figure 20 shows a third form of night service whereby any P. A. B. X station provided with the proper ground connections may answer incoming night calls on a plurality of trunks, in response to signals from a loud ringing bell, or from several such signals. This circuit also provides means whereby a predetermined station may by operating a special key, direct all such calls to that station, by disconnecting the common signal and cutting in a local signal.

Figure 21:
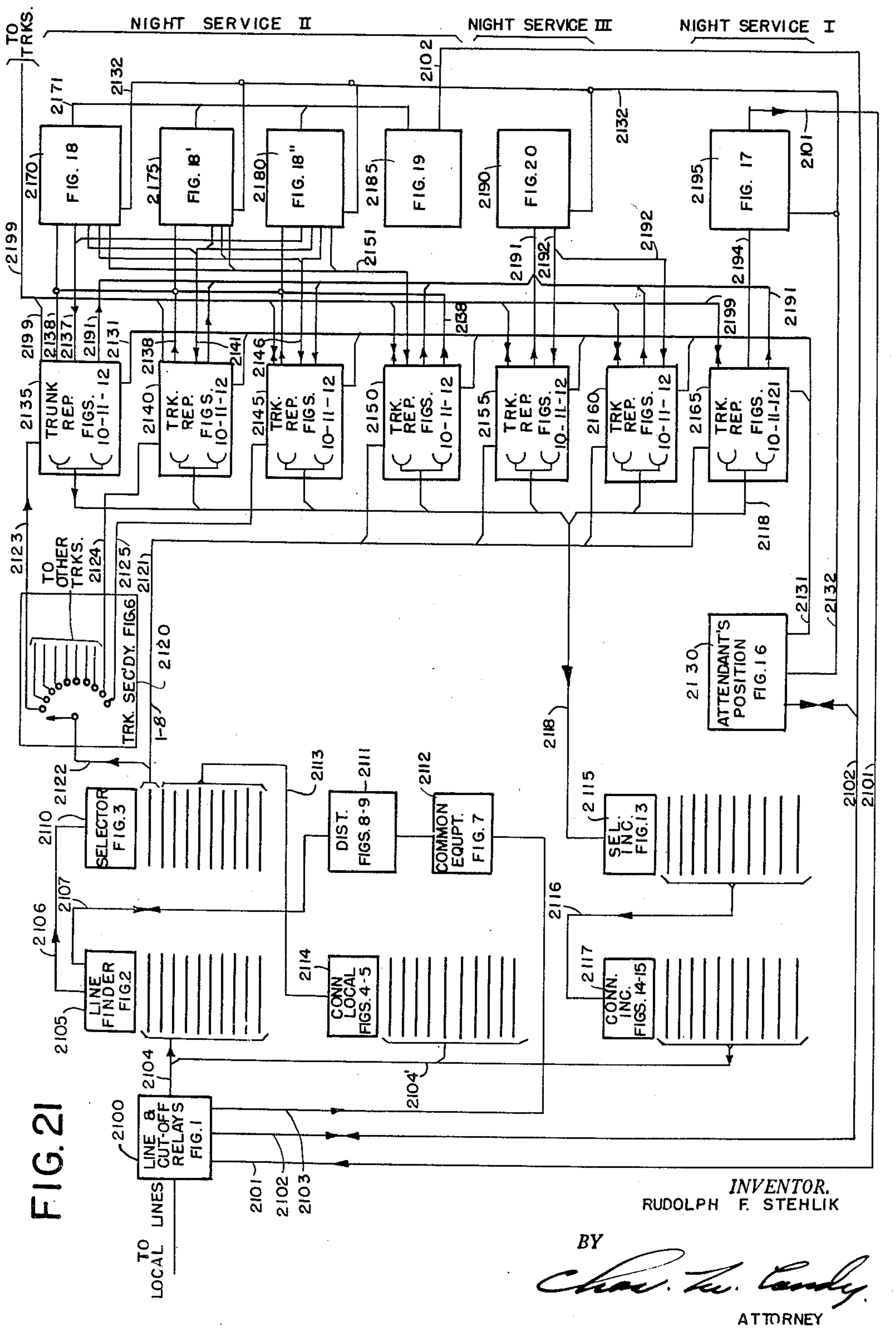

Figure 21 illustrates the general schematic layout of the P. A. B. X in the form of a one line trunking diagram, with the different types of equipment indicated by rectangles.

Figure 22 as previously indicated, shows the manner in which the different figures go together for circuit tracing purposes. The arrows on the right pointing to Figure 12 signify that any of the three Figures 17, 18 or 20 may be placed on the right of Figure 12, to show the manner in which the night circuits are associated with their respective night trunks.

In further explanation of the drawings, and the equipment indicated thereon, Figure 1 shows five types of substations and their associated line equipment, which consists essentially of a combined line and cutoff relay such as relay 110, in addition to the usual line and test conductors and two extra control or EC conductors for marking privileged lines in the banks of the local finders and the incoming connectors. Thus, station A which has a grounding button 1, a direct ground marking on the incoming EC conductor 160, and a resistance ground marking on the outgoing EC conductor 13, can make local calls and trunk calls, can receive and transfer trunk calls, and can make toll calls by dialling direct, through the associated main exchange. Station B, which has a grounding button 2 and a direct ground marking on both EC conductors can do all that station A can do except make toll calls direct. Station C, which has a grounding button 3 and a ground marking on the incoming EC conductor only, can make local calls and receive and transfer trunk calls, but cannot make trunk calls or toll calls. Station D, which has no ground markings can only make and receive local calls. The last line below station D, is the operator's line, whose terminal connections are shown at the bottom of Figure 16.

In Figure 2, the finder line, test, and control wipers are shown at the upper left, together with the four bank contacts associated with the substation A. Vertical, rotary and release magnets are shown at 210, 220 and 230, vertical off normal springs at 235, and a pair of cam springs at 239 which open on the second rotary step and remain open thereafter until the switch is released. A double vertical bank 290 is also included, the left side of which serves to mark the level in known manner and the right side of which is associated with right of way service. The contact springs 236′ and 236″ inside the dotted rectangle, represent vertical off normal springs corresponding to springs 236 on the other finders of the group, which together comprise an all-links-busy circuit. Relay 240, the only relay in the finder, is the switching relay which operates when the calling line is found, to extend the connection to the associated selector.

The local selector of Figure 3, consists of vertical, rotary, and release magnets 375, 376 and 378, vertical off normal springs 360, rotary off normal springs 365, cam springs 370 which operate on the 11th rotary step only, another double vertical bank 390 associated with the restricted service features of the system, four regular wipers 70, 71, 72 and 73, and six relays, comprising a "line" relay 310, a "release" relay 320, a "release slave" relay 330, an "interrupter" relay 340, a "cut-through" relay 350, and a "restrict" relay 380 controlled from the vertical wiper 391. At the upper right, there are also shown three sets of four bank contacts selected at random from the regular switch banks, the upper set being shown connected direct to the local connector of Figures 4 and 5, while the middle and lower sets are connected respectively to the local end of the main office trunk of Figures 10, 11 and 12, through the cable CA2, and to the overflow trunk selecting unit of Figure 6, through the cable CA1.

The local connector of Figures 4 and 5 consists of vertical, rotary and release magnets 460, 465 and 468, vertical and rotary off normal springs 570 and 560, two line wipers 90 and 91, a test wiper 92, and ten relays comprising a "line" relay 410, a "release" relay 420, a "release slave" relay 430, a "hold" relay 440 associated with a last-party-release feature, a "rotary transfer" relay 450, a "vertical transfer" relay 510, a monitor relay 520, a "back-bridge" relay 530, a "ring-cut-off" relay 540, and a "test" relay 550. A rotary control bank 480 is also provided, to permit automatic rotary hunting or line selection, in cases where a group of lines or stations are assigned the same call number, which must of course be that of the first station of the group. This rotary control bank is a special metal bank arc mounted facing one of the regular banks and having perforations corresponding to the various lines and levels in ten rows of ten holes each, into which metal pins are inserted as necessary to engage a special wiper such as the wiper 482. The wiper 482 thus forms one side of a rotary hunting circuit, and the metal arc forms the other side of this circuit through the terminal 483. This circuit is closed whenever the wiper 482 engages one of the metal pins, not shown. This rotary control bank, also called a P. B. X bank arc, is sometimes used in main exchanges for hunting trunks to a private branch exchange, as shown for example in U. S. Patent Number 2,099,429 issued to John E. Ostline on November 16, 1937.

The overflow trunk selecting unit of Figure 6, comprising only a "cut-through" relay 610, a "line" relay 620, a "hold" relay 630, and a four-level rotary switch 640 having access to all of the trunks of the system, is used only when all of the first choice trunks for outgoing calls are busy. When this occurs, any additional outgoing calls will cause the local selector involved to seize this unit from the final contact or contacts of the trunk level, and the switch 640 will thereupon hunt an idle overflow trunk and extend the connection thereto. In the present instance it is assumed that all trunks are accessible through the tenth level of the local selectors, that eight trunks are connected as first choice to the first eight contacts of this level, and that the last two contacts each lead to an overflow trunk selecting unit such as shown in Figure 6, so that if the first is busy, the selector will pass on to the second. As many units are provided as required to meet the traffic needs, but it is here assumed that two units per selector group will be adequate.

Figure 7 shows three miscellaneous relays associated with the distributors, comprising an "all-links-busy" relay 710 and two start relays 750 and 760 which operate whenever a local call is originated to close the distributor start circuits. A busy tone induction coil IC1 is also included for passing busy tone to the line circuits, in case of an all links busy condition.

Figures 8 and 9 show two identical local link distributors each consisting of eight relays and a six-level rotary switch. Busying keys are also provided, at 865 and 965. Relay 860 is a polarized relay which remains in the last operated position and serves as a "change over" relay, to permit only one distributor to be in service at a time. In Figure 8, relay 810 is a "trip" relay which operates after the line finder preselected by the distributor has found the calling line, to switch the finder through to the associated selector; relay 815 is a "test" relay which operates when the calling line is found, to operate trip relay 810; relay 820 is an "interrupter" relay which drives the finder in both its vertical and rotary movements, in co-operation with make contacts on the finder vertical and rotary magnets; relay 825 is a "reset" relay which operates following the operation of the trip relay to release the distributor, relay 830 is a "stop" relay which operates from the finder vertical bank wiper 291 to stop the vertical stepping when the finder wipers have reached the proper level; relay 835 is a "transfer" relay which operates from the stopping relay to start the finder rotary movement; relay 840 is a "distributor start" relay which operates from the "start slave" relay 760 to initiate the distributor operation; and relay 850 is a "finder start" relay which operates from relay 840 to start the finder vertical movement. It may be noted that the rotary switch banks and relays of Figure 9, which are identical with those of Figure 8, are arranged in reverse order to those of the latter. This is only a matter of convenience in drawing however. In case all of the bank contacts are not required, the extra contacts of the busying levels should be jumpered or connected together as indicated at 877' and 977' and connected to ground at break contacts 712 on the all links busy relay, as shown.

The two-way trunk repeater of Figures 10, 11, and 12 consists of two four-level rotary-type incoming finders 1070 and 1080, and 24 relays numbered from 1010 to 1280 inclusive. These two finders the lower of which will be referred to as the first finder and the upper as the second finder co-operate in the extension and transferring of trunk calls by finding an idle incoming selector over the cable CA4, and providing certain control channels for the operation of the trunk circuit, as will be described in due course. These switches normally remain in the last operated position, but on successive transfers of the same call, the last used switch is advanced one step. As to the relays shown in Figure 10, relay 1010 is the "No. 1 finder start" relay which operates from rleay 1150 on the extension of an incoming call from the operator's position or on a first transfer of an outgoing call, to start the finder 1070; relay 1020 is the "No. 1 finder test" relay which operates when an idle incoming selector is found, to cause the seizure of the said selector; relay 1030 is the "No. 2 finder start" relay also controlled from relay 1050 to start the second finder whenever a call is transferred with the No. 1 finder already in service; relay 1040 is the "No. 2 finder test" relay which operates when the second finder finds an idle incoming selector; relay 1050 is a differential "restrict" relay controlled from both within and without the trunk and which operates only when its windings are energized unequally, to prepare the toll dialling circuits; relay 1055 is a "No. 2 call switching" relay which operates from relay 1060 to complete a trunk connection through the second finder 1080; and relay 1060 is a "No. 2 call passing" relay which is operated from the incoming switch train on a transferred call when the party to whom the call is being transferred operates their grounding button to pick up the call.

In Figure 11 relay 1110 is a "No. 1 call passing" relay which operates from relay 1170 on an extended incoming call or from the incoming switch train on a second transfer to cause the operation of switching relay 1120; relay 1120 is the "No. 1 call switching" relay which operates as the result of the operation of relay 1110 to complete a connection through the first finder 1070; relay 1130 is a "pulse loop" relay, which operates on the first pulse of each digit to prepare and improve the pulse repeating circuit and releases shortly after the last pulse of each digit to prepare the talking circuit; relay 1140 is a "release" relay controlled from the attendant's position to release the incoming switch train without releasing the trunk, as in the case of a call wrongly extended; relay 1150 is a "transfer" relay which operates from relay 1180 in response to the initiation of a call extension or transfer, to place a hold on the trunk line, and connect the pulse repeating circuit to the incoming switch train, through either incoming finder; relay 1160 is a "pick-up" relay which operates from either call passing relay to release transfer relay 1150 in order to complete the connection in response to a called station picking up an extended or transferred trunk call; relay 1170 is a "guard" relay which operates automatically to guard the connection momentarily when the operator retires from the connection, on an incoming call, after dialling the number of the wanted local station; relay 1180 is a differential "control" relay with opposing windings in series with the pulsing relay, and which is operated from the attendant or station grounding keys as required to initiate a trunk call extension or transfer; and relay 1185 is a "pulsing" relay which repeats pulses to the main exchange for an outgoing call, or to the incoming switch train for a call extension or transfer, as required.

In Figure 12, relays 1210, 1220 and 1230 are "hold" relays which operate in succession following the operation of pulsing relay 1185 to connect the trunk circuit through to the main exchange; relay 1240 is a "ring-up" relay whose upper winding is normally connected across the trunk, through the condenser C10, and which responds to ringing current from the main exchange on an incoming call to signal the attendant; relay 1250 is an "operator connect" relay which operates whenever the attendant answers an incoming call on this trunk by closing a corresponding answer key; relay 1260 is an "auxiliary connect" relay operated from relay 1250 to share the spring load, and to control the operation of the guard relay; relay 1270 is a "set up" relay normally controlled from the No. 1 call passing relay 1110 to operate the No. 1 call switching relay 1120, but also controlled from release relay 1140 to assist on a forced release of the incoming switch train; and relay 1280 is a thermal type "recall" relay having a 5-second operating delay period, which is also controlled from the station grounding buttons whenever a local station engaged in a trunk call wishes to recall the attendant. The conductors 1290 and 1291 shown at the upper right in this figure are the trunk line conductors, the terminals on the right side of the figure indicate night circuit connections, and those at the bottom indicate connections to the attendant's position.

The incoming selector of Figure 13 consists of vertical, rotary, and release magnets 1335, 1350 and 1355, vertical and rotary off normal springs 1365 and 1370, cam springs 1360 which operate on the 11th rotary step, and five relays comprising a "line" relay 1310, a "release" relay 1315, a "release slave" relay 1320, an "interrupter" relay 1330, and a "cut-through" relay 1340, whose functions are obvious from their names. The conductors 1300 to 1303 inclusive at the upper left are the line and control conductors incoming from the incoming finders, by way of cable CA4, and the wipers 1380 to 1383 inclusive at the upper right are the line and control wipers giving access to the incoming connectors, such as that of Figures 14 and 15, which is shown connected to a single set of bank terminals at the selector, over conductors 1484 to 1487 inclusive.

The incoming connector of Figures 14 and 15 consists of vertical, rotary, and release magnets 1435, 1455 and 1450, a rotary control bank 1460, vertical and rotary off-normal springs 1570 and 1580, line, test and control wipers 1590 to 1593 inclusive and 11 relays, comprising a "cut-through" relay 1410 which operates from the trunk circuit on an incoming call when the operator retires from the connection, or from the connector on a transferred call when the called station operates their grounding button to pick up the call, to clear the line, a differential "control" relay 1420 arranged like relay 1180 in the trunk circuit and controllable over the called line loop on a transferred call as indicated in the foregoing to operate relay 1410, a "line" relay 1425 in series with relay 1420, a "release" relay 1430, a "release slave" relay 1440, a "rotary transfer" relay 1510, a "vertical transfer" relay 1520, a "restrict" relay 1530 controlled from the EC wiper 1593, a "ring cutoff" relay 1540, a "test" relay 1550, and a "monitor" relay 1560. A set of four regular bank terminals is also shown at the upper right in Figure 15, leading to the line circuits of Figure 1, by way of the cables CA3' and CA8. At the lower left, the conductor 1400 leads to a special interrupter not shown, which places a ground pulse on conductor 1400 approximately each half minute to start the ringing on a trunk call to a busy line.

The attendant's position of Figure 16 consists essentially of a full complement of trunk signal lamps and answering keys, audible signals, a local call lamp signal, an operator's telephone, some seven miscellaneous control keys, and seven relays. A "trunk busy" lamp such as L1 or L2 and a "trunk call" lamp such as L3 or L4 for example, as indicated in the upper left hand corner of this figure, is provided for each trunk; likewise, a "trunk answering" key, such as 1655 or 1650, shown in the lower right hand corner, is also required for each trunk. Other keys include a "transfer" key 1664 for use in extending incoming trunk calls to a local station, an "operator" key 1665 used for answering or initiating local calls over the line conductors 50 and 51 shown nearby, a "night service" key 1670 which the attendant closes on leaving at the end of the day to cut in the night service circuits, a "release" key 1660 which may be employed to force the release of a connection through the incoming switch train, a "signal" key 1681 by means of which a signal buzzer 1695 may be cut in or out of service as desired, a "bell" key 1680 by means of which an external signal bell 1662 may be cut into service, and a "signal cut out" key 1684 which may be used to disable the common signals, both audible and visual, if desired. The operator's telephone circuit, as shown at the lower left in Figure 16, includes a plug equipped headset 1687, a telephone jack 1678, a dial 1690, an induction coil IC10 and a condenser C21. The relays include a "pilot" relay 1610 which operates in series with the call lamps to light a common pilot lamp L6 and close the audible signal circuit and which may be shunted out by the operation of key 1684, a "busy" relay 1615 which operates whenever the operator cuts in on a busy trunk to place a warning tone on the connection, a test relay 1620 which operates whenever the operator answers a trunk call or cuts in on an idle trunk to disconnect the busy relay, an "operator" relay 1625 which operates from ringing current when a local station calls the operator over the local switch train to light the "operator" lamp L5, the pilot lamp L6 and close the audible alarm circuit, a "switching" relay 1630 which operates from key 1665 to complete the connection when the operator answers a local call, and two "guard" relays 1635 and 1340 which operate in series to prepare the position for operation when the operator plugs her headset into the telephone jack 1678. A multiple to another position is shown schematically, at the upper right.

The "individual-line" night service circuit of Figure 17, one of which is required for each trunk assigned to through service to a particular station at night consists merely of five relays numbered 1710 to 1750 inclusive, and a common ringing tone induction coil IC17, which places a warning tone on the associated line if the latter is busy with a local call when a trunk call arrives for this station. The five relays include a "ring cutoff" relay 1710 which operates when the called line answers to switch the trunk through, a thermal "timing" relay 1720 having a 60 second delay period which operates to release the connection if the called station does not answer within the stated time limit, a "signal" relay 1730 which operates from the associated trunk circuit when a night call arrives thereover, a "time start" relay 1740 which operates from relay 1730 to start the timing cycle and prepare the test circuit, and a "test" relay 1750 whch operates following the operation of relay 1740 to start the ringing, if the called line is idle. The trunk connections are shown at the left, and the line connections at the upper right.

The night operator circuits of Figures 18 and 19, consist of a number of special trunk finders, such as shown in Figure 18, a trunk answer key and a trunk hold key such as 1910 and 1940 for each trunk finder, a telephone 1980, which may be a regular telephone or a handset mounted on the key cabinet, a grounding key 1981 for controlling both the trunk finders and the trunks, a trunk call lamp L8, a loud ringing signal bell 1982, a signal key 1983 for cutting off the signal bell when desired, and a local call signal lamp. Each trunk finder, all of which are identical with that shown in Figure 18, consists of a four-level rotary finder switch 1890 provided with interrupter springs 1892 and off normal springs 1893 and 1894, and nine relay numbered 1810 to 1875 inclusive. These relays include: a "cut-through" relay 1810 which operates when the desired trunk is found on both incoming and outgoing calls to switch the operator through to the trunk; a differential "control" relay 1820 operable from the grounding key 1981 to start the trunk finder; a "pulsing" relay 1825 which operates over the night operator's line loop and which may be pulsed from the operator's dial if desired to set the finder on a particular trunk for an outgoing call; a "hold" relay 1830 and a "hold slave" relay 1840 controllable from the pulsing relay; a two-step "finder start" relay 1850, controlled from relay 1820 to start the finder switch as required, and to prepare the stopping circuits; a two-step "stepping" 1860 controlled from the pulsing relay to prepare a different stopping circuit when the operator desires to select a particular trunk for an outgoing call; a "hunting" relay 1870 which operates from the hold slave and call relays to prepare a hunting circuit whenever an incoming call is received on one of the associated trunks; and a "call" relay 1875 which operates from the trunk ring-up relay on an incoming call, to bring in the trunk signals of Figure 19. As many trunk finders are provided as may needed to meet the traffic requirements. In the present case, two other trunk finders are indicated in Figure 19, by means of the rectangles 1990 and 1991, in order to show the connections. However, since any call can be answered over any finder, and since the finders are released as soon as the call is extended to the wanted local station it is unlikely that any considerable number of finders would be required in the majority of cases. The trunk connections are shown at the left of Figure 18, and at the upper right in Figure 19 are shown the connections to the operator's line of Figure 1.

The group night service circuit of Figure 20, which is common to a number of trunks arranged to operate a special group of bell signals on incoming night calls over these trunks, permits any station privileged to make trunk calls to answer such a call, upon hearing the signals, by merely dialling an "0" over the local switch train. This circuit, as shown, consists of one or more general signals 2093, a master signal 2094, a local signal control unit 2090 located at a particular station, six miscellaneous control relays numbered from 2010 to 2045 inclusive, one or more "trunk busying" relays such as 2050 and 2060 and one or more "trunk release" relays such as 2070 and 2080. The general signals 2093 may be variously located as required, while the master signal will normally be located at some strategic location like a watchman's station, and operates only after an interval in case the general signals go unanswered. In the local signal unit 2090, the operation of the signal key 2091 cuts off the general signals and the master signal and cuts in a local signal 2092 to permit the answering of all such calls by this particular station, with the general signals reserved for use when this post is vacant. With reference to the relays, relay 2010 is a "signal" relay which operates from the ring up relay on an incoming call to any of these trunks to close the signal circuits, relay 2020 is a "trip" relay which operates from a timing relay to cut off the master signal and release the trunk after a given interval, relay 2025 is a "local signal" relay which operates from the key 2091 to cut in the local signal 2092, relay 2030 is a "master signal" relay which operates to ring the master signal in case the general signals remain unanswered after a given time, relay 2040 is a thermal "timing" relay having a 60 second delay period which serves to operate the master relay, and relay 2045 is a second thermal timing relay having a 5 second delay period which operates from the master relay after the stated interval to cut off the master signal and release the trunk as previously indicated. The busying relays, such as 2050, of which as many are provided as required by the total number of trunks accessible to the local selectors, are operated in cascade from the signal relay 2010 to busy all idle trunks momentarily so as to permit the local selector to readily find the calling trunk. The release relays, such as 2070, of which as many are provided as required by the number of trunks assigned to this form of night service, are operated similarly from the trip relay 2020, should the latter operate, and remove ring-up relay locking ground from all of the trunks assigned to this service, thereby releasing the calling trunk or trunks when an incoming call remains unanswered for more than a minute, as previously explained.

The trunking diagram of Figure 21 shows without circuit details the general relationships of the main parts of the system to one another, with the said main parts or pieces of apparatus represented by rectangles, with proper references to the various figures of the drawings as required. Thus the rectangle 2100 at the upper left represents the local station line circuits of Figure 1, the rectangles 2105 and 2110 a local finder-selector link, the rectangles 2111 and 2112 the distributor equipment of Figures 7, 8, and 9 as indicated, the rectangle 2114 a local connector per Figures 4 and 5, and the rectangles 2115 and 2117 an incoming selector and connector. The rectangle 2120 at the top in the center is an overflow trunk selecting unit per Figure 6, and the rectangle 2130 at the bottom center represents the day time attendant's position, in accordance with Figure 16. In the right is shown a row of seven trunk repeaters numbered 2135 to 2165 inclusive, the top four of which are shown connected to the night-operator form of night service indicated by the rectangles 2170 to 2185 inclusive, while the next two are shown connected up for the group form of night service indicated by the rectangle 2190, and the last to the individual form of night service, indicated by the rectangle 2195.

With further reference to the trunking diagram of Figure 21, the general operation of the system may be briefly summarized therefrom as follows. On a local call, the operation of a line circuit in the rectangle 2100 marks the calling line in the line finder banks over the cable 2104 and operates a start relay in the common equipment 2112 over cable 2103. This starts the distributor 2111, which starts a preselected local finder such as 2105 to hunting the calling line. When the calling line is found the finder seizes the associated local selector 2110 over the cable 2106. This selector in response to the first digit of the call number finds an idle local connector such as 2114 in the proper hundreds group, which responds to the final two digits to complete the connection to the called line over the cable 2104'. The first nine levels of the selector are indicated as leading to local connectors, while the tenth level is used for trunks.

With reference to the tenth level of the local selectors, it should be noted that the first eight contacts of this level are indicated as being connected direct to first choice trunk repeaters such as 2150 etc. over the cable 2121, while the last two contacts are connected over the cable 2122 to overflow trunk selecting units such as 2120, which give access to the second choice trunk repeaters such as 2135, the maximum possible number of the latter being of course dependent on the size of the rotary switch employed. To make an outgoing trunk call, a privileged station, on removing his receiver seizes a local finder-selector link as before, and on receiving dial tone dials the single digit "0." The local selector thereupon cuts in on the tenth level and seizes an idle repeater such as 2150, which thereupon switches the local station through to the main exchange over the trunk cable 2199. If the first choice trunks are all busy, the selector will seize one of the overflow units, which will then hunt an idle second choice repeater, such as 2135, which will similarly switch the call through to the central office, and the call proceeds as required.

On an incoming trunk call, ringing current over a trunk operates a ring-up relay in the associated repeater such as 2135 which brings in a trunk signal at the attendant's position over the cable 2131. The operator then makes connection with this repeater, over the same cable 2131 and talks on the trunk. The operator then places a hold on the trunk, and causes the repeater to find an idle incoming selector such as 2115, over the cable 2118. The operator then dials the number of the wanted station. The incoming selector, in response to the first digit finds an idle incoming connector such as 2117, in the proper hundreds group, and this connector in response to the last two digits, makes connection with the called local line, over the cable 2104'. When the called station answers it is automatically connected through to the trunk. The operator may retire from the connection upon the completion of dialling or she may wait until the called party answers, without effect on the completion of the connection.

Call transfers are initiated and completed by means of the grounding buttons on the telephones of the privileged lines, which alone can transfer calls. Such transfers also, are effected entirely through the trunk repeater and the incoming switch train, although in the case of an original outgoing call, the transfer is initiated through the local switch train. In such case the closing of the grounding button at the original calling station will unbalance the line loop to the repeater through the local switch train. The repeater in response, places a hold on the trunk, and connects the calling station to the incoming switch train. The calling station then dials the number of the wanted station, and the incoming switch train connects the two stations, through the trunk repeater. The called station may then pick up the trunk by operating his grounding button. This unbalances his line, through the incoming switch train, and causes the repeater to remove the hold on the trunk and connect the called station through to the trunk line. The first station then hangs up. An incoming call, or a transferred outgoing call, is transferred in similar manner, except that in this case both the initiation and the completion of the transfer would be made through the incoming switch train, without affecting the local switch train in any way.

The night service circuits, while permanently connected to their respective trunk repeaters, become effective only at night, when the closing of the night service key at the attendant's position connects battery to these circuits over the conductor 2132, at the same time that it puts the attendant's position out of service. Now, if a call comes in over a trunk assigned to "night service II," the associated trunk repeater such as 2140 for example, will seize the night service trunk finders 2170, 2175 and 2180 over the lead 2138, and bring in a signal at the night operator's station 2185, over the cable 2171. The night operator will then make connection with any desired trunk finder over cable 2171 and then close the telephone grounding key to start this finder to hunting the calling trunk. The night operator is thus connected to the trunk, and completes the desired connection in the same manner as the day operator, by again operating the grounding key to cause the repeater to seize the incoming switch train, and then dialling the number of the wanted station. The cable 2102 leading from the night operator's station 2185 to the line equipment 2100 represents the operator's own line which has access to and is accessible from the local switch train. The same line is used by the day operator as indicated by the multiple to the attendant's position 2130.

On an incoming call over a trunk assigned to the group night service or "night service III," the associated trunk repeater, such as 2155 for example, will seize the night circuit 2190, over the cable 2191, which will bring in one or more bell signals, suitably located. The night circuit 2190 at the same time places a special busying ground on all idle trunks momentarily, by way of the cable 2191. Any privileged station bearing the signals may answer the call, by dialling an "0" as for an outgoing call, to operate a local selector. Since all trunks are now marked busy except the calling trunk, the local selector quickly finds the trunk repeater 2155, which thereupon releases the night circuit and switches the answering station through to the trunk. If a call over this group of trunks is not answered within a minute, the night circuit will ring a master alarm bell, and will then release the trunk repeater, over the cable 2192.

On an incoming call over a trunk assigned to individual night service, or "night service I," the associated trunk repeater, such as repeater 2165, will seize the night circuit 2195, over the cable 2194, and the night circuit in turn will automatically ring the associated privileged station, over the cable 2101. To answer, the called station has only to lift the receiver, whereupon the night circuit and the repeater co-operate to switch the trunk through. Since the night circuit is individual to both the line and the trunk, it remains held for the duration of the call. If the called station is engaged on a local call at the time an incoming call arrives, the night circuit will place a tone on his line to advise him of the waiting trunk call, which he may then pick up by replacing his receiver momentarily. The night circuit will then ring as before, and when the called station again removes his receiver will complete the connection.

The description of the drawings and equipment, and the general mode of operation, having been completed, a detailed circuit description will now be given, in order to permit complete understanding of the invention.

*Local calls*

If the local station C in Figure 1 wishes to call another local station, such as station D for example, the removal of the receiver of handset from the telephone at station C causes the partial operation of the line relay 130 in the associated line circuit, from ground at break contacts 131, over the calling station line loop, through break contacts 132 and the lower winding of relay 130 to negative battery on conductor 106 through the secondary of a busy tone induction coil IC1 in Figure 7. Line relay 130 thereupon closes its preliminary make contacts 133 and 134, contacts 133 being without effect at the moment. Contacts 134 however pass ground from break contacts 135 to the finder tens marking conductor 34, thereby grounding the left hand No. 6 contact in the linefinder double vertical bank 290. This same ground at the same time passes through the resistor R6 and causes the operation of start relay 750, by way of the start conductor 250.

Start relay 750 upon operating, also causes the operation of the start slave relay 760. Relay 750 at make contacts 761 prepares a busy circuit, now open at contacts 711, and at make contacts 762 closes a circuit for the distributor start relay 840 as follows: ground at make contacts 762, break contacts 713 on the all-links-busy relay, conductor 791, make contacts 861, break contacts 867 on lever key 865, conductor 897, break contacts 946, conductor 896, and the winding of relay 840 to battery through resistor R14. Relay 840 operates over this circuit, at break contacts 841 opens a point in the finder release circuit, at make contacts 842 prepares a circuit for the finder switching relay 240, at make contacts 843 prepares a local locking circuit, at make contacts 845 prepares a circuit for test relay 815, at break contacts 846 disables the circuit of start relay 940 in the other distributor, and at make contacts 844 closes a circuit for the finder start relay 850 which extends by way of break contacts 886 on the busying key 865 and break contacts 872 to battery through the distributor motor magnet 871, which is not otherwise affected, since insufficient current flows over this circuit to operate it.

Finder start relay 850 operates however, and at break-make contacts 851 disconnects the busy wiper 877 and closes an alternative circuit for itself, shunting break contacts 866. Relay 850 also, at make contacts 852 prepares a finder stopping circuit, at make contacts 853 prepares a finder interrupter circuit, at make contacts 855 closes an alternative circuit for start relay 840 from ground on conductor 792, which is independent of break contacts 713 on the all-links-busy relay, and at make contacts 854 closes a circuit for the vertical magnet 210 of the preselected idle finder, by way of break contacts 821, 813 and 839, distributor wiper 876, conductor 253 and the winding of magnet 210 to battery. Reset relay 825 is also energized momentarily over this circuit, in multiple with magnet 210, but due to being made slow to operate, remains at normal for the time being.

The finder vertical magnet 210 upon operating raises its shaft and wipers including rotary wipers 60, 61, 62 and 63 and vertical wipers 291 and 292 one step, and at the same time closes its vertical-off-normal springs 235. Off-normal contacts 236 thereupon close a point in the all-links-busy circuit, contacts 237 prepare the finder release circuit, and contacts 238 pass busying ground to the distributor wipers 877 and 977. Wiper 877 is now open at break contacts 851, but the ground on wiper 977 passes through break contacts 951 and 966 to the motor magnet 971, through the interrupter springs 972. The rotary switch 970 thereupon advances quickly to find the next free link, which having no ground on its busying conductor 259, will cause rotary switch 970 of the second distributor to stop.

The finder vertical magnet 210 also, at its make contacts 211 closes a circuit for interrupter relay 820 by way of conductor 252 and make contacts 853. Relay 820 thereupon operates and at break contacts 821 opens the circuit of relay 825 and magnet 210. Vertical magnet 210 then restores and releases relay 820 which in turn causes the re-operation of magnet 210, which thereupon raises its shaft and wipers a second step. This action continues at high speed until vertical wiper 291 in the finder reaches the marked No. 6 contact in the vertical bank 290, thereby closing a circuit to the stopping relay 830 in the distributor. Relay 830 now has ground on both sides of its winding, from wiper 291 and make contacts 211 on the finder vertical magnet. As soon as vertical magnet 210 restores however, following the sixth vertical step, the opening of contacts 211 removes the shunt from relay 830 which immediately operates in series with interrupter relay 820 and locks the latter operated, over the following circuit: marking ground from conductor 34 on the 6th contact of the finder vertical bank, wiper 291, conductor 251, distributor wiper 878, make contacts 852, break contacts 837, winding of relay 830 and the upper winding of relay 820 to battery.

Stopping relay 830 upon operating, causes the operation of vertical transfer relay 835 which promptly locks by way of its preliminary make contacts 836 to ground at make contacts 843. Relay 835 also, at break-make contacts 839 disconnects the vertical stepping circuit and prepares the rotary stepping circuit, at make contacts 838 prepares a rotary stopping circuit, and at break contacts 837 opens the circuit of relays 830 and 820 which restore. Ground from make contacts 854 now again passes through break contacts 821, and causes the operation of the finder rotary magnet 220, by way of break contacts 813, make contacts 839, wiper 875, and conductor 254. Make contacts 221 on the rotary magnet then cause the operation of interrupter relay 820, which in turn releases the magnet 220 which thus continues to operate intermittently at high speed and rotates the wipers 60, 61, 62 and 63 into their banks in search of the calling line.

When therefore, the test wiper 62 encounters the test conductor of the calling line, battery thereon from the upper winding of line relay 130 causes the operation of the test relay 815 over the following circuit: ground from make contacts 845, through make contacts 838, lower winding of interrupter relay 820 whose upper winding is also energized at about the same time from contacts 221, winding of relay 815, distributor wiper 873, conductor 264, break contacts of the make-before-break springs 243, finder wiper 62, line test conductor 32, make contacts 133 and the upper winding of relay 130 to battery. The line relay is not affected, due to the high resistance of this circuit, but the relays 820 and 815 whose affected windings have many turns of fine wire, do operate, and relay 820 opens the stepping circuit as before, at break contacts 821.

Test relay 815 upon operating, at make contacts 816 passes ground from make contacts 843 to trip relay 810 which operates and locks to ground at make contacts 843, through preliminary make contacts 812. Test relay 810 also at make contacts 811 causes the operation of the finder switching relay 240 from ground at make contacts 842, by way of distributor wiper 874 and conductor 265. Relay 810 further, at break contacts 813 opens both stepping circuits, at make contacts 814 connects another source of ground to the "in" terminal of the operated distributor start relay 840, and at make contacts 813 closes a circuit to the slow to operate reset relay 825, which operates after a short delay. Reset relay 825 thereupon at make contacts 826 energizes the left hand coil of the polarized change over relay 860, but this is without effect as relay 860 is already operated in this direction. Relay 825 also at make contacts 827 connects ground to the "out" terminal of the distributor start relay, thereby shunting this relay which restores and releases relay 850 and the other operated relays in the distributor. Break contacts 851 thereupon pass finder off-normal ground from conductor 259 and the distributor wiper 877 to motor magnet 871, by way of break contacts 866 and 872, and the distributor rotary switch 870 thereupon advances its wipers in search of the next idle link, and stops when wiper 877 fails to find ground. Thus as long as keys 865 and 965 are not operated, both distributors will when idle always be connected to an idle link.

Meanwhile, the operation of the switching relay 240 in the finder extends the calling line to the associated selector, and causes the operation of the selector line relay 310 over the calling line loop, by way of the finder line wipers 60 and 61, make contacts 241 and 242, conductors 260 and 261, and break contacts 351 and 352. Relay 240 also at make contacts 244 prepares a locking circuit for itself, at break contacts 243 disconnects the circuit to the distributor test relay 815, and at make contacts 243 connects direct ground to the finder test wiper 62. This causes the complete operation of the calling station line relay 130, which accordingly opens break contacts 131, 132 and 135 to clear the line for dialling, and to remove the marking ground from conductor 34.

In the selector, the operation of the line relay 310 causes the operation of the release relay 320 and the release slave relay 330, in obvious manner, relay 320 passing back locking ground to the finder switching relay 240 over conductor 263. Release slave relay 330, at make contacts 331 starts the generator, not shown, at make contacts 332 and 333 prepares circuits for the restrict and cut-through relays 380 and 350, at break-make contacts 334 closes a point in the rotary circuit and opens a point in the release circuit, at make contacts 336 prepares the vertical stepping circuit, and at break contacts 337 opens a point in the "right-of-way" or monitor circuit, now open also at cam springs 239 which open on the second rotary step of the finder and remain open until the finder releases. Relay 330 further, at make contacts 335 closes a dial tone circuit from the dial tone lead shown at the lower right in Figure 3, which circuit extends through break contacts 361 of the vertical-off-normal springs 360, make contacts 335 and condenser C1 to the lower winding of the line relay 310, from whence it is induced into the other windings of this relay and so into the calling line.

The calling party upon hearing the dial tone proceeds to dial the call number of the wanted station, which will be assumed to be "253." Upon the dialling of the first digit "2" of this number therefore, the selector line relay 310 restores and re-operates twice, in unison with the dial pulses. At each release, vertical magnet 375 operates from ground at break contacts 311, through make contacts 336 and break contacts 367 on the rotary off-normal springs 365, and raises the selector rotary and vertical wipers two steps. The interrupter relay 340 operates on the first pulse, in multiple with the vertical magnet, by way of break springs 368 on the rotary-off-normal springs 365. Relay 340, at break contacts 342 opens a point in the busy tone circuit, at break contacts 341 opens a point in the rotary circuit, and at make contacts 341 short circuits its lower winding, which then acts like a copper slug or sleeve over the core and makes this relay slow to release. Relay 340 therefore remains operated during the vertical stepping as does release relay 320, which has a slug on its core. The restrict relay 380 and the vertical-off-normal springs 360 also operate on the first step, the former from vertical wiper 391 by way of make contacts 332, and the latter from the switch mechanism, in known manner. Make contacts 381 thereupon close a point in the rotary circuit, and break contacts 382 open a point in the busy tone circuit, while in the vertical-off-normal, break springs 361 open the dial tone circuit, make springs 362 prepare a busy tone circuit, make springs 363 place a second ground on the busying conductor 259 to assure that both selector and finder will be again normal before this link is marked idle at the distributor, and make springs 364 prepare the rotary stepping circuit.

Following the last pulse of the first digit, interrupter relay 340 restores after a slight delay, and at break contacts 341 closes a circuit to the rotary magnet 376 as follows: ground from vertical-off-normal springs 364, break contacts 357, make contacts 334, break contacts 341, make contacts 381, and the winding of magnet 376 to battery. The rotary magnet operates over this circuit and rotates its wipers 70, 71, 72, and 73 into the banks at the second level, in search of an idle connector in the 200 group. The rotary-off-normal springs 365 operate on the first relay step, whereupon break springs 366 disconnect the lower winding of interrupter relay 340, so that this relay is no longer slow to release, while break springs 367 and 368 open the pulsing and vertical magnet circuits.

If the first connector in the selected group of connectors is busy, ground on its test conductor will cause the re-operation of interrupter relay 340, by way of test wiper 72, break contacts 356, and make contacts 377 on the operated rotary magnet to the upper winding of relay 340. Relay 340 at break contacts 341 opens the circuit of the rotary magnet which restores, and releases relay 340. Ground from vertical-off-normal springs 364 now again passes through contacts 357, 334, 341 and 381 and re-operates the rotary magnet 376 which advances the wipers a second step, and this action continues at high speed until an idle connector is found.

As soon as an idle connector is found, the absence of busy ground therefrom on the test wiper 72, permits the energization of the selector cut-through relay 350, otherwise shunted by this ground, in series with relay 340, over the following circuit: ground from make contacts 321 on the release relay, winding of relay 350, make contacts 333, make contacts 377 on the operated rotary magnet 376, and the upper winding of relay 340 to battery. The interrupter relay 340 having a comparatively low resistance and a small number of turns, does not operate over this circuit, but the cut through relay 350, having a high resistance and a large number of turns, does operate.

Cut-through relay 350 upon operating, at preliminary make contacts 354 locks direct to battery from the relay 340 preparatory to the release of the rotary magnet, at break contacts 357 opens the rotary circuit and releases the rotary magnet, and at break-make contacts 356 transfers the test wiper 72 to its own "in" terminal preparatory to the release of relay 320. Relay 350 further, at break contacts 351 and 352 disconnects the selector line relay, and at make contacts 351 and 352 extends the calling line free of attachments to the selected connector, whose line relay 410 quickly operates over the calling line loop, and causes the operation of the associated release and release slave relays 420 and 430 in obvious manner. The selector line relay 310 releases upon the opening of break contacts 351 and 352, followed by relays 320 and 330 after a slight delay, during which the connector returns ground over the test conductor to hold the cut-through relay 350 and the finder switching relay 240.

Should all of the connectors in the 200 group be busy, the selector will rotate completely off the level, and on the 11th step cam springs 370 will close. Make springs 371 thereupon connect busy tone to the bottom winding of line relay 210 through make contacts 335, and this tone is thereby induced into the other windings, and so into the calling line, in the same manner as dial tone. Cam springs 372 and 373 at the same time shunt break contacts 351 and 352 to hold the line relay operated independently of relay 350, which operates from release relay ground in series with relay 340 in the manner previously described, as soon as the wipers step off the bank and thereby break the ground connection to the test wiper 72. Relay 350 upon operating, at break contacts 357 opens the rotary circuit and releases the rotary magnet. When the calling subscriber hangs up on hearing the busy tone, relays 310, 320, 330 and 350 restore, and release magnet 378 operates from ground at vertical-off-normal springs 364, through break contacts 357 and 334. The release of relay 320 also unlocks the finder switching relay 240, which closes the circuit to the finder release magnet from ground at break contacts 245 through vertical off normal springs 237, to supervised battery in a supervisory circuit, not shown, by way of conductor 266 and break contacts 941 and 841 on the distributor start relays. The release of the finder can take place, therefor, only when the distributors are at normal. This is done to prevent interference with a call in process of seizing an idle finder.

It being assumed however, that a connector such as that of Figures 4 and 5 is available, the selector switches through, as stated in the second last paragraph, and the connector line relay 410 operates over the calling line loop, as previously stated, and quickly operates release relay 420, which in turn operates the release slave relay 430. Relay 430 upon operating, at make contacts 431 grounds test conductor 76 to hold the selector and finder as previously explained, at break contacts 432 disconnects the hold relay 440, at make contacts 433 prepares a locking circuit for the test and ring-cut-off relays, at make contacts 434 closes a point in the pulsing circuit, at make contacts 435 prepares the rotary hunting circuit, which is not required on the present call however, and at make contacts 436 prepares the monitoring circuit also not involved on the present call. Relay 430 further, at break-make contacts 437 opens a point in the release circuit, and completes a circuit to the vertical transfer relay 510 as follows: ground from make contacts 437, conductor 471, break contacts 571 on the vertical-off-normal springs 570, and the upper winding of relay 510 to battery. Relay 510 operating over this circuit, at break contacts 511 disconnect the rotary transfer relay 450, at make contacts 512 prepares a circuit to its own lower winding and the vertical magnet, at make contacts 513 opens a point in the rotary hunting circuit, at make contacts 514 closes a point in the test circuit, which is without effect at this time, at break contacts 515 opens a point in the ringing circuit, and at break contacts 516 opens a point in the busy and warning tone circuits.

The dialling of the second digit "5" of the call number "253" now causes the connector line relay 410 to release and re-operate five times, in response to the dial pulses. At each release, break contacts 412 close momentarily but without effect, due to open contacts at the rotary-off-normal springs. Make contacts 411 also open momentarily at each pulse, but release relay 420 being slow to release, remains operated. Break contacts 411 however, upon each release pass a ground pulse to the vertical magnet 460, which responds and raises the shaft, not shown, and the associated wipers 90, 91 and 92, shown at the upper right in Figure 5, five steps. The vertical magnet circuit may be traced as follows: ground at break contacts 411, make contacts 434, conductor 496, break contacts 524, conductor 495, break contacts 452, conductor 494, make contacts 512, lower winding of vertical transfer relay 510 which being slow to release is held operated by the pulses, break contacts 562 on the rotary-off-normal springs 560, conductor 476, and the winding of magnet 460 to battery. The rotary control wiper 482 is also raised five steps, but this is without interest at this time.

The vertical-off-normal springs 570 operate on the first vertical step, whereupon make springs 573 ground start circuit to the ringing and tone generator, not shown, make springs 572 prepare the release circuit, and break-make springs 571 open the circuit to the upper winding of vertical transfer relay 510 and prepare a circuit to the upper winding of the rotary transfer relay 450. When therefore, relay 510 restores, shortly after the last vertical step, break contacts 511 thereof complete a circuit for the operation of relay 450 as follows: ground from make contacts 437, conductor 471, make springs 571, break springs 563, break springs 511, and the upper winding of relay 450 to battery. Relay 450 upon operating over this circuit, at make contacts 451 shunts break contacts 511 preparatory to the re-operation of relay 510, at break-make contacts 452 opens the vertical pulsing circuit and prepares the rotary pulsing circuit, at break contacts 453 and 454 opens points in the locking and pull up circuits to the monitor relay, at break contacts 455 opens a point in the test circuit, and at make contacts 456 causes the re-operation of relay 510, whose break contacts 513, 515 and 516 again open points in the rotary hunting, ringing, and tone circuits, while make contacts 514 again close a point in the test circuit.

The dialing of the last digit "3" of the call number "253" now causes line relay 410 to release and reoperate three times. At each release, break contacts 411 pass a ground pulse to the rotary magnet 465 which responds and rotates the line and test wipers 90, 91 and 92 three steps into the fifth level of the connector banks. Rotary control wiper 482 is also rotated into its bank at the same time, but this is without effect on the present call. The circuit for the rotary magnet is from ground at break contacts 411, through make contacts 434, conductor 496, break contacts 524, conductor 495, make contacts 452, lower winding of rotary transfer relay 450, and the winding of rotary magnet 465 to battery. Rotary transfer relay 450, which is made slow to release, is held operated by the pulses through its lower winding, independently of its upper winding. Also, make contacts 466 close at each operation of the rotary magnet, but this is without effect at this time, due to open contacts 453 and 513 on the rotary and vertical transfer relays.

The rotary-off-normal springs 560 operate on the first rotary step, whereupon make springs 561 and 565 prepare operate and locking circuits for the monitor relay 520, which is however not affected by the present call, break springs 562 disconnect the vertical magnet, make springs 563 prepare the test circuit, and break springs 563 open the circuit to the upper winding of rotary transfer relay 450, which is now held operated by the pulses from the line relay passing through its lower winding. When therefore relay 450 restores, shortly after the last rotary step, make contacts 452 disconnect the rotary stepping circuit, break contacts 455 complete the test circuit, and make contacts 456 open the operate circuit of vertical transfer relay 510, which accordingly restores, but only after a slight delay sufficient to allow the operation of the test circuit.

If the called station is busy, ground from the line equipment thereof is now on the test wiper 92 and prevents the operation of test relay 550. As soon as the vertical transfer relay 510 restores therefore, following the final digit, break contacts 516 thereof close a busy tone circuit which may be traced from the busy tone conductor at the lower center in Figure 5, through break contacts 527, 557 and 516, make springs 564 on the rotary-off-normal springs, break contacts 547, conductor 474, condenser C2 and the lower winding of line relay 410, from where it is induced into the calling line through the other windings in the same manner as for the selector dial tone.

If the called station is idle however, battery from the called station's line relay will be on the test wiper 92, with no "shunting" busy ground. During the interval between the release of rotary transfer relay 450 and vertical transfer relay 510 following the last digit, therefore, test relay 550 partly operates, in series with line relay 140 over the following circuit: ground from make contacts 437, conductor 471, make springs 571 and 563, make contacts 514, conductor 470, break contacts 455, conductor 499, lower winding of relay 550, test wiper 92 and the bank contact on which it is resting, cable CA3, test normal conductor 47 in Figure 1 and the upper winding of the called station line relay 140 to battery. Relay 140 upon operating, clears the called line for ringing, while relay 550, operating fully following the closure of its preliminary make contacts 552, at make contacts 554 connects direct ground to the test wiper to make this line busy to other calls. Relay 550 also, at make contacts 551, 553 and 557 prepares the ringing circuit, at break contacts 554 removes ground from the automatic rotary circuit, at break contacts 555 disconnects the monitor relay, at break contacts 556 opens a point in the release circuit, and at break contacts 557 opens the busy tone circuit.

When relay 510 eventually restores therefore, break contacts 515 thereof connect interrupted ringing current from conductor 558 to the called line over the following circuit: ringing generator, not shown, conductor 558, break contacts 515, lower winding of the ring cutoff relay 540, break contacts 545, make contacts 553, negative line wiper 91 and the contact on which it stands, the cable CA3 to Figure 1, negative normal conductor 46, line conductor 41, through the ringer, not shown, at substation D, back over line conductor 40, positive normal conductor 45, cable CA3 again to the bank contact on which the positive line wiper 90 is standing, wiper 90 and make contacts 551, to ground at break contacts 543. The ringer at the called station thereupon rings intermittently, in known manner, but relay 540 being made slow to operate, is not affected by the ringing current. At the same time break contacts 516 close the ring-back circuit whereby a portion of the ringing current is passed to the lower winding of line relay 410 for induction into the calling line, in the manner already described. This circuit is from conductor 558, through make contacts 557, break contacts 516, make springs 564, break contacts 547, and conductor 474 to the line relay, through the low capacity condenser C2.

When the called station answers, the closure of the line loop causes the immediate operation of ring cutoff relay 540 over said loop and the previously traced ringing circuit, from superimposed battery at the ringing generator, in known manner. Relay 540 thereupon, at preliminary make contacts 544 locks to ground on conductor 491, at break contacts 547 opens the ring back circuit, at break contacts 546 opens the generator start circuit, and at break-make contacts 543 and 545 opens the ringing circuit and closes the circuit of back-bridge relay 530. Relay 530 then operates over the called line loop, and at make contacts 531 and 532 prepares a circuit for hold relay 440, and furnishes a separate source of locking ground for relays 540 and 550. The ring cutoff relay also, at make contacts 541 and 542 completes the talking circuit between the calling and called parties, with talking battery for the calling station furnished from the connector line relay 410 and for the called station from back bridge relay 530. The complete talking circuit may be traced as extending from the calling telephone C, over line conductors 30 and 31 to the associated finder bank terminals not shown, finder wipers 60 and 61, make contacts 241 and 242, talking conductors 260 and 261, make contacts 351 and 352, selector wipers 70 and 71, talking conductors 74 and 75, talking condensers C3 and C4, make contacts 541 and 542, connector wipers 90 and 91, cable CA3, line normal conductors 45 and 46 and line conductors 40 and 41 to the called telephone D.

If the called station hangs up first, back-bridge relay 530 restores, but without effect, and when the calling station hangs up, the connector line relay 410 releasing, causes the release of relays 420 and 430. Relay 430 in turn, at make contacts 431 and 433 opens the locking circuits of the connector ring cutoff and test relays 540 and 550, the selector cut through relay 350, and the finder switching relay 240 and all of these relays release and close the circuits of their respective release magnets 468, 378 and 230, which operate and restore their switches to normal. The release circuit for the connector is from ground at break contacts 437, over conductor 473, break contacts 556, VON springs 572, conductor 477 and the winding of the release magnet to battery; the selector release circuit is from ground at VON springs 364, through break contacts 357 and 334; and the finder release circuit is from ground at break contacts 245, through VON springs 237. In the connector, break-make springs 469 on the release magnet ground the test conductor 76 to keep the switch marked busy until it has completely released.

If the calling station hangs up first, the finder and selector release, but the connector is held operated. Thus, when the calling party hangs up under these conditions, the connector line relay 410 restores and releases relays 420 and 430 as before, but now since the back bridge relay 530 is still held operated from the called line, the opening of make contacts 433 has no effect on relays 540 and 550, which remain locked to back-bridge-relay ground on conductor 491. The opening of make contacts 431 however removes ground from test conductor 76 leading back to the selector and finder, and these two switches release, in the manner explained in the preceding paragraph. At the same time, the closing of break contacts 432 completes a circuit to hold relay 440, from ground at make contacts 531, by way of conductor 490. Relay 440 is made slow to operate however, and its operation is delayed for a brief interval sufficient to permit the release of the selector and finder. When relay 440 operates eventually, its break-make contacts 441 disconnect the ground from break contacts 469 from the line relay and connect it to the test conductor 76 to mark this connector still busy. When the called party finally hangs up, the back bridge relay restores and releases relays 440, 540 and 550, and the latter closes the release circuit as before to release the connector.

*Local call right of way service*

The privilege of cutting in on a busy connection, otherwise known as "monitoring," "call offering," or "executive-right-of-way" service, depending on the purpose, is reserved for the attendant and night stations, and a limited number of other privileged stations, up to a total of ten in each hundreds group. This is done by connecting such stations to the first bank contact of their respective levels in the line banks of the associated linefinder switches, and by grounding the vertical bank contacts corresponding to such levels in the right hand row of contacts in the finder vertical bank 290. In Figure 2, the 1st and 9th contacts are shown grounded in this manner, and it will be assumed that the operator's line, which is the bottom line in Figure 1, is connected to the first contacts in the 1st level of the finder line banks, and that substation A, which is shown at the top in Figure 1, is connected to the first contacts of the 9th level.

Assuming therefore, that station A now makes a call to station D while the latter is still engaged with the call from station C described in the preceding section, the removal of the receiver or handset at A causes the operation of the associated line relay 110 which closes its preliminary make contacts 113 and 114 to mark the 9th level in the finder vertical bank, and to again operate start relay 750 by way of resistor R9 and start conductor 250. Relay 750 thereupon seizes the distributor, assuming that the latter is now free and connected to an idle linefinder, and the distributor thereupon causes the finder to step up nine steps and in one, in the same manner as described for the previous call. Finder cam springs 239, which open only on the second rotary step, remain closed, to prepare the monitoring circuit.

When the calling line is found, distributing relays 815 and 810 cause the operation of the finder switching relay 240 as before and this relay switches the calling line through to the selector, completes the operation of line relay 110, and releases the distributor, which moves on to the next idle line. The selector now returns dial tone, and the calling station proceeds to dial the call number "253" of the wanted station. Upon the dialling of the first digit the selector rotary and vertical wipers step up two steps as before, and vertical wiper 392 closes another point in the monitoring circuit. The rotary wipers then rotate automatically, and when an idle connector is found, the selector switches through as before, and releases relays 310, 320 and 330.

In response to the final two digits "5" and "3," the connector steps up five and in three, as before, onto the contacts of the busy substation D, with relay 510 again operated during the first digit, and both relays 510 and 450 during the second digit, just as previously described. Since the called line is busy, test relay 550 remains normal, and on the release of relays 510 and 450 shortly after the last pulse, break contacts 516 complete the busy tone circuit by way of the previously traced path through break contacts 527, 557 and 516, RON springs 564, break contacts 547 and conductor 474, while break contacts 453 and 454 make the final preparations for the monitoring circuit.

The calling party upon hearing the busy tone, may now break in on the existing connection if desired, by dialling an extra digit, preferably a "1," though it may have any value. When the connector line relay 410 restores momentarily in response to this digit, its break contacts 411, formerly effective, are now ineffective, due to the released condition of relays 450 and 510, but break contacts 412, formerly ineffective, are now effective, and complete a circuit to the monitor relay 520. This circuit may be traced as follows: ground on the finder vertical wiper 292 from the 9th level of vertical bank 290, cam springs 239, conductor 258, break contacts 337, and 379, selector vertical bank 390, wiper 392, wiper 73, conductor 77, break contacts 412, make contacts 436, break contacts 454, conductor 498, RON springs 561, break contacts 525 and 555, and the lower winding of relay 520 to battery.

The monitor relay 520 operates partly, over this circuit, and closes its preliminary make contacts 523 to cut in its upper winding. This winding is now shunted by ground on both its "out" and "in" terminals, from break contacts 525 and RON springs 565, and is therefore ineffective for the moment. As soon as line relay 410 re-operates however, it removes the shunting ground from break contacts 525, and both windings of relay 520 are energized in series over the following circuit: ground from break contacts 554, break contacts 513, conductor 497, break contacts 453, conductor 472, RON springs 565, make contacts 523, upper winding of relay 520, break contacts 555, and the lower winding of relay 520 to battery.

Monitor relay 520 now operates fully, and at make contacts 521 and 522 completes a talking connection with the called line. Relay 520 also, at break contacts 525 disconnects the original monitoring circuit, at make contacts 526 again prepares the test circuit, at break-make contacts 527 disconnects the busy tone from the line and connects a monitoring tone indicated as a "tick" tone thereto in its stead. Due to the closed make contacts 521 and 522, this tone is heard by the called party, as a warning that a third party has entered the connection. The parties may converse over this connection, through the tone, which remains on the line, audible to all three parties. If the original parties hang up however, to give priority to the new call, upon request or otherwise, the release of the connection removes the busying ground from the test normal conductor 47 of substation D, and test relay 550 of the connector held by station A will operate in series with the now restored line relay 140, from the ground through make contacts 437 on conductor 471, passing through make springs 571 and 563 and the now closed make contacts 526 on the monitor relay, to conductors 470 and 499. Relay 550 thereupon locks itself up as before, disconnects the warning tone, busies the called line, disconnects the monitor relay which restores, and closes the ringing circuit. The connector now rings, and when station D again comes in on the line, switches through and completes a normal connection through the operation of the ring cutoff and back bridge relays 540 and 530, just as for a regular call.

*Local connector hunting circuit*

To secure automatic line hunting, in the case of a local call to a group of stations all having the same assigned call number, line selection pins are inserted in the proper level of the rotary control bank 480, in positions corresponding to all but the last line of the group, in all local connectors having access to such group. The dialling of this call number therefore, sets the line and test wipers 90, 91, and 92 of the connector employed on the terminals of the first line, and brings the rotary control wiper 482 into contact with the associated first line selection pin, thereby shunting make contacts 466. If the first line is idle, this is without effect, and during the interval between the release of the rotary transfer relay 450 and the vertical transfer relay 510 following the last rotary pulse, test relay 550 operates as previously explained and completes the connection.

If the first line is busy however, busy ground on test wiper 92 shunts relay 550 and prevents its operation. When therefore, relay 510 restores, shortly after the release of relay 450, it re-operates relay 450 over the following circuit: ground from break contacts 554, through break contacts 513, conductor 497, make contacts 435, rotary control wiper 482, the first line selection pin and the metal bank arc, the lower winding of relay 450 and the winding of the rotary magnet 465 to battery. Relay 450 and the rotary magnet thereupon operate in series, and the magnet rotates the wipers another step. Relay 450, at make contacts 456 re-operates relay 510 which in turn opens break contacts 513 to release relay 450 and the rotary magnet, and the process is repeated until an idle line is found, or the switch steps onto the last line of the group. Here, since there is no pin in the corresponding position in the rotary control bank, relay 450 is prevented from re-operating and the switch must either complete the connection or return busy tone, as for any other call.

*All links busy*

If all of the linefinders of a group are engaged, all of the vertical off normal springs 236, 236' etc., thereof will be closed, thereby completing a circuit by way of conductor 255 to the all-links-busy relay 710. Relay 710 thereupon operates, at make contacts 711 prepares a busy tone circuit, at break contacts 712 removes ground from the bank multiples 877' and 977', and at break contacts 713 opens the distributor start circuit.

An additional call at this time, with all links thus busy, will operate start relays 750 and 760 in the usual way, but now the closing of start contacts 762 is without effect, due to the open break contacts 713. Make contacts 761 however, now connect busy tone to the IC3 winding of the busy tone induction coil IC1, by way of make contacts 711 and condenser C5. This tone is thereupon induced into the IC2 winding and thence by way of conductor 106 it passes into the calling line, through the lower winding of the line relay and its upper break contacts, which are still closed, since as previously explained, only the preliminary make contacts marked "X" operate upon the initiation of a call, the line relay operating fully only after the line-finder has switched through. The busy tone is thus made audible to the new calling line only, since all of the line relays associated with the busy finders are fully operated and therefore have their upper break contacts open. As soon as one or more of them hang up, the release of the finder or finders involved opens the all-links-busy chain and relay 710 restores and removes the busy condition.

*Distributor transfer*

To cut in the second distributor, in Figure 9, it is only necessary to disconnect the first distributor by operating the transfer key 865 shown at the lower right in Figure 8, while leaving key 965 normal. Break springs 866 thereupon open the circuit to motor magnet 871, while break springs 867 open the operate circuit of distributor start relay 840. The next call originating in this group accordingly causes the operation of the distributor of Figure 9 in the following manner.

Upon the initiation of the call, the operation of start relays 750 and 751 puts ground on conductors 791 and 792 leading to the distributors, as previously explained. The ground on conductor 792 is ineffective at the moment, due to the open make contacts 855 and 955, but the ground on conductor 791 causes the operation of distributor start relay 940 by way of make contacts 861, make springs 867 on the operated transfer key 865, conductor 894, and the winding of relay 940 to battery through the resistor R15.

Relay 940 upon operating, at break contacts 946 opens the circuit to distributor start relay 840 to prevent interference, and at make contacts 944 causes the operation of finder start relay 950 in series with motor magnet 971, which does not operate. Relay 950 upon operating at make contacts 951 shunts break springs 966 on transfer key 965, again to prevent interference, at make contacts 955 locks relay 940 to the ground on conductor 792, and at make contacts 954 passes ground through break contacts 921, 913 and 939 and distributor wiper 976 to the vertical magnet of the preselected finder which operates. The vertical magnet now operates interrupter relay 920, which releases the vertical magnet, and this action continues until the finder reaches the marked level when stop relay 930 is operated, by way of distributor wiper 978. Stop relay 930 then operates transfer relay 935, which locks and transfers the interrupter circuit to the finder rotary magnet. The finder now rotates as before until the calling line is found, when test relay 915 operates in series with relay 920 and the substation line relay over distributor wiper 973, in the same manner as previously explained for the other distributor.

Test relay 915 operates trip relay 910. Trip relay 910, at make contacts 911 closes a circuit to the finder switching relay to extend the connection to the selector as before, and at make contacts 913 closes a circuit to the slow to operate reset relay 925, which operates after a short delay. Relay 925 at make contacts 927 shunts down start relay 940 to release the distributor, and at make contacts 926 closes a circuit to the right hand coil of the polarized relay 860 which thereupon reverses its contacts. As soon as relay 950 restores, busy ground on wiper 977 causes the distributor to advance automatically to the next idle link.

Since the change-over relay 860 is now operated to the right, the distributor start ground, on subsequent calls will pass to relay 940 by way of make contacts 862 conductor 891, break springs 967, conductor 893, break contacts 846 and conductor 894. With the exception of the first call, the action is thus seen to be identical with that described for the first distributor. Due to the open springs 866 however, the motor magnet 871 cannot operate to keep in step with motor magnet 971, but will remain stationary as long as key 865 remains operated.

If key 865 is restored, any time after the first call has tripped the polar relay, motor magnet 871 will resume its preselecting function, although its wipers will not necessarily stop on the same idle link as the other distributor switch. To replace the first distributor in service it is only necessary to restore key 865 to normal if this has not been done, and to operate key 965 and to leave it operated until at least one call has been handled. In case of a defective distributor, operating its key takes it out of service.

*Privileged outgoing trunk calls*

Outgoing calls over a trunk direct to the main exchange, here assumed to be automatic, can be made, as previously stated, only by those privileged stations, such as A and B, having a ground marking on their outgoing EC conductor. Other stations may call the P. A. B. X operator, but cannot be connected to a trunk.

If station B for example, wishes to make an outgoing call, all that is required is the removal of the receiver and the dialling of the single digit "0." Upon the removal of the receiver at station B, line relay 120 operates over the calling line and closes its preliminary make contacts 123 and 124, thereby placing ground on conductor 24 to start the distributor. The distributor thereupon drives the preselected finder to the 8th level, marked by the grounded conductor 24, and rotates its wipers 60, 61, 62 and 63 in on this level as described for a local call, until the wiper 62 encounters the battery from line relay 120 on the test conductor 22, when the finder stops and switches through to seize the associated selector.

Selector relays 310, 320 and 330 now operate and return dial tone to the calling party, who thereupon dials the stated digit "0." The selector accordingly steps up ten steps, with interrupter relay 340 operating as before on the first step, in parallel with the vertical magnet, and remaining operated during the pulsing by virtue of its temporarily short circuited lower winding. Restrict relay 380 also operates as before on the first step, from the ground markings on the vertical bank through vertical wiper 391, and being inherently slow to release, also remains operated during the stepping.

On the 10th vertical step, wiper 391 picks up the ground from the calling station B's marked EC conductor 23 in Figure 1, now extended through the finder EC wiper 63, conductor 262, and break contacts 353 to the top left contact in vertical bank 390. The restrict relay 380 therefore remains operated, and on the release of interrupter relay 340, shortly after the last pulse, the rotary magnet 376 operates, from ground on VON springs 364 and rotates the wipers 70, 71, 72 and 73 in onto the 10th level, in search of an idle trunk.

Busy trunks being marked by ground on the C or test conductor, and idle trunks by absence of this ground, the selector now hunts for an idle trunk in the same manner as for an idle connector. Thus if the first trunk is engaged ground on its test conductor passing through test wiper 72, shunts the cut-through relay 350 and re-operates interrupter relay 340. This releases the rotary magnet, which releases the interrupter relay, which re-operates the rotary magnet, and advances the wipers to the next trunk. This action is repeated until an idle trunk is found when the absence of ground on test wiper 72 removes the shunt from cut-through relay 350 and this relay operates in series with relay 340, which does not re-operate however, in this circuit.

Cut-through relay 350 locks itself operated, at break contacts 357 releases the rotary magnet, at break-make contacts 356 transfers the test wiper from its lower terminal to its upper terminal, and at break make contacts 353 transfers the ground marking on EC conductor 262 from the left vertical bank to the right vertical bank, thereby extending this marking to the trunk, and disconnecting it from relay 380, which accordingly restores, after a short delay. Cut-through relay 350 further, at contacts 351 and 352 disconnects the selector line relay, causing its release, and extends the calling line through to the selected trunk, such for example as the one shown in Figures 10, 11 and 12.

Upon the extension of the calling line to the trunk, the trunk pulsing relay 1185 operates, from ground and battery through its upper windings, through both windings of control relay 1180, which being connected differentially does not operate, conductors 1004 and 1006, break contacts 1056 and 1057, conductors 80 and 81, cable CA2, the selector line wipers 70 and 71, make contacts 351 and 352, talking conductors 260 and 261, make conacts 241 and 242, and the finder line wipers 60 and 61 to the calling line. Line relay 1185 thereupon, at make contacts 1186 prepares to short the outgoing end of the trunk, and at make contacts 1187 operates the hold relay 1210 over conductor 1104.

Hold relay 1210 upon operating, at make contacts 1211 connects ground to the test conductor 82 to lock up the selector and finder, and to make this trunk busy to the other selectors. This circuit is from ground at break contacts 1144, over conductor 1283, back contacts 1271, make contacts 1211, conductor 82 left, cable CA2, test wiper 72, and make contacts 356 to conductor 263, thereby locking up relays 350 and 240. Hold relay 1210 also, at break contacts 1213 disconnects the guard relay 1170, and at make contacts 1212 operates the hold A relay 1220, in obvious manner.

The hold A relay 1220 upon operating, at break contacts 1221 disconnects ring-up relay 1240 from the trunk line, and at make contacts 1221 and 1222 connects a seizing bridge thereto in its place, which may be traced from the positive trunk conductor 1290, make contacts 1221, conductor 1103, break contacts 1152 and 1142, the inductive resistor IC4, make contacts 1186, break contacts 1153, conductor 1106 and make contacts 1222 to the negative trunk conductor 1291. This will cause the seizure of an incoming switch at the automatic central office, which will return dial tone over the trunk. Relay 1220 also, at make contacts 1223 causes the operation of the hold B relay 1230, and at make contacts 1224 energizes the lower winding of the restrict relay 1050. Relay 1050, being wound differentially, cannot operate at this time however, due to its upper winding being also energized at approximately the same time from the direct ground marking on the calling station's EC conductor 23 in Figure 1, by way of finder wiper 63, conductor 262, make contacts 353, upper right contact of vertical bank 390, vertical wiper 392, wiper 73, and the EC conductor 83 through cable CA2 and the upper winding of relay 1050 to battery. The hold A relay 1220 finally, at make contacts 1225, lights the trunk busy lamp L1 at the attendant's position, in Figure 16, from ground at break springs 1671 on the night key 1670, by way of conductors 1697 and 1698. Break-make springs 1226 also operate, but without effect at this time.

The hold B relay 1230 upon operating from the hold A relay, at break contacts 1231 opens another point in the trunk line connection to the upper winding of the ring-up relay 1240, at make contacts 1232 prepares a circuit for the lower winding of relay 1240, and at make contacts 1233 prepares a circuit for the pulse loop relay 1130 in readiness for dialling. Relay 1230 also, at make contacts 1234 passes test conductor ground to conductor 1284 leading to the incoming link finder of Figure 10, at make contacts 1235 prepares a grounding circuit for conductor 1294 leading to the attendant's position, at make contacts 1236 prepares a circuit for the upper winding of call transfer relay 1150.

The calling station, upon hearing the dial tone from the central office, proceeds to dial the number of the desired city subscriber. The trunk pulsing relay 1185 releases and re-operates at each pulse and at make contacts 1186 repeats these pulses to the central office, which responds by completing the connection to the wanted subscriber thereat. At the first release of relay 1185, break contacts 1187 thereof close a circuit to pulse-loop relay 1130 by way of conductor 1109, make contacts 1233 and conductor 1194. Relay 1130 thereupon operates, and being made slow to release, as by the use of a copper slug and a short circuiting winding closed by its make contacts 1134, remains operated during each series of pulses. Relay 1130 at each operation, opens the talking circuit at break contacts 1131 and 1133, and at make contacts 1132 shunts the inductive resistor IC4 with the non-inductive resistor R21 to improve the pulsing. The other contacts of relay 1130 have no further function at this time.

*Privileged outgoing toll calls*

Toll calls to other cities can be made direct by dialling through the main office, without the aid of any operators, as previously indicated, only by those privileged stations such as A, having their outgoing EC conductor grounded through a resistance. Other privileged stations must make such calls through an operator at the central office.

Station A for example, to make such a call, has only to dial an "0" as in the previous call, and upon hearing the second dial tone, proceeds to dial the number of the wanted distant party, whereup the central office equipment extends the connection and computes the toll charges thereon as and if necessary. Upon the removal of the receiver at station A, the line relay 110 operates over the calling line and closes its preliminary make contacts 113 and 114, thereby grounding conductor 14 to start the distributor. The distributor thereupon steps the preselected linefinder to the 9th level, marked at the vertical bank by the grounded conductor 14, and rotates its wipers 60, 61, 62 and 63 in on this level in the same manner as described for a local call, until test wiper 62 finds the battery from the upper winding of the line relay 110 on the line's test conductor 12, when the finder stops as before, switches the calling line through to the selector, and causes the complete operation of line relay 110.

The selector now returns dial tone and the calling station dials the digit "0" as in the previous call to seize a trunk. The finding of an idle trunk causes the selector to switch through on the 10th level as in the previous call, thereby operating the seized trunk pulsing and hold relays 1185, 1210, 1220, and 1230 as before. This time however, restrict relay 1050 also operates, since its upper winding is now energized from EC ground through the resistor R11 in Figure 1, while its lower winding is energized from direct ground at make contacts 1224. The resistor R11 reduces the current flow through the upper winding of relay 1050 sufficiently to permit it to operate from its lower winding. Relay 1050 thereupon at make contacts 1051 prepares a toll dialling control circuit.

Meanwhile, the operation of the trunk pulsing and hold relays 1185 and 1220, as previously explained, closes a dialling loop to an incoming switch at the central office, where it terminates in a line relay like relay 1185 in series with a differential control relay similar to relay 1180. The distant line relay operates, upon the closure of the dialing loop, and causes the return of dial tone, but the control relay does not operate, since its windings are in opposition.

When the calling party dials the first digit of the toll number however, the first pulse again causes the operation of the pulse loop relay 1130, and this relay at make contacts 1137 grounds the positive trunk conductor 1290, thereby unbalancing the distant control relay and permitting it to operate to prepare the toll dialling circuits. The local portion of the circuit for this unbalancing or control ground is from break contacts 1157, over conductor 1196, make contacts 1051, conductor 1216, break contacts 1208, conductor 1218, make contacts 1137, conductor 1103, and make contacts 1221 to trunk conductor 1290. Make contacts 1186 on the trunk line relay 1185, now pulse this ground out over the negative trunk conductor 1291 for the control of the distant switches.

*Overflow outgoing trunk calls*

If all of the first choice trunks connected to the first eight contacts in the 10th level of the selector banks are busy, any selector hunting in this level in response to the dialling of an "0" thereto from a privileged station, will automatically rotate to the 9th bank contacts, connected to an overflow trunk selecting unit, such as that of Figure 6, by way of the cable CA1. If this unit is busy, ground on its test conductor 86 will cause the selector to step to the 10th contacts connected to a second such trunk selecting unit. If this is also busy, the selector rotates off the level and gives the busy signal. If either unit is idle however, the absence of busy ground on its test conductor will permit the selector to switch through.

As soon as the selector switches through, line relay 620 operates, from ground and battery through its upper and lower windings, by way of break contacts 611 and 612, conductor 84 and 85 through cable CA1, selector wipers 70 and 71, the calling link and the calling line. Line relay 620 thereupon, at make contacts 621 causes the operation of hold relay 630, from ground at break contacts 615 through back contacts of the off normal springs 647. Relay 630, at make contacts 631 connects ground to the "in" terminal of the cut-through relay 610, at make contacts 632 grounds the test conductor 86 back to the selector to hold the connection and to mark the unit busy, at make contacts 633 connects the test wiper 645 to the "out" terminal of cut-through relay 610 and to the motor magnet 641, at break contacts 633 opens a point in the homing circuit, and at make contacts 634 closes an alternative circuit for the hold relay, independent of break contacts 615.

Upon the closing of make contacts 633, the ground marking on the first or normal contact of the test level passes through the test wiper 645, break contacts 614, make contacts 633, self interrupting springs 641, and the winding of motor magnet 642 to battery. This ground also shunts relay 610 which now has ground on both sides of its winding. The motor magnet operates and releases automatically and this advances the wipers 643, 644, 645 and 646 one step onto the contacts associated with the first overflow or second choice trunk. If this trunk is busy, its test conductor such as 82'' will have ground on it, and the motor magnet will again operate to select the next trunk, this action continuing at high speed until an idle trunk is found. Off normal springs 647 operate on the first step.

When an idle overflow trunk is found by the switch 640, the absence of ground on test wiper 645 will remove the shunt from cut-through relay 610 and this relay will operate from the ground at make contacts 631, in series with the motor magnet, which now receives insufficient current for its operation. Cut-through relay 610 at break-make contacts 611 and 612 disconnects line relay 620 and switches the calling line through to the trunk, at make contacts 613 locks to the ground on conductor 86 from contacts 632, at break-make contacts 614 disconnects test wiper 645 from the motor magnet and connects it to test conductor 86, and at break contacts 615 opens another point in the homing circuit. The selected trunk, which is similar to that of Figures 10, 11 and 12, is accordingly seized over the line wipers 643 and 644, and returns test conductor ground over wiper 645 to hold relay 610 and the selector and finder switching relays. Through-dialling privileges are controlled over the EC conductor 87 and the control wiper 646 in the same manner as described in the preceding sections covering privileged outgoing calls. The line relay 620 restores upon the opening of its circuit by relay 610, and after a slight delay, to permit the trunk to return holding ground, the slow to release hold relay 630 also restores.

When the calling station hangs up, the release of the trunk removes ground from the test conductor 82'', thereby causing the release of the calling selector and linefinder. Cut-through relay 610 also restores, and at break contact 615 closes the homing circuit to the motor magnet 641, through the make contacts of the off-normal springs 647, and break contacts 643 and 642. The motor magnet thereupon buzzes the switch back to the normal or starting position where the off-normal springs open this circuit. The unit is now ready for the next call.

*Incoming Calls*

On an incoming call from the central office to the P. A. B. X, ringing current applied to the selected idle trunk will cause the operation of that trunk's ring-up relay 1240, by way of trunk conductor 1290, break contacts 1221, condenser C10, break contacts 1231 and 1241, the upper winding of relay 1240, and trunk conductor 1291. Relay 1240 at preliminary make contacts 1242 closes a direct current to its lower winding from ground at terminal 1206, by way of break contacts 1232, thereby locking itself operated, and at break contacts 1241 opens the circuit to its upper winding. Relay 1240 also at break contacts 1246 opens a point in the circuit of the call transfer relay 1150, and at make contacts 1245 lights the call lamp for this trunk at the attendant's position. This lamp circuit is from ground at break contacts 1671 on the night service key 1670 at the lower left in Figure 16, over the common conductor 1697, through make contacts 1245 and the individual conductor 1699 to the corresponding lamp such as L3 or L4 in Figure 16, and thence to battery through the pilot relay 1610. The other contacts of the ring-up relay are associated with night service and have no function at this time. The pilot relay 1610 operates in the call lamp circuit, at make contacts 1611 lights the pilot lamp L6, and at make contacts 1612 prepares circuits for the audible signals 1682 and 1695. These latter signals are used only during periods of very light traffic when the attendant if present may not be at the switchboard. At such times if key 1681 is in the operated position, all such calls will operate a buzzer 1695, and if key 1680 is operated the bell 1682 will ring. Both the visual and audible signals and the position itself however, are only in service when the operator's telephone is plugged in at the jack 1678, so that the guard relays 1635 and 1640 are operated in series, from ground at the jack springs 1679.

To answer the call, the attendant operates the answer key corresponding to the calling trunk, such as the key 1655 at the lower right in Figure 16. Key 1655, at break springs 1656 opens a point in a chain circuit through the other answer keys for the attendant's idle test relay 1620, at make contacts 1658 prepares a circuit for the attendant's busy test relay 1615, and at make contacts 1657 closes a circuit to the operator connect relay 1250 in the trunk, which may be traced as follows: ground through resistor R19 and break contacts, 1631, break contacts 1672 on the night key 1670, make contacts 1644, make springs 1657, conductor 1295, and the winding of relay 1250 to battery. Relay 1250 is a marginal relay however, and will operate only if no other answer key is closed at the time.

The operator connect relay 1250 upon operating over this circuit, at break contacts 1257 disconnects the call passing relay 1110, at make contacts 1256 prepares a circuit for the test relay 1620, by shunting the open springs 1656 on the answer key, and at make contacts 1255 completes the circuit to relay 1620, from ground at break contacts 1224, through contacts 1255, conductor 1299, make contacts 1641, conductor 1297, make contacts 1256, conductor 1296, series break contacts corresponding to springs 1656 on the intermediate answer keys indicated by the dotted line 1654, break springs 1651 on the last answer key 1650, and the winding of relay 1620 to battery. Relay 1620 thereupon operates and at break make contacts 1621 disconnects the busy relay and prepares an alternative circuit for itself. The operator connect relay also, at make contacts 1254 closes an obvious circuit to the auxiliary connect relay 1260, at break contacts 1253 disconnects the guard relay 1170, and at make contacts 1251 and 1252 extends the operator's telephone to the trunk pulsing relay 1185. Relay 1185 thereupon operates over this circuit, which may be traced from ground and battery through the upper windings of line relay 1185, the opposing windings of control relay 1180, conductors 1107 and 1108 right, make contacts 1251 and 1252, conductors 1292 and 1293, make contacts 1637, dial springs 1691, operator's transmitter T and upper winding of induction coil IC10 in parallel, the lower winding of the induction coil, and make contacts 1638. Relay 1185 as before, operates hold relay 1210.

The auxiliary connect relay 1260, which operates at the same time as the pulsing relay 1185, at break contacts 1268 opens a point in the toll control circuit, at break contacts 1267 opens a point in the circuit of the call pickup relay 1160, and at make contacts 1266 prepares a tone circuit to relay 1185, from the incoming EC conductor 1214. Relay 1260 also, at make contacts 1264 closes another point in the alternative or holding circuit for relay 1620 preparatory to the opening of the original circuit at break contacts 1224. Relay 1260 further, at make contacts 1263 prepares a circuit for the release relay 1140, at make contacts 1262 prepares a circuit for the guard relay 1170, and at break contacts 1261 opens a point in a direct current operate circuit for the ring up relay 1240. This latter circuit is of no interest at this time however.

The hold relay 1210 upon operating from relay 1185, at break contacts 1213 opens another point in the circuit of guard relay 1170, at make contacts 1212 operates the hold A relay 1220, and at make contacts 1211 grounds the test conductor 82 from the ground at break contacts 1144, by way of conductor 1283 and back contacts 1271, in order to make this trunk busy to the local selectors.

The hold A relay 1220 upon operating, at contacts 1226 prepares the incoming finder start circuits, lights the trunk busy lamp L1 at the attendant's cabinet by connecting the grounded conductor 1697 to conductor 1698, and at break-make contacts 1224 opens the original circuit to the test relay 1620, and closes a circuit to the lower winding of restrict relay 1050. Relay 1620 being made slow to release, remains operated for an instant however sufficient to permit its holding circuit to be established. Restrict relay 1050 operates, over its lower winding since its upper winding is now de-energized, but its operation is without effect at this time. The hold A relay 1220 also, at make contacts 1223 operates the hold B relay 1230, and at make contacts 1221 and 1222 connects the inductive resistor IC4 across the trunk by way of make contacts 1186, to cut off the ring at the distant end. At the same time, make contacts 1221 and 1222 also complete the operator's talking circuit through to the trunk, this circuit extending from the operator's telephone circuit, through make contacts 1637 and 1638, conductors 1292 and 1293, make contacts 1251 and 1252 on the connect relay, conductors 1107 and 1108, talking condensers C6 and C7, break contacts 1131 and 1133, 1142 and 1143, 1152 and 1153, conductors 1103 and 1106, and make contacts 1221 and 1222 to the trunk conductors 1290 and 1291. The resistor IC4, while in parallel with this circuit, is made highly inductive to voice frequencies, and does no harm.

The hold B relay 1230 upon operating, at make contacts 1236 prepares the locking circuit of the call transfer relay 1150, and at make contacts 1235 closes the previously mentioned holding circuit for the idle test relay 1620. This circuit is from ground at break contacts 1145, over conductor 1276, make contacts 1235 and 1264, conductor 1294, make springs 1658 on the operated answer key 1655, make contacts 1636 and 1621, conductor 1297, make contacts 1256, conductor 1296, chain circuit 1654 and break springs 1651 to relay 1620, which thus remains operated. The hold B relay 1230 also, at make contacts 1234 extends test conductor ground to the incoming finders, by way of conductor 1284, at make contacts 1233 prepares the circuit of pulse loop relay 1130, which is not required at this time however, and at break contacts 1232 opens the locking circuit of the ring-up relay 1240. Relay 1240 thereupon restores and at break contacts 1246 again prepares the operate circuit of call transfer relay 1150. Relay 1240 also, at make contacts 1245 extinguishes the trunk call lamp L3 at the attendant's cabinet, by removing ground from conductor 1699. This also releases the pilot relay 1610 if no other calls are waiting, and extinguishes the pilot lamp.

The operator upon learning the destination of the call, prepares to pass it to the wanted local station, by momentarily operating the grounding or transfer key 1664. This shunts the upper winding of control relay 1180, over conductors 1292 and 1107, thereby unbalancing this relay, and causing its operation, from the increased current in its lower winding. Control relay 1180 thereupon closes its make contacts 1181, 1182 and 1183, the former being now without effect, due to the open break contacts 1261. Contacts 1182 and 1183 however, close a multiple circuit to the call transfer relay 1150 and the operator recall relay 1280, which starts from ground at contacts 1183, goes through break contacts 1156 and 1167 and conductor 1258 to break contacts 1246 where it divides, with one branch extending back over conductor 1249 to the bottom winding of relay 1150, and the other passing through break contacts 1265, conductor 1259, contacts 1182 and conductor 1269 to relay 1280. The recall relay 1280, being a thermal relay with a 5-second delay period, does not operate at this time, but transfer relay 1150 operates partly and closes its preliminary make contacts 1154 and 1151. Make contacts 1154 thereupon prepare a circuit for the upper winding of relay 1150, now shunted by the ground from make contacts 1183, while make contacts 1151 place a holding bridge across the outgoing end of the trunk to hold the distant connection. This bridge extends from the positive trunk conductor 1290, through the resistor R16, conductor 1100, and make contacts 1151 to the negative trunk conductor 1291.

The release of the transfer key at the attendant's cabinet now removes the shunt from the upper winding of the differential control relay 1180, which accordingly restores, thereby opening the circuit to relay 1280 at make contacts 1182. At the same time, make contacts 1183 also remove their shunting ground from the upper winding of call transfer relay 1150, and this relay operates completely, with both windings energized in series over the following circuit: ground from make contacts 1236, conductor 1274, break contacts 1163, make contacts 1154, upper winding of relay 1150, conductor 1258, break contacts 1246, conductor 1249, and the lower winding of relay 1150 to battery. Relay 1150 thereupon at break-make contacts 1152 and 1153 disconnects the talking circuit from the trunk and prepares its extension to an incoming link. Relay 1150 also at break-make contacts 1156 opens its own original operate circuit, and prepares a circuit for the call pickup relay 1160. Relay 1150 further, at break-make contacts 1157 opens a point in the toll control circuit, and closes a circuit for the operation of the No. 1 incoming finder start relay 1010. This latter circuit is from ground at make contacts 1157, over conductor 1217, through make contacts 1226, conductor 1229, break contacts 1165, break contacts 1126, conductor 1099, break contacts 1026, and the winding of relay 1010 to battery.

Finder start relay 1010 upon operating over this circuit, closes make contacts 1011 and 1012. Contacts 1011 thereupon connect ground from conductor 1284 to the upper terminal of the No. 1 finder test relay 1020, while make contacts 1012 connect the test wiper 1075 to the bottom terminal of relay 1020, and to the interrupter springs 1072 on the motor magnet 1071. If the incoming finder 1070 is now standing on contacts leading to a busy incoming selector, test conductor ground therefrom will be on the test wiper 1075, and will cause the operation of motor magnet 1071, while at the same time shunting relay 1020, to prevent its operation. The finder switch 1070 accordingly advances its wipers at high speed until an idle link is found, when the stepping will stop due to the absence of ground on test wiper 1075 at that point. The shunt on test relay 1020 is removed at the same time and this relay operates in series with the motor magnet 1071, from the ground on conductor 1284. The motor magnet will not operate in this circuit, through the resistance of relay 1020.

The No. 1 finder test relay 1020 upon operating, at make contacts 1027 connects the control wiper 1076 to conductor 1214, and at break contacts 1026 opens the circuit of start relay 1010 which, being made slow to release, remains operated for an instant however. Relay 1020 also, at make contacts 1026 prepares a circuit for the guard relay 1170, at make contacts 1025 prepares a circuit to the set up relay 1270, at make contacts 1024 forwards ground from conductor 1284 direct to test wiper 1075, and at make contacts 1023 locks itself direct to the ground on conductor 1284. Relay 1020 further, at make contacts 1021 and 1022 connects the trunk dialling loop to the selected incoming selector, such as that shown in Figure 13, whose line relay 1310 immediately operates over the following circuit: ground and battery through the upper windings of relay 1310, the ground coming from break springs 1356 on the release magnet, break contacts 1341 and 1342, conductors 1300 and 1301, cable CA4, finder wipers 1073 and 1074, make contacts 1021 and 1022, conductors 1008 and 1009, break contacts 1121 and 1122, make contacts 1152 and 1153, inductive resistor IC4 and the pulsing contacts 1186.

The incoming selector line relay 1310 upon operating, operates release relay 1315 in obvious manner, and this relay similarly operates the release slave relay 1320. Relay 1320, at make contacts 1321 grounds the generator start conductor, at make contacts 1322 prepares the test circuit, and at make contacts 1323 prepares the vertical stepping circuit. Relay 1320 also, at contacts 1325 prepares the rotary circuit and at contacts 1324 connects dial tone from break contacts 1366 on the vertical-off-normal springs 1365 to the lower winding of relay 1310, from where it is induced into the other windings and back to the operator, by way of conductors 1300 and 1301, finder wipers 1073 and 1074, make contacts 1021 and 1022, conductors 1008 and 1009, break contacts 1121 and 1122, make contacts 1152 and 1153, break contacts 1142 and 1143, 1131 and 1133, condensers C6 and C7, conductors 1107 and 1108, and make contacts 1251 and 1252.

The operator upon hearing the dial tone, now dials the call number of the wanted local station such as the station C, for example, which will be assumed to have the call number "264." On the dialling of the first digit "2" on the operator's dial 1690, shunt springs 1692 shunt the operator's transmitter and receiver in known manner to improve the pulsing, while impulse springs 1691 interrupt the line circuit to the trunk pulsing relay 1185 twice. Relay 1185 now restores and re-operates twice in response, and at make contacts 1186 repeats the pulses to the selector line relay, over the previously traced loop circuit. Pulse loop relay 1130 operates on the first pulse, from back contacts 1187 and make contacts 1233, and being slow to release, as previously mentioned, remains operated until shortly after the second pulse when it restores. Relay 1130 upon operating, at make contacts 1132 shunts the inductive resistor IC4 to improve the pulse repeating circuit, and at break contacts 1131 and 1133 opens the talking circuit. Relay 1130 also at make contacts 1135 closes a holding circuit for the auxiliary connect relay 1260, independent of connect relay 1250, this circuit extending from ground at make contacts 1157, over conductor 1217, make contacts 1226, conductor 1229, break contacts 1165 and 1226, conductor 1099, make contacts 1026, conductor 1238, make contacts 1262, conductor 1287, make contacts 1135 and conductor 1286 to relay 1260. The other contacts of relay 1130 have no function at this time.

The selector line relay 1310, in response to the repeated pulses, also releases and re-operates twice, and at each release, break contacts 1311 pass a ground pulse to the selector vertical magnet 1335, by way of make contacts 1323, and break contacts 1372 on the rotary off normal springs 1370. The vertical magnet thereupon raises the wipers 1380, 1381, 1382 and 1383 two steps. The interrupter relay 1330 operates on the first pulse, in parallel with the vertical magnet, by way of RON springs 1373. Relay 1330, at break contacts 1331 opens a point in the rotary circuit, and at make contacts 1331 short circuits its lower winding, by way of the RON springs 1371 to make this relay temporarily slow to release. Relay 1330 therefore remains operated during the vertical stepping. The vertical off normal springs 1365 operate on the first step, whereupon break springs 1366 disconnect the dial tone, and make springs 1367 prepare the rotary cut-in circuit.

Shortly after the last pulse, interrupter relay 1330 releases, and at break contacts 1331 closes a circuit to the rotary magnet 1350, from ground at VON springs 1367, by way of break contacts 1346 and make contacts 1325. The rotary magnet operates and rotates the wipers in onto the first contacts of the second level of the associated contact banks, to select an idle incoming connector. The rotary off normal springs 1370 operate on this first step, whereupon break springs 1371 disconnect the short-circuiting winding of the interrupter relay, while break contacts 1372 and 1373 open the vertical stepping circuits. The rotary magnet 1350 also, near the end of its stroke closes its make contacts 1351. If the first connector in the wanted 200 group of incoming connectors is busy, ground on its test conductor will be passed to the test wiper 1382 and thence through break contacts 1343 and make contacts 1351 to the interrupter relay 1330 which re-operates, and releases the rotary magnet. The rotary magnet in turn opens make contacts 1351 and releases relay 1330, which re-closes the original circuit to the rotary magnet, and this action continues until an idle connector is found.

As soon as an idle connector is found, the absence of busy ground on the test wiper 1382 removes the shunt from the cut-through relay 1340 and this relay operates, from ground on conductor 1302, the complete circuit being as follows: ground from break contacts 1144, conductor 1283, make contacts 1234, conductor 1284, make contacts 1024, test wiper 1075 on the incoming finder, conductor 1302, winding of relay 1340, make contacts 1322, make contacts 1351 of the still operated rotary magnet, and the upper winding of the interrupter relay 1330 to battery. Relay 1330 will not operate in this circuit however, due to the quite high resistance of relay 1340.

Cut-through relay 1340 upon operating over the foregoing circuit, at preliminary make contacts 1345 locks direct to the battery through the interrupter relay independently of make contacts 1322 and 1351, and at break contacts 1346 causes the release of the rotary magnet 1350. Relay 1340 also, at make contacts 1344 connects the EC conductor 1393 through to the connector, and at break-make contacts 1343 disconnects test wiper 1382 from its "out" terminal and connects it to its "in" terminal preparatory to the seizure of the connector. Relay 1340 further, at break-make contacts 1341 and 1342 disconnects the operator's dialling loop from the selector line relay and extends it to the selected incoming connector, such as that of Figures 14 and 15. The selector line relay 1310 thereupon restores, followed shortly by the release relays 1315 and 1320.

Upon the extension of the operator's dialling loop to the connector, the connector line relay 1425 promptly operates, from ground and battery through its windings, in series with the differential control relay 1420, which does not operate. Relay 1425 operates the release relay 1430 in obvious manner, and the latter operates the release slave relay 1440. Relay 1440 thereupon, at make contacts 1441 grounds the test conductor 1486 to make this connector busy to the other incoming selectors. This ground also further locks up the selector cut-through relay 1340, and passes back over conductor 1302 and the cable CA4 to maintain the selector busy to the other incoming finders. Relay 1440 also at make contacts 1442 prepares the stepping circuits, at make contacts 1443 prepares a circuit for the restrict relay 1530, from the connector EC wiper 1593, at make contacts 1444 grounds the start lead to the ringing and tone generator, at make contacts 1445 closes a point in the monitor circuit, and at make contacts 1446 closes a point in the automatic rotary circuit. Relay 1440 finally, at make contacts 1447 operates the vertical transfer relay 1520, by way of conductor 1528 and break contacts 1573 on the vertical-off-normal springs 1570. Relay 1520 thereupon at make contacts 1521 prepares a circuit for its lower winding, at break contacts 1523 disconnects the tone circuits, at break contacts 1524 opens a point in the rotary hunting circuit, and at break contacts 1525 disconnects the rotary transfer relay 1510.

Upon the operator's dialling of the second digit "6" of the call number "264," the connector line relay 1425 releases and re-operates six times. At each release, make contacts 1426 open momentarily and break contacts 1427 close momentarily, but this is without effect, due to the slow to release nature of release relay 1430 and to the open contacts 1524. At each release also, break contacts 1426 close a circuit to the vertical magnet 1435 as follows: ground from break contacts 1426, make contact 1442, conductor 1490, break contacts 1563, break contacts 1511, make contacts 1521, lower winding of relay 1520, break springs 1586 on the rotary-off-normal springs 1580, conductor 1536 and the winding of the vertical magnet to battery. The vertical magnet responds, and raises the wipers 1590, 1591, 1592 and 1593 as well as the rotary control wiper 1461 six steps, the latter being without further interest at this time however. The vertical-off-normal springs 1570 operate on the first step, whereupon make springs 1571 place an additional ground on the generator start lead, make springs 1572 prepare the release circuit, make springs 1573 prepare the operate circuit for the rotary transfer relay 1510, and break springs 1573 open the operate circuit of the vertical transfer relay 1520. The latter relay remains operated from the pulses passing through its low-resistance but highly efficient lower winding however, and maintains the vertical pulsing circuit intact.

Following the last vertical step, vertical transfer relay 1520 restores, after a slight delay due to its slow release characteristics, and at break contacts 1525 closes a circuit to the rotary transfer relay 1510 as follows: ground at make contacts 1447, conductor 1528, make springs 1573 on the vertical-off-normal springs, break springs 1585 on the rotary-off-normal springs, break contacts 1525, and the lower winding of relay 1510 to battery. Rotary transfer relay 1510 thereupon operates, and at make contacts 1511 prepares the rotary pulsing circuit. Relay 1510 also, at break contacts 1512 temporarily disconnects the restrict delay 1530, at make contacts 1513 re-operates the vertical transfer relay 1520, at break contacts 1514 opens a point in the monitor circuit, at break contacts 1516 opens a point in the test circuit, and at make contacts 1517 closes an alternative circuit for its own lower winding, shunting break contacts 1525, which now open.

Upon the operator's dialling of the last digit "4" of the call number, the line relay 1425 releases and re-operates four times. At each release, break contacts 1426 close a circuit to the rotary magnet 1455 as follows: ground at break contacts 1426, make contacts 1442, conductor 1490, break contacts 1563, make contacts 1511, the upper winding of relay 1510, conductor 1493 and the winding of the rotary magnet to battery. The rotary magnet thereupon rotates all wipers in four steps on the sixth level of their respective banks. Make contats 1456 close on each operation of the rotary magnet but this is without effect at this time due to the open break contacts 1524 and 1514, since relay 1510, like relay 1520 on the vertical movement, is held operated by the pulses through its series winding. The rotary-off-normal springs 1580 operate on the first rotary step, whereupon make springs 1581 prepare a locking circuit for cut through relay 1410, make springs 1582 and 1583 prepare tone circuits, make springs 1584 close a point in the monitor circuit, make springs 1585 prepare the test circuit, break springs 1585 open the original operate circuit of rotary transfer relay 1510 now held by the pulses through its upper winding, and break springs 1586 disconnect the vertical magnet 1435.

Shortly after the last rotary pulse, the rotary transfer relay 1510 restores, after a slight delay, and causes the release of the vertical transfer relay 1520, after another slight delay. As soon as relay 1510 has released, its break contacts 1512 close a circuit to the restrict relay 1530 which may be traced as follows: ground from the incoming EC conductor 162 at the called station C, which as previously indicated, may receive incoming calls, through the cable CA8 to the EC bank contact at the connector on which the EC wiper is standing, the EC wiper 1593, conductor 1488, make contacts 1443, conductor 1491, break contacts 1512, and the winding of relay 1530 to battery. Relay 1530 operating over this circuit, at make contacts 1531 prepares an alternative locking circuit for the ring cutoff and cut-through relays, at break contacts 1532 opens a point in the release circuit, at break contacts 1533 disconnects busy tone from the EC conductor leading back to the trunk, at make contacts 1533 prepares a circuit to the cut through relay 1410, and at make contacts 1534 prepares an alternative circuit for itself.

Rotary transfer relay 1510 at the same time, at break contacts 1516 completes a circuit for test relay 1550 in series with the called station's line relay, it being assumed that this station is idle at the time. This circuit may be traced from ground at make contacts 1447, over conductor 1528, through VON make springs 1573, RON make springs 1585, break contacts 1516, lower winding of relay 1550, test wiper 1592 and the contact on which it is standing, the cable CA3' and CA3 and the test normal conductor 37, and the winding of line relay 130 to battery. Test relay 1550 operates partly over this circuit and closes its preliminary make contacts 1553 which causes the energization of the upper winding and the complete operation of relay 1550, from ground on conductor 1486. Test relay 1550 thereupon, at make contacts 1551 and 1552 prepares the ringing circuit, at break contacts 1554 opens another point in the release circuit, at make contacts 1555 prepares the ring back circuit, at break contacts 1555 opens another point in the busy tone circuit to the connector line relay, and at break-make contacts 1556 disables the hunting circuit and connects direct ground to the test wiper 1592 to make the called station busy to the other connectors.

As soon as the vertical transfer relay 1520 restores therefore, following the release of the rotary transfer relay 1510, break contacts 1522 connect interrupted ringing current to the called line over the following circuit: ringing generator not shown, break contacts 1522, lower winding of ring cutoff relay 1540, break contacts 1542, make contacts 1552, negative line wiper 1591 and the bank contact on which it stands, cables CA3' and CA3 to Figure 1, negative line normal conductor 36, line conductor 31, the station ringer, not shown, back over line conductor 30, positive line normal conductor 35, cables CA3 and CA3' again to the bank contact on which the positive line wiper 1590 is standing, wiper 1590 and make contacts 1551 to ground at break contacts 1541. At the same time, break contacts 1523 connect ring-back tone from make contacts 1555 to conductor 1492 and thus through condenser C12 to the bottom winding of line relay 1425, from where it is induced into the other windings and back to the operator, by way of conductors 1484 and 1485, wipers 1380 and 1381, make contacts 1341 and 1342, conductors 1300 and 1301 and the circuit previously traced for dial tone from the incoming selector. The called station ringer now rings intermittently in the usual manner, and the operator hears the ring-back tone in her headset.

When the called station answers, the closure of the called line loop causes the ring cutoff relay 1540 to operate, over the direct current circuit thus formed, from superimposed battery at the ringing generator, in the usual way. Relay 1540 upon operating, at preliminary make contacts 1543 locks to ground on conductors 1486 and 1487, at break contacts 1545 removes vertical-off-normal spring ground from the generator start lead, at break contacts 1544 opens the ring-back tone circuit, at break contacts 1541 and 1542 opens the ringing circuit, and at make contacts 1541 and 1542 extends the operator's talking circuit to the called station. This talking circuit may be seen to extend from the operator's telephone to conductors 1292 and 1293, through make contacts 1251 and 1252, conductors 1107 and 1108, talking condensers C6 and C7 and break contacts 1131 and 1133, break contacts 1142 and 1143, make contacts 1152 and 1153, break contacts 1121 and 1122, conductors 1008 and 1009, make contacts 1021 and 1022, finder wipers 1073 and 1074, conductors 1300 and 1301, cable CA4, make contacts 1341 and 1342, selector wipers 1380 and 1381, conductors 1484 and 1485, make contacts 1541 and 1542, make contacts 1551 and 1552, connector wipers 1590 and 1591, cables CA3' and CA3 and the line normal conductors 35 and 36 to the called line. Talking battery for the called station is fed from the connector line relay 1425, while talking battery for the operator is fed from the trunk pulsing relay 1185. The trunk line, which is held at make contacts 1151, is disconnected from the foregoing talking circuit at break contacts 1152 and 1153.

The operator may now speak with the called station, or may simply, upon hearing the called station answer, release the answer key to switch the call through. She may also, if other calls are waiting, release the answer key as soon as she hears the ring-back tone, and the call will switch through automatically, as soon as the called station answers.

*Operator disconnect*

In the first case, where the operator releases the answer key after the called station answers, the release of the answer key 1655 causes break springs 1656 to re-establish the answer key chain circuit through conductor 1654, make springs 1657 to open the circuit to the operator connect relay 1250 and make springs 1658 to open the circuit to the test relay 1620. Relay 1620 thereupon restores, after a slight delay, due to its slow release characteristic, and re-establishes the circuit of the busy relay 1610. Relay 1250 restores quickly, at break contacts 1257 prepares a circuit for the No. 1 call passing relay 1110, at make contacts 1256 removes the shunt from the answer key springs 1656, at make contacts 1255 opens another point in the circuit of test relay 1620, at break contacts 1254 prepares an alternate source of test conductor ground, and at make contacts 1254 opens the circuit of auxiliary connect relay 1260 which, being made slow to release, remains operated for an instant to allow time for its reenergization from a different source. The operator connect relay 1250 finally, at break contacts 1253 prepares a circuit for the guard relay 1170 and at make contacts 1251 and 1252 disconnects the operator's telephone circuit from the pulsing relay 1185, thereby causing the release of this relay.

The trunk pulsing relay 1185 upon restoring, at make contacts 1186 opens the pulsing circuit, but this is without effect, since the line relay 1425 in the incoming connector is now held over the called line loop by way of the connector line wipers 1590 and 1591. Pulsing relay 1185 also, at make contacts 1187 opens the circuit of the slow to release hold relay 1210, and at break contacts 1187 closes a circuit to the pulse loop relay 1130, by way of conductor 1109, make contacts 1233 and conductor 1194. The pulse loop relay 1130 operates quickly, at break contacts 1131 and 1133 opens the trunk talking circuit temporarily, at make contacts 1134 short circuits its lower winding to increase its slow release time, at make contacts 1138 further prepares the circuit of the No. 1 call passing relay 1110, and at make contacts 1135 completes a holding circuit for the auxiliary connect relay 1260, before this relay has had time to restore due to the now open make contacts 1254. This holding circuit may be traced as follows: ground at make contacts 1157, conductor 1217, make contacts 1226, conductor 1229, break contacts 1165 and 1126, conductor 1099, make contacts 1026, conductor 1238, make contacts 1262, conductor 1287, make contacts 1135, conductor 1286, and the winding of relay 1260 to battery. The other contacts of relay 1130 are without effect at this time.

The trunk hold relay 1210 now restores after a slight delay, and at break contacts 1213 closes a circuit to the guard relay 1170 from the previously mentioned holding ground for the auxilary connect relay 1260, which is now extended to relay 1170 from make contacts 1262, through break contacts 1253 and 1213 and conductor 1288. Hold relay 1210 also at make contacts 1212 opens the circuit of the slow to release hold A relay 1220, and at make contacts 1211 opens a point in the grounding circuit for the outgoing test conductor 82 which is keeping this trunk busy to the local connectors. This is without effect however, as contacts 1211 are immediately shunted by make springs 1172 on the guard relay.

The guard relay 170 upon operating, at make contacts 1171 shunts make contacts 1151 in the trunk holding bridge preparatory to the release of the call transfer relay 1150, at make contacts 1172 shunts contacts 1211 to maintain the busying ground on test conductor 82, at make contacts 1173 re-grounds the generator start conductor and at make contacts 1174 locks directly to the ground from break contacts 1187 on the pulsing relay. Guard relay 1170 also, at make contacts 1175 connects an alternative source of ground from break contacts 1254 to the test conductor 1284 leading to the incoming selector and connector. Relay 1170 further, at make contacts 1176 prepares a circuit for flashing the busy lamp L1 at the attendant's position, and at make contacts 1177 closes a multiple circuit to the connector cut-through relay 1410 and the trunk call passing relay 1110. The circuit for relay 1410 extends from ground at contacts 1177, through make contacts 1138, conductor 1214 left, make contacts 1027, finder EC wiper 1076, conductor 1303, make contacts 1344, selector EC wiper 1383, conductor 1487, break contacts 1414 and the upper winding of relay 1410 to battery. The circuit for relay 1110 extends right on conductor 1214, through break contacts 1257, conductor 1215, and the upper winding of relay 1110 to battery.

Cut through relay 1410 now operates partly and closes its preliminary make contacts 1415. This prepares a circuit for its lower winding from ground on the test conductor 1486, but this circuit is now shunted by the original operate ground and is ineffective at the moment. The No. 1 call passing relay 1110 operates completely, and at make contacts 1114 and 1115 closes circuits to the set up relay 1270 and the pick up relay 1160. The circuit for relay 1270 is from ground at make contacts 1025, over conductor 1096, through break contacts 1125, conductor 1097, break contacts 1063, conductor 1095, make contacts 1114, conductor 1248, and the winding of relay 1270 to battery. The circuit for relay 1160 is from ground at make contacts 1115, through make contacts 1156 and the winding of relay 1160 to battery. Relay 1110 also at make contacts 1116 short circuits its lower winding, to improve its slow release characteristic. The other contacts on relay 1110 are without effect at this time.

Relays 1270 and 1160 operate at the same time over the foregoing circuits. Relay 1270 at make contacts 1273 closes a direct circuit to the No. 1 call switching relay 1120 over conductor 1239. Relay 1160, at preliminary make contacts 1161 maintains the trunk holding bridge, at preliminary make contacts 1166 locks direct to the ground from make contacts 1115, and at break contacts 1163 opens the circuit of the call transfer relay 1150. Relay 1160 also closes make contacts 1162 and 1164 but without effect at this time and at break contacts 1167 disables the operate circuit of relay 1150 to prevent its re-operation. Relay 1160 finally at break contacts 1165 opens the original operate circuit for the guard relay 1170, which was also the holding circuit of the auxiliary connect relay 1260. This also is without effect at the moment, since relay 1170 is now locked to ground at break contacts 1187 on the pulsing relay, and holds relay 1260 with this same ground, passing through conductor 1287, make contacts 1135, and conductor 1286.

Relay 1150 now releases, and relay 1120 operates at approximately the same time, as the result of the action of the preceding paragraph. The call transfer relay 1150 thereupon at make contacts 1151 opens one of the multiple points in the trunk holding bridge, now held at contacts 1161 and 1171, at break contacts 1152 and 1153 extends the trunk line to the open break contacts 1131 and 1133, at make contacts 1152 and 1153 further opens the pulsing circuit, at make contacts 1154 further opens its own circuit, at make contacts 1156 opens the original operate circuit of relay 1160 now locked through contacts 1166, and at make contacts 1157 removes ground from conductor 1217 to prevent the premature operation of the No. 2 finder start relay 1030. Relay 1120 at make contacts 1125 locks direct to the ground at make contacts 1025 over conductor 1096, and at break contacts 1125 opens the circuit of relay 1270, but the latter relay, being make slow to release remains operated for an instant. Relay 1120 also, at break make contacts 1126 further opens the hold circuit for relay 1260 and prepares a circuit for the No. 2 finder start relay 1030. Finally, relay 1120 at break make contacts 1121 and 1122 prepares the transfer of the pulsing circuit to the second finder, and at make contacts 1123 and 1124 connects pulsing relay 1185 through to the called line in multiple with the connector line relay 1425.

Pulsing relay 1185 accordingly re-operates over the called line loop and at make contacts 1187 re-operates the hold relay 1210, in time to prevent the release of the hold A relay 1220, the total elapsed time between the release of relay 1210 and its re-operation being only the sum of the operate times of relays 1170, 1110, 1270, 1120, 1185 and 1120, which is considerably less than the release time of an overage slow to release relay utilizing a copper slug or a copper sleeve on the core. Pulsing relay 1185 also, at make contacts 1186 connects the inductive resistor IC4 across the trunk line, preparatory to the release of relays 1160 and 1170 and at break contacts 1187 opens the circuits of the auxiliary connect, guard, and pulse loop relays 1160, 1170 and 1130, but these relays being made slow to release, remain operated for an instant during which relay 1270 restores and opens the operate circuit of relay 1120, now locked to relay 1020.

The auxiliary connect relay 1260 now restores after the proper delay, but without any immediate effect. Guard relay 1170 also restores, at about the same time, at make contacts 1171 prepares the opening of the non-inductive holding bridge across the trunk, at make contacts 1172 opens the shunt around contacts 1211 now again closed, at make contacts 1173 removes its ground from the generator start lead, at make contacts 1174 opens its own locking circuit, at make contacts 1175 removes the auxiliary ground from the test conductor 1184, and at make contacts 1176 opens the lamp flashing circuit, which is not required for this call. Relay 1170 also at make contacts 1177 removes ground from the EC conductor 1214. This opens the circuit of relay 1110 which restores after a slight delay, due to its slow to release character. It also removes the shunt from the connector cut through relay 1410 whereupon both windings of this relay are energized in series over the following circuit: ground on the test conductor 1486 from make contacts 1441 and from break contacts 1144 in the trunk circuit, conductor 1529, make springs 1581 on the rotary off normal springs, conductor 1498, make contacts 1415, and the lower and upper windings of relay 1410 to battery.

Cut-through relay 1410 operates completely over this circuit, and at break contacts 1411 and 1412 disconnects the line relay 1425 from the talking conductors 1484 and 1485. Relay 1410 also, at break contacts 1413 opens a multiple point in the locking circuit of the ring cutoff and test relays which is however without effect at this time and at break contacts 1414 disconnects itself from the trunk EC conductor. Relay 1410 also, at make contacts 1416 connects ground pulses from conductor 1400 to the lower winding of test relay 1550, but this is without effect, as relay 1550 is now locked operated over its upper winding, and in addition maintains a shunting ground on the other side of its lower winding, from its own make contacts 1556.

The pulse loop relay 1130 restores at about the same time as relays 1170 and 1260, opens its make contacts 1134, 1135, 1136, 1137 and 1138 without effect, at make contacts 1132 disconnects the non-inductive resistor R21 from the trunk, and at break contacts 1131 and 1133 completes the talking circuit from the trunk to the called party. This circuit may be traced as follows: trunk line conductors 1290 and 1291, make contacts 1221 and 1222, conductors 1103 and 1106, break contacts 1152 and 1153, 1142 and 1143, and 1131 and 1133, talking condensers C6 and C7, make contacts 1123 and 1124, conductors 1008 and 1009, make contacts 1021 and 1022, finder wipers 1073 and 1074, and through the incoming selector and connector to the called station C. Talking battery is now fed to the called station from the trunk pulsing relay 1185, the connector line relay 1425 being now disconnected, as previously explained. The inductive resistor IC4 is now again across the outgoing end of the trunk to the main exchange which furnishes talking battery to the calling party. The non-inductive resistor R16 is also held momentarily across this circuit, by make contacts 1161, but is removed after a slight delay, following the release of relay 1110, which at make contacts 1115 opens the circuit of relay 1160, which thereupon opens contacts 1161.

Meanwhile, in the connector, the line relay 1425 restores immediately upon its disconnection from the line, followed after a short delay, by the release and release slave relays 1430 and 1440. Release slave relay 1440 upon restoring, at make contacts 1441 removes the local locking ground for the ring cutoff and test relays 1540 and 1550, but this is without effect at this time, as these relays are now held from the trunk circuit from ground at break contacts 1144 on the test conductor, by way of conductor 1283, make contacts 1234, conductor 1284, make contacts 1024, finder test wiper 1075, conductor 1302, make contacts 1343, selector wiper 1382, test conductor 1486 and make contacts 1531. Release slave relay 1440 also, at make contacts 1444 removes ground from the generator start conductor 1496, and at back contacts of make-before-break springs 1443 closes an alternative circuit for the restrict relay 1530 to prevent the release of this relay. This circuit may be traced from the just mentioned trunk ground on test conductor 1486, through conductor 1529, rotary off normal make springs 1581, make contacts 1534, conductor 1497, back contacts 1443, conductor 1491, break contacts 1512, and the winding of relay 1530 to battery. A branch of this circuit also extends left on conductor 1498 to hold the cut-through relay 1410. The other contacts on relay 1440 are without effect at this time.

In the second case where the operator releases the answer or listening key before the called station has answered, the action is similar to the foregoing up to a certain point and then varies. For example, upon the restoration of the answer key, the relays 1620 and 1250 release as before, and relay 1250 again releases the pulsing relay 1185, which in turn operates relay 1130 and releases hold relay 1210. This time however, the connector line relay 1425 is not held over the called line, which has not yet answered, and when relay 1185 opens its pulsing contacts 1186, line relay 1425 will restore, followed after a slight delay, by release relays 1430 and 1440. This does not affect the operated restrict and test relays 1530 and 1550 however, which remain locked to ground from the trunk on the test conductor 1486, the circuit for relay 1530 being as before by way of the local conductor 1529, make contacts 1581 and 1534, and break contacts 1443 and 1512.

In the trunk circuit the release of the hold relay 1210 operates relay 1170 as before, and this relay again locks up relay 1260, operates relay 1110, and partly operates the connector cut-through relay 1410, which closes contacts 1415 as before. Relay 1110 again operates relays 1160 and 1270, with the former again releasing relay 1150, and the latter again operating relay 1120. Call switching relay 1120 now at break contacts 1125 causes relay 1270 to restore, and at make contacts 1123 and 1124 connects pulsing relay 1185 through to the talking conductors 1484 and 1485, but since these conductors are now open at make contacts 1541 and 1542, this is without effect, and pulsing relay 1185 does not re-operate. The hold A relay 1220 now restores, after the expiration of its delay period, and at break contacts 1225 causes the trunk busy lamp L1 at the attendant's cabinet to flash rapidly, from ground pulses from the interrupter, not shown, through make contacts 1176 on the still operated guard relay 1170, and the conductor 1275. The hold B relay 1230 then also restore, after an additional slight delay, and releases pulse loop relay 1130. Make springs 1234 also disconnect the original ground from break contacts 1144 from the test conductor 1284, but a substitute ground is now supplied to conductor 1284 from break contacts 1254 on the connect relay, by way of the conductor 1285 and make contacts 1175. Relay 1130 upon releasing, causes relays 1110, 1160 and 1260 to restore, and relay 1410 in the connector to operate completely and lock to the test conductor.

When the called station now answers, the closing of the called line loop operates the ring cutoff relay 1540 in the connector as before, and this relay again locks up to the test conductor 1486, opens the ringing circuit, and at make contacts 1541 and 1542 connects the called line to the talking conductors 1484 and 1485. This completes a circuit for the repeater pulsing relay 1185 which immediately operates, and re-operates the hold relays 1210, 1220 and 1230. Relay 1220 thereupon at break make contacts 1225 causes the occupancy lamp L1 to stop flashing and resume burning steadily, as an indication that the call has been answered. The pulsing relay 1185 also, at make contacts 1186 connects the inductive resistor IC4 across the trunk, and at break contacts 1187 opens the locking circuit to the guard relay 1170. Relay 1170 upon restoring after the usual slight delay opens contacts 1171 to remove the non-inductive resistor R16 from across the trunk, and the connection between the trunk and the called station is complete.

*Operator cut in*

In cases where the operator has restored the answer key before the called party has answered, and the called station fails to answer within a reasonable time, the operator observing the continued flashing of the trunk busy lamp, may come in again on the trunk by re-operating the answer key, provided she has no other answer key operated at the time. In the trunk, the operated relays at this time are 1020, 1120 and 1170, while in the selector only relay 1340 is operated, and in the connector relays 1410, 1530 and 1550.

Upon the re-operation of the answer key as stated, the connect relay 1250 again operates in the trunk, over the same circuit as before, from ground through the resistor R19, by way of break contacts 1631 and 1672, and make contacts 1644 and 1657. Relay 1250 accordingly, at break contacts 1257 disables relay 1110, at make contacts 1255 and 1256 re-operates the test relay 1620, and at break contacts 1254 removes the alternate or substitute ground from conductor 1284. Since the original ground is also disconnected from conductor 1284 or this time at the open make contacts 1234, the locking circuits of relays 1020, 1340, 1530 and 1550 are now without ground and these relays accordingly release. The incoming selector and connector then also releases, the selector release circuit being from ground at the vertical off normal springs 1367 through break contacts 1346 and 1325, while the connector release circuit is from ground at break contacts 1426, through break contacts 1442, 1554 and 1532, and vertical off-normal springs 1572. Relay 1120 also releases after a slight delay, following the release of relay 1020.

Connect relay 1250 also at make contacts 1254 re-operates relay 1260, and this relay again at make contacts 1264 prepares a holding circuit for test relay 1620. Connect relay 1250 finally, at make contacts 1251 and 1252 re-connects the operator to conductors 1107 and 1108, thereby re-operating pulsing relay 1185 over the operator's telephone circuit. Relay 1185 accordingly at make contacts 1187 causes the re-operation of the hold relays 1210, 1220 and 1230, and relay 1220 thereupon at make contacts 1221 and 1222 re-establishes the talking circuit between the operator and the trunk. Pulsing relay 1185 at the same time at make contacts 1186 connects the inductive resistor IC4 in bridge of the talking circuit, and at break contacts 1187 opens the circuit of relay 1170 which restores, after a slight delay, and disconnects the non-inductive holding bridge through resistor R16. The operator now advises the distant calling party that the wanted station does not answer. If the calling party then requests a different station, the operator may set up the new connection by again operating transfer key 1664 momentarily and dialling the new number, whereupon the trunk circuit responds as before. Otherwise, the operator merely restores the answer key, and releases the trunk.

The operator may cut in on an established trunk connection, also, by operating the corresponding answer key. In the case of the previous completed call for example, the re-operation of answer key 1655 re-operates connect relay 1250 and this relay again closes contacts 1251 and 1252 to re-connect the operator. Relay 1250 also at make contacts 1254 re-operates relay 1260, and at make contacts 1255 and 1256 prepares the previously traced circuit for test relay 1620 in the attendant's circuit. Relay 1620 cannot now operate over this circuit however, due to the open break contacts 1224 on the hold A relay. When relay 1260 operates however, it causes the operation of busy relay 1615 in the attendant's circuit, from ground at break contacts 1145, by way of conductor 1276, make contacts 1235 and 1264, conductor 1294, make springs 1658, make contacts 1636, and break contacts 1621. Relay 1615 thereupon, at make contacts 1619 grounds the generator start lead, and at make contacts 1616, 1617 and 1618 puts a busy or warning tone on the talking circuit through the induction coil IC14, in obvious manner, as notice of the intrusion by the operator.

*Call offering*

If the operator attempts to extend an incoming call to a wanted local station, and this station is busy, ground on the test normal conductor thereof will shunt the lower winding of the incoming connector test relay 1550, and this relay therefore cannot operate to start the ringing. As soon as relay 1520 restores however, following the last rotary pulse, it passes busy tone to the lower winding of line relay 1425, by way of break contacts 1564, 1555, and 1523, rotary off normal springs 1582, break contacts 1544, and conductor 1492. This busy tone is accordingly induced into the other windings of the line relay and back to the operator, where it is made audible in the operator's headset.

The operator may now break in on the established connection to offer the call, merely by dialling an additional digit 1. Relays 1185 and 1425 accordingly release and re-operate once, in the previously described manner. Break contacts 1426 on line relay 1425 are now without effect, due to the open make contacts 1511 and 1521, but break contacts 1427 now pass a pulse to the monitor relay 1560 over the following circuit: ground at break contacts 1556, break contacts 1524 and 1514, rotary off normal springs 1584, conductor 1519, make contacts 1445, break contacts 1427, conductor 1499, break contacts 1565, and the upper winding of relay 1560 to battery. Relay 1560 thereupon operates partly and closes its preliminary make contacts 1566, thereby placing ground on both sides of the lower winding of this relay. Upon the re-operation of the line relay however, the opening of break contacts 1427 removes the original ground from conductor 1499 and break contacts 1565 and relay 1560 operates completely, with both windings energized in series, the circuit now being from the ground at break contacts 1556 through contacts 1524, 1514 and 1584, conductor 1519, contacts 1445, conductor 1518 right, make contacts 1566, and the lower and upper windings of relay 1560 to battery.

Monitor relay 1560 upon operating completely, at make contacts 1561 and 1562 completes a dry talking circuit between the operator and the called station, through the condensers C13 and C14, at break contacts 1563 further opens the vertical and rotary pulsing circuits, and at break contacts 1565 disconnects its original operating circuit, to prevent its being shunted down, in case a digit other than "1" has been dialled inadvertently. Relay 1560 also, at break contacts 1564 disconnects busy tone from the lower winding of line relay 1425, and at makes contacts 1564 connects a thick tone or other distinctive tone thereto in its place. This tone is accordingly induced into the called line through the upper windings of the line relay and is heard by the parties to the existing call as a warning of the intrusion. The operator now speaks to the wanted party and advises him of the waiting trunk call.

If the called party agrees to receive the call, the operator thereupon restores the answer key to place the call in waiting. Relays 1620 and 1250 now release, and relay 1250 causes the release of the trunk relays 1185, 1210, 1220 and 1230, as well as the connector relays 1425, 1430 and 1440, as previously described in the section on "Operator disconnect." Relay 1440 in addition now causes the release of the monitor relay 1560, by opening make contacts 1445. Relay 1185 then operates relay 1130, and relay 1210 operates relay 1170, which starts the busy lamp flashing, again operates relay 1110 and partly operates relay 1410 in the connector. Relay 1110 then operates relays 1160 and 1270, thereby releasing relay 1150 and operating relay 1120 as before, and relay 1120 releases relay 1270. Relay 1130 finally restores, following the release of the hold B relay 1230, and permits the complete operation of the relay 1410 in the connector. Relay 1130 at the same time opens the circuit to relay 1110 which restores and releases relays 1160 and 1260.

When the parties to the interrupted call now hang up, the next ground pulse placed on the conductor 1400 at the lower left in Figure 14, by the interrupter, not shown, energizes the lower winding of test relay 1550 in series with the line relay of the called line and relay 1550 accordingly operates and starts the ringing in the usual way. When the called station again removes his receiver the ring cut off relay 1540 operates to stop the ring and connect the called line to the trunk circuit. The trunk relays 1185, 1210, 1220 and 1230 thereupon re-operate, stop the flashing of the occupancy lamp, release relay 1170, and complete the connection.

*Normal release of incoming call*

The release of an incoming call is normally under the control of the called station, and is never under the control of the trunk. Thus, when the calling party hangs up at the termination of the conversation, nothing occurs at the local end, but when the called party hangs up, the opening of the called line loop causes the immediate release of the repeater's pulsing relay 1185, and the latter in turn, causes the release of the hold relays 1210, 1220 and 1230, and the momentary operation of relay 1130. Relay 1170 does not operate at this time, due to the open make contacts 1262 on the auxiliary connect relay 1260.

Hold relay 1210 upon releasing, at make contacts 1211 removes busying ground from the local test conductor 82, and relays 1220 and 1230, at break contacts 1221 and 1231 re-connect the upper winding of the ring-up relay 1240 to the trunk line conductors 1290 and 1291. Relay 1220 also, at make contacts 1225 extinguishes the trunk occupancy lamp at at attendant's position. Relay 1230 also, at make contacts 1234 removes holding ground from conductor 1284.

Upon removal of holding ground from conductor 1284 all relays locked to this ground are released. This includes relays 1020 in the trunk circuit, 1340 in the incoming selector, and relays 1410, 1530, 1540 and 1550 in the incoming connector. Relay 1020 thereupon disconnects the finder wipers, while relays 1340 in the selector, and relays 1530 and 1550 in the connector, complete their respective release circuits. The release magnets 1355 and 1450 upon operating, at make contacts 1356 and 1451 respectively, ground the test conductors 1302 and 1486 temporarily, to keep the selector and connector marked busy until the completion of their respective release operations. The release magnets at the same time disconnect ground from their respective line relays to prevent their re-operation until the completion of the release.

*Denied incoming call*

In case an incoming call is for a party not privileged to receive trunk calls, such as the station D in Figure 1, and the operator attempts to complete the connection, the call will be denied completion, and the connector will return busy tone superimposed on ring back tone to the operator, as an indication of this condition. The operator may speak with the wanted party, if it is possible to do this over the tone signals, but she cannot connect him through to the trunk.

The incoming selector and connector respond to the dial pulses from the operator in the same manner as for any other call, to select the wanted station. This time however, since the called station has no marking on its incoming EC conductor, such as conductor 163 at station D, the connector EC wiper 1593 does not encounter ground at this point. When therefore the rotary transfer relay 1510 releases, following the last rotary impulse, its break springs 1512 do not close the circuit of the restrict relay 1530, and this relay remains unoperated. Break contacts 1516 however, close the circuit of test relay 1550 from ground at make contacts 1447 as usual, and relay 1550 thereupon operates in series with the called line relay and locks to conductor 1486 through break contacts 1413. The connector now rings, and ringback tone is conected to the lower winding of the connector line relay 1425 from make contacts 1555, through contacts 1523, 1582 and 1544, conductor 1492 and condenser C12. At the same time, due to the non-operation of the restrict relay 1530, busy tone through the condenser C15 is connected to the lower winding of the trunk pulsing relay 1185, by way of make springs 1583, break contacts 1533, conductor 1495, break contact 1414, conductor 1487, selector EC wiper 1383, make contacts 1344, conductor 1303, finder EC wiper 1076, make contacts 1027, conductor 1214, make contacts 1266, conductor 1237 and condenser C9. The busy tone is thus passed to the operator direct by induction into the upper windings of relay 1485, and so into the conductors 1107 and 1108, now connected to the operator's telephone through make contacts 1251 and 1252. The ringback tone reaches the same conductors 1107 and 1108 by induction as before into the upper windings of line relay 1425, by way of conductors 1484 and 1485, 1300 and 1301, finder wipers 1073 and 1074, make contacts 1021 and 1022, conductors 1008 and 1009, break contacts 1121 and 1123, make contacts 1152 and 1153, break contacts 1142, 1143, 1131, 1133, and condensers C6 and C7 to conductors 1107 and 1108. Both tones are thus heard by the operator at the same time. They are also heard by the called party, if he has answered.

The operator upon recognizing the restricted station signal, may re-connect her telephone to the trunk line, by again operating transfer key 1664 momentarily. Control relay 1180 thereupon operates, and at contacts 1183 operates relay 1160 momentarily, via make contacts 1156. Relay 1160 upon operating, at preliminary make contacts 1166 locks temporarily to contacts 1183 and at break contacts 1163 releases relay 1150. Relay 1150 thereupon, at break contacts 1152 and 1153 re-connects conductors 1107 and 1108 and the operator, to the trunk line conductors 1290 and 1291, through the talking condensers C6 and C7. Relay 1160 then restores, upon the release of transfer key 1664. The operator may now speak with the outside party again and explain why the call cannot be completed. She may also offer to take a message, which can then be relayed to the called party, if desired, by setting up a local connection over the local switch train, in a manner to be explained later.

Assuming that the called party has answered and is waiting on the line, the call will be released when the operator restores the answer key. Upon the release of this key, relays 1620 and 1250 restore in the usual way, causing the release of relay 1185. Relay 1185 now operates 1130 and releases hold relay 1210 and 1210 pulls 1170 and holds 1260, as before. Relay 1170 then operates 1110 and partly operates 1410. Relay 1110 operates 1160 and 1270, 1160 releases 1150, and 1270 operates 1120. Relay 1120 now releases 1270 and re-operates 1185 over the called line loop. Relay 1185 thereupon re-operates hold relay 1210, and releases relays 1170, 1130 and 1260.

Upon the release of relay 1170, make contacts 1177 open the circuit of relay 1110, which restores and releases 1160. Make contacts 1177 also remove the shunt from the lower winding of relay 1410 and this relay operates completely, in the manner previously described. Break contacts 1411 and 1412 on this relay thereupon cause the release of the connector line and release relays 1425, 1430 and 1440 as before, and break contacts 1413 now also cause the release of the ring cutoff and test relays 1540 and 1550. Whenever the restrict relay 1530 is operated, the opening of contacts 1513 is without effect, as relays 1540 and 1550 are then locked to conductor 1486 through make contacts 1531, but as previously explained, relay 1530 now unoperated.

Upon the release of relays 1425, 1440 and 1450 the connector release circuit is completed, through break contacts 1426, 1442, 1554 and 1532 and vertical off normal springs 1572, and the connector releases. The connection to the called station being also broken at the same time, relay 1185 in the trunk now also releases, and causes the successive release of the hold relays 1210, 1220, and 1230. Relay 1220 thereupon extinguishes the trunk busy lamp, and relay 1230 removes ground from conductor 1284 to release relays 1020 and 1340. Relay 1340 upon restoring, releases the selector.

If the operator attempts to pass the call, inadvertently or otherwise, by releasing the answer key upon the completion of dialling, and before the called station has answered, the attempt will fail and the busy lamp will flash as for an uncompleted call. Upon the release of the answer key, relays 1620, 1250 and 1185 restore, and relay 1185 operates 1130 and releases 1210 and 1425 as before. Relay 1210 then operates 1170 and holds 1260, and 1170 operates 1110, and partly operates 1410 over the EC conductor. Relay 1110 then operates 1160 and 1270, with 1160 releasing 1150, and 1270 operating 1120, as before. Relay 1120 now prepares a circuit for relay 1185 at make contacts 1123 and 1124 but since the called station has not answered, this is without effect, and relay 1185 remains normal, and holds 1170 operated. Relays 1220 and 1230 accordingly restore, and the trunk busy lamp starts flashing, from break contacts 1225 and make contacts 1176. Relay 1230 then releases relay 1130, and this relay in turn releases 1110 and 1260, with 1110 releasing 1160 as usual. Relay 1130 also, at make contacts 1138 removes the shunting ground for relay 1410 from conductor 1214 and relay 1410 operates completely, thereby disconnecting relay 1425. Due to the non-operation of the restrict relay, the opening of break contacts 1413 also releases the test relay 1550, and the connector thereupon releases.

The operator in response to the flashing lamp, then comes back in on the connection. Connect relay 1250 thereupon operates and at break contacts 1254 removes holding ground from conductor 1284, thereby causing the release of relays 1020 and 1340, whereupon the selector releases. Relay 1185 now operates over the operator's loop, and re-operates relays 1210, 1220 and 1230 to re-connect the operator to the trunk line, as previously explained under "Operator cut in."

*Incoming connector hunting*

In the case of an incoming call to one of the previously mentioned groups of stations having a common call number, assuming of course, that all of the stations of such a group are privileged stations, at least as to incoming calls, the dialling of the assigned call number will cause the incoming connector to hunt an idle station in a manner similar to that described for a local call. To secure such action, it is necessary that line selection pins be inserted in the rotary control bank 1460 of all incoming connectors having access to the group, in positions corresponding to all but the last line of such group, just as for the local connectors.

When therefore the operator dials the call number of this group of stations, the incoming connector involved in the call rotates its wipers 1590, 1591, 1592 and 1593 onto the bank terminals of the first station of the group, and at the same time rotates the rotary control wiper 1461 in on the corresponding level of the rotary control bank, into engagement with the first line selection pin corresponding to said first station. The control bank thereupon shunts make contacts 1456 on the rotary magnet 1455, but this has no effect at the moment, due to the open break contacts 1514 and 1524 on the rotary and vertical transfer relays 1510 and 1520.

Upon the release of relay 1510, following the last rotary impulse break contacts 1512 close the circuit of restrict relay 1530 from ground on the EC wiper 1593, and relay 1530 operates and locks. If the first station of the group is idle, break contacts 1516 also cause the energization of the lower winding of test relay 1550 in series with this station's line relay, and relay 1550 operates and locks, and starts the ringing.

If the first station is busy however, test wiper 1592 will have busying ground on it, which will shunt the lower winding of test relay 1550 and prevent its operation. Upon the release of relay 1520 therefore, shortly after the release of relay 1510, break contacts 1524 re-operate relay 1510 over the following circuit: ground through break contacts 1556, break contacts 1524, conductor 1527, make contacts 1446, rotary control wiper 1461, the first line selection pin and the metal bank arc, conductor 1526, the upper winding of relay 1510, conductor 1493, and the winding of the rotary magnet 1455 to negative battery. Relay 1510 and the rotary magnet thereupon operate in series as before. The rotary magnet thereupon advances the control wiper and the other wipers one step, with make contacts 1456 on the magnet shunting the control wiper 1461 momentarily as the latter changes position. Relay 1510, at make contacts 1513 re-operates relay 1520. Relay 1520 at break contacts 1524 opens the rotary circuit, and the rotary magnet and relay 1510 release. If the next line is idle, relay 1550 operates, on the release of relay 1510 and stops the hunting. Otherwise relay 1550 remains normal, and on the release of relay 1520, the rotary circuit is again closed, at break contacts 1524, and the foregoing cycle repeats. If all stations are busy, the connector will rotate to the last one, where the rotary movement will stop, since this station has no pin in the rotary control bank, and the connector will, on the final release of relay 1520, complete the busy tone circuit, through contacts 1564, 1555, 1523, 1582, and 1544.

*All connectors busy*

If all of the connectors of a group are engaged, at the time the incoming selector involved cuts in on the required level, the selector test wiper 1382 finds ground on every contact on which it stops, with the result that relay 1340 fails to operate, and the inter-action of the rotary magnet 1350 and the interrupter relay 1330, as described in the section on "Incoming calls"; will continue until the wipers rotate completely off the bank, and thereby disconnect ground from the test wiper 1382.

Cam springs 1360 operate on the 11th rotary step in the known manner, from a cam on the shaft, and make springs 1363 pass busy tone back to the operator by induction through the windings of line relay 1310. At the same time, make contacts 1361 and 1362 shunt break contacts 1341 and 1342 on the cut-through relay, to hold the line relay operated and maintain the busy tone circuit. As soon as the test wiper steps off the bank, cut-through relay 1340 operates from ground forwarded over test conductor 1302 to battery through the upper winding of relay 1330 which does not re-operate. This circuit orginally passes through make contacts 1322 and 1351 but as soon as relay 1340 operates it locks direct to 1330, independently of the original circuit, through make contacts 1345. Relay 1340 also at break contacts 1346 opens the circuit of the rotary magnet, permitting its release. The operator must now release the selector and try the call again.

*Call transfer*

Any local station privileged to receive incoming trunk calls, may transfer such a call to another similar local station, or make an information call to any local station, by momentarily operating the station grounding button and dialing the number of the wanted local station.

Upon the completion of such a call, such as the previously described trunk call to station C for example, and assuming that the operator has retired from the connection, the operated relays in the trunk circuit are 1020, 1050, 1120, 1185, 1210, 1220 and 1230, while in the incoming selector only relay 1340 is operated, and in the incoming connector, relays 1410, 1530, 1540 and 1550, with relay 1185 being held over the called line loop. Relay 1050 is not involved in the operation, on incoming calls, and may be ignored.

If now, station C operates the grounding button 3 momentarily, it unbalances the trunk control relay 1180 and causes its operation, by passing shunting ground to its upper winding over the following circuit: ground from button 3, positive line 30, positive normal conductor 35, cables CA3 and CA3′, positive wiper 1590 in the incoming connector, conductor 1484 past the open contacts 1411, positive wiper 1380, make contacts 1341, conductor 1300 through cable CA4, positive wiper 1073 on the No. 1 incoming finder, make contacts 1021, conductor 1008, make contacts 1123, conductor 1107, and the upper winding of relays 1180 and 1185 to ground.

Relay 1180 upon operating closes its contacts 1181 without effect, and at make contacts 1183 again closes the operate circuit of the call transfer relay 1150, which as previously stated, is to the lower winding by way of break contacts 1156, 1167, and 1246. The 5-second operator recall relay is again energized over a branch of this circuit, through make contacts 1182, but is not affected at the moment. Relay 1150 however operates partly and closes contacts 1151 and 1154, the former to hold the trunk line, and the latter to prepare the locking circuit of relay 1150 whose upper winding is now shunted by ground from make contacts 1183 and from make contacts 1236.

Upon the release of the grounding button at the station C, control relay 1180 restores and opens its contacts. Relay 1150 thereupon operates fully with both windings in series, and at break-make contacts 1152 and 1153 disconnects station C from the trunk line and prepares a new inward connection. Relay 1150 also, at make contacts 1156 prepares the circuit of the call pickup relay 1160, and at make contacts 1157 closes a circuit to the No. 2 finder start relay 1030, which operates. This circuit is from ground at make contacts 1157, over conductor 1217, make contacts 1226, conductor 1229, break contacts 1165, make contacts 1126, conductor 1098, break contacts 1047, and the winding of relay 1030 to battery.

The No. 2 finder start relay 1030 upon operating, at make contacts 1031 and 1032 prepares circuits for the No. 2 finder test relay 1040 and for the motor magnet 1081 of the upper or No. 2 finder switch 1080. If this finder is standing on contacts leading to a free incoming selector, the absence of ground on test wiper 1085 will permit test relay 1040 to operate from ground on conductor 1284 to battery through the motor magnet, by way of make contacts 1032 and break contacts 1082. If this selector is busy however, ground on the test wiper 1085 will shunt relay 1040 and operate the motor magnet, by way of break contacts 1043 and make contacts 1031. The motor magnet will thereupon interrupt its own circuit and advance its wipers step by step in this manner until a free selector is found, when relay 1040 will operate in series with the motor magnet, which cannot however reoperate in series with the test relay.

Test relay 1040 upon operating, at break contacts 1047 opens the circuit of start relay 1030 which restores after a slight delay, at make contacts 1046 prepares a locking circuit for relay 1055 and a kickoff circuit for motor magnet 1081, at make contacts 1045 prepares a circuit for the No. 2 call passing relay 1060, at make contacts 1044 locks direct to the ground on conductor 1284, and at make contacts 1043 connects direct ground from conductor 1284 to the test wiper 1085. Relay 1040 finally, at make contacts 1041 and 1042 connects the trunk pulsing loop to the new incoming selector, whose line relay accordingly operates over conductors corresponding to 1300 and 1301, and a circuit comprising the No. 2 finder line wipers 1083 and 1084, contacts 1041 and 1042, conductors 1005 and 1007, break contacts 1111 and 1112, make contacts 1121 and 1122, make contacts 1152 and 1153, break contacts 1142, the inductive resistor IC4, and the closed pulsing contacts 1186.

The new incoming selector, upon the operation of its line and release relays, now passes dial tone back to the station C, by way of the said selector's incoming line conductors, the No. 2 finder wipers 1083 and 1084, contacts 1041 and 1942, conductors 1005 and 1007, contacts 1111 and 1112, make contacts 1121 and 1122, make contacts 1152, and 1153, contacts 1142, 1143, 1131 and 1133, talking condensers C6 and C7, make contacts 1123 and 1124, conductors 1008 and 1009, contacts 1021 and 1022, the No. 1 finder wipers 1073 and 1074 and so through the first incoming selector and connector to the station C.

The transferring station C, upon hearing the dial tone now proceeds to dial the call number of the new station, in the regular way. The trunk pulsing relay 1185 responds to the pulses, and at pulsing contacts 1186 repeats them to the new selector, which responds in the manner previously described to seize a new incoming connector, which makes connection with the new station in response to the final digits of the call number. The pulse loop relay 1130 operates on the first pulse of each digit as before to improve the pulsing circuit. Following the last digit, when the new incoming connector has stepped its wipers onto the terminals of the new called station, which will be assumed to be a station privileged to receive trunk calls, ground from this station on the connector EC wiper 1593 will operate the restrict relay 1530 in the manner previously explained and if this station is free, test relay 1550 will also operate to start the ringing. In the new connector relays 1425, 1430, 1440, 1530 and 1550 are now operated, while in the original connector relays 1410, 1530, 1540 and 1550 are operated.

When the new station answers, ring cutoff relay 1540 operates to stop the ringing, and at make contacts 1541, and 1542 completes a talking circuit between the two stations, which may be traced from the new station through make contacts 1551, 1552, 1541 and 1542 in the new connector, conductors 1484 and 1485 past the closed break contacts 1411 and 1412, through the new selector to the No. 2 finder wipers 1083 and 1084, contacts 1041 and 1042, conductors 1005 and 1007, contacts 1111 and 1112, make contacts 1121 and 1122, make contacts 1152 and 1153, break contacts 1142 and 1143, 1131 and 1133, condensers C6 and C7, make contacts 1123 and 1124, conductors 1008 and 1009, contacts 1021 and 1022, through the No. 1 finder and the old selector, to the line conductors 1484 and 1485 in the old connector and thence past the open break contacts 1411 and 1412 in this connector to the first or calling station. Talking battery is fed to the called station from the line relay 1425 of the new connector, while talking battery for the calling station is supplied from the trunk pulsing relay 1185.

In the case of an information call only, the original party, upon the termination of the conversation with the second station, will again operate his grounding button momentarily, to restore the connection with the held trunk line. Control relay 1180 thereupon re-operates, and at make contacts 1183 operates the call pick up relay 1160 through make contacts 1156. Relay 1160 upon operating, at make contacts 1166 locks directly to make contacts 1183, at make contacts 1161 shunts contacts 1151 momentarily, and at break contacts 1163 unlocks relay 1150 which immediately releases and re-establishes the original trunk connection, through break contacts 1152 and 1153. Relay 1160 now also at make contacts 1162 closes a circuit to the No. 2 finder motor magnet 1081 from ground at make contacts 1046, by way of break contacts 1058 and 1061, conductor 1091, contacts 1162, and conductor 1090. Motor magnet 1081 operates over this circuit and at break contacts 1082 unlocks and releases test relay 1040. Make contacts 1041 and 1042 thereupon open the pulsing loop, make contacts 1043 remove trunk ground from test wiper 1085, and make contacts 1046 open the circuit of the motor magnet, which releases and advances its wipers one step. If the second station has hung up, the second connector and selector release immediately, but otherwise the connector line relay 1425 remains operated over the line loop of the second station, and holds both switches, which are maintained busy to all incoming finders, by test conductor ground from make contacts 1441 on the release slave relay 1440. Then, when the second station finally hangs up, relays 1425, 1430 and 1440 restore and release both switches. Relays 1180 and 1160 in the trunk both release as soon as the first party releases his grounding button. Because of the advance of the second finder when the first station returns to the trunk connection, it will be appreciated that any number of information calls may be made in this manner.

If the trunk call is to be actually transferred to the second station however, the latter party, upon agreeing to the transfer, will operate his grounding button momentarily. This will place a shunting ground on the upper winding of control relay 1420 in the second incoming connector, by way of make contacts 1551 and 1541, conductor 1484 and break contacts 1411 on the as yet unoperated cut-through relay 1410. Control relay 1420 now operates, and at make contacts 1421 closes a circuit to the upper winding of relay 1410, over conductors 1494 and 1495 and make contacts 1533 on the restrict relay. Relay 1410 then operates partly and closes contacts 1415. A branch of this circuit is also extended to the call passing relay 1060, by way of break contacts 1414, the EC conductor 1487, the selector EC wiper and make contacts 1344 to the finder EC wiper 1086, make contacts 1045, and the winding of relay 1060 to battery.

The No. 2 call passing relay 1060 operates over this circuit, at break contacts 1061 disconnects the No. 2 motor magnet 1080 to prevent its operation at this time, and at make contacts 1062 operates the No. 2 call switching relay 1055 which locks to make contacts 1046 on the No. 2 test relay and closes make contacts 1056 and 1057 to prepare the new talking circuit to the trunk line. The call passing relay 1060 further at make contacts 1064 operates relay 1160 over conductor 1195 and make contacts 1156, and the latter relay releases relay 1150 as before. Relay 1060 finally, at make contacts 1063 closes a circuit to the No. 1 finder motor magnet 1071 which may be traced as follows: ground at make contacts 1025, make contacts 1063, conductor 1095, break contacts 1114, make contacts 1164 on the now operated call pickup relay, conductor 1094, and the winding of motor magnet 1071 to battery.

Motor magnet 1071 operates over the foregoing circuit and opens the interrupter springs 1072. This disconnects battery from the No. 1 test relay 1020 which promptly releases. Make contacts 1021 and 1022 thereupon open the talking circuit to the first station through line wipers 1073 and 1074, while make contacts 1023 disconnect the grounded conductor 1284 from the upper terminal of relay 1220 to prevent its re-operation, make contacts 1024 disconnect this same ground from test wiper 1075, and make contacts 1025 open the circuits of the No. 1 call switching relay 1120 and the motor magnet 1071. Upon removal of ground from test wiper 1075, the cut-through relay 1340 in the first selector and the cut-through, restrict, ring cutoff and test relays 1410, 1530, 1540 and 1550 in the first connector are released, and cause the release of their respective switches. Motor magnet 1071 restores at about the same time and advances its wipers, and relay 1120 now also restores, after a slight delay.

When the second party releases his grounding button, control relay 1420 in the second connector restores, and make contacts 1421 remove the shunting ground from the lower winding of cut-through relay 1410. Relay 1410 thereupon operates completely with both windings energized in series, from ground on the test conductor 1486, by way of conductors 1529 and 1498, and contacts 1581 and 1415. Break contacts 1411 and 1412 then disconnect and release the relays 1425, 1430 and 1440, while break contacts 1414 open the circuit back to the No. 2 call passing relay 1060 which also restores, after a short delay, due to being made slow to release. Relay 1060 opens the operate circuit of call switching relay 1055, but this relay is now locked to make contacts 1046 on the No. 2 test relay, and remains operated. The first station is now completely disconnected from the trunk, and the second station is connected thereto in its place, with the talking circuit now extending from the second incoming selector and connector, over conductors corresponding to 1300 and 1301, line wipers 1083 and 1084 on the No. 2 finder, make contacts 1041 and 1042, make contacts 1056 and 1057, conductors 1004 and 1006, condensers C6 and C7, break contacts 1131, 1132, 1142, 1143, 1152, 1153, and make contacts 1221 and 1222 to the trunk conductors 1290 and 1291. Talking battery to the second station is now furnished by the trunk pulsing relay 1185, by way of conductors 1107 and 1108.

If the second station later on wishes to transfer the call to a third station he may do so, as in the first instance, by merely operating his grounding button momentarily, and then upon hearing dial tone, dialling the number of the third station. The grounding of the positive line conductor as before, operates the control relay 1180 in the trunk, which again causes the call transfer relay 1150 to close its contacts 1151 and 1154, and to operate fully, upon the release of the grounding button. Relay 1150 upon operating fully, at contacts 1152 and 1153 disconnects the second station from the trunk line and prepares a new inward dialling circuit, and at make contacts 1157 again closes the circuit to the No. 1 finder start relay 1010, by way of conductor 1217, make contacts 1236, conductor 1229, and break contacts 1165, 1126 and 1026.

The No. 1 finder start relay 1010 now operates, and if the first finder is now standing on contacts associated with a free selector the absence of ground on test wiper 1075 will cause the No. 1 test relay 1020 to operate in series with magnet 1072 as before from ground on conductor 1284. Otherwise the finder will hunt until an idle selector is found, in the manner previously explained. Test relay 1020 upon operation, at make contacts 1027 prepares a circuit for the No. 1 call passing relay 1110, and at break contacts 1026 opens the circuit of finder start relay 1010 which restores after a short delay. Relay 1020 also, at make contacts 1025 prepares a circuit for the set up relay 1270, at make contacts 1024 puts direct ground on the test wiper 1075, at make contacts 1023 locks as before to test conductor 1284, and at make contacts 1021 and 1022 connects the trunk pulsing loop from make contacts 1186 to the No. 1 finder line wipers 1073 and 1074, this circuit being as before, from make contacts 1186 through make contacts 1152 and 1153, break contacts 1121 and 1122, and conductors 1008 and 1009.

The line relay of the new incoming selector seized by the No. 1 finder now operates over the pulsing loop, and the selector returns dial tone, which passes back to the second station by way of condensers C6 and C7. The second station thereupon dials the call number of the third station, back through his connector and over conductors 1004, 1006, 1107 and 1108 to the trunk pulsing relay 1185. Relay 1185 follows the dial pulses, and repeats them back over conductors, 1008 and 1009 to the new selector and connector, which select and ring the wanted third station. When the third station answers, the new connector cuts off the ring and completes a talking circuit between the two stations, by way of conductors 1008 and 1009, condensers C6 and C7, and conductors 1004 and 1006.

The two local stations now converse, and the third station may pick up the call, by operating his grounding button momentarily. This will cause the operation of control relay 1420 in the third connector, as explained for the previous transfer. Control relay 1420 thereupon at make contacts 1421 passes ground to cut-through relay 1410 by way of conductors 1494 and 1495 and make contacts 1533, and relay 1410 closes its contact 1415, to prepare its complete operation. The ground from control relay contacts 1421 at the same time now causes the operation of the No. 1 call passing relay 1110 in the trunk, over break contacts 1414 and conductor 1487, selector wiper 1383, make contacts 1344, the selector EC conductor corresponding to conductor 1303, the No. 1 finder EC wiper 1076, make contacts 1027, conductor 1214, break contacts 1257, conductor 1215, and the winding of relay 1110 to battery.

The No. 1 call passing relay 1110 upon operating over this circuit, opens break contacts 1111 and 1112 preparatory to the re-operation of relay 1120, and at break contacts 1126 opens the kick off circuit to the No. 1 motor magnet 1071 to prevent its re-operation at this time. Relay 1110 also at make contacts 1113 completes a kick off circuit for the No. 2 motor magnet 1081, which is as follows: ground from make contacts 1046, conductor 1093, make contacts 1113, conductor 1092, break contacts 1061, conductor 1091, make contacts 1162, conductor 1090, and the winding of motor magnet 1081 to battery. Relay 1110 further, at make contacts 1114 closes the circuit of set up relay 1270, from ground at make contacts 1025, through break contacts 1125, and 1063, and at make contacts 1115 closes the circuit of the call pickup relay 1160. Relay 1160 now operates and releases 1150 as before to re-connect the trunk. Relay 1270 likewise operates, and re-operates the No. 1 call switching relay 1120. Relay 1120 then, at make contacts 1123 and 1124 completes the talking circuit between the third station and the trunk, over conductors 1008 and 1009 and condensers C6 and C7, and at the same line connects relay 1185 to the third station time loop. Relay 1120 also, at contacts 1125 locks direct to the ground at make contacts 1025, and at contacts 1126 re-prepares the circuit of the No. 2 finder start relay 1030.

Motor magnet 1081 also operates, over the previously traced kick off circuit, and at interrupter springs 1082 causes the release of the No. 2 test relay 1040. Relay 1040 thereupon, at make contacts 1041 and 1042 disconnects the trunk from finder wipers 1083 and 1084, at make contacts 1043 disconnects ground from test wiper 1085, at make contacts 1044 disconnects ground from its own winding, at make contacts 1045 disconnects relay 1060, and at make contacts 1046 opens the locking circuit to the No. 2 call switching relay 1055, and the kickoff circuit to the No. 2 finder motor magnet 1081. Relay 1055 and the motor magnet thereupon restore and the motor magnet advances its wipers. The selector and connector associated with the No. 2 finder release as previously explained, upon the removal of ground from test wiper 1085.

When the party at the third station releases his grounding button, control relay 1420 in the third connector restores, and causes the associated cut-through relay 1410 to operate fully. Break contacts 1411 and 1412 thereupon cause the release of the connector line and release relays 1425, 1430 and 1440, and break contacts 1414 at the same time open the circuit back to the No. 1 call passing relay 1110 in the trunk. Relay 1110 then releases after a slight delay, and releases relay 1160. The connection is thereupon complete between the third station and the trunk and the second station is completely disconnected. This process can be continued indefinitely, and the call passed back and forth in this manner as often as desired, by using the incoming finders alternately.

An outgoing call may be transferred to another local station in the same manner as an incoming call. In this case of course, the trunk will have been seized over a local finder and selector, by way of the cable CA2, or possibly the cable CA1. When therefore, the originator of the call operates his grounding button momentarily, the shunting ground for the trunk control relay 1180 passes by way of the outgoing positive conductor such as 80, or 84, break contacts 1056, and conductors 1004 and 1007. Relay 1180 accordingly operates momentarily and operates the call transfer relay 1150, which locks up in the usual way and at make contacts 1157 operates the No. 1 finder start relay 1010. The No. 1 incoming finder then seizes a free incoming selector which returns dial tone to the originating station over conductors 1008 and 1009, break contacts 1121 and 1122, make contacts 1152 and 1153, break contacts 1142 and 1143, break contacts 1131 and 1133, condensers C7 and C8, conductors 1004 and 1006, break contacts 1056 and 1057, and conductors 80 and 81.

The originating station, upon hearing the dial tone, dials the call number of the wanted station into the pulsing relay 1185, over conductors 1004 and 1006 and conductors 1107 and 1108. Make contacts 1186 thereupon repeat these pulses to the selected incoming switches, over conductors 1008 and 1009. The incoming connector then rings the wanted station and when it answers, completes the talking connection between this station and the calling station over the same circuit described for the dial tone.

The new station picks up the call in the usual way by operating the station grounding button momentarily. This causes the operation of the call switching relay 1110 in the trunk over conductor 1214 as before, and relay 1110 in turn causes the operation of relay 1120 and the release of relay 1150 in the regular way. Make contacts 1113 on relay 1110 are now without effect however, due to the fact that the No. 2 test relay 1040 is not operated. Relay 1120 now at make contacts 1123 and 1124 connects relay 1185 to the new station, and relay 1150 at break contacts 1152 and 1153, completes the talking circuit between the new station and the trunk. The originating station may take part in the new conversation, or may retire from the connection by hanging up, as preferred.

If a privileged station engaged in a trunk call makes an inward call over the incoming switch train to a restricted station, the absence of a ground marking on the incoming EC conductor of the latter station will prevent the operation of the restrict relay in the incoming connector making connection with the restricted line, and this connector will then pass back busy tone superimposed on ring-back tone to the calling station as notice that he is calling a restricted station, as explained in the section on "Denied incoming call." Such a call cannot of course be transferred, due to the nonoperation of the restrict relay, and to the absence of any grounding button at the restricted station.

*Operator recall*

A local station engaged in a trunk call either incoming or outgoing, may signal the operator at any time by operating the grounding button at the station for a period of about 5 seconds. This causes the operation of control relay 1180 in the trunk circuit for a similar period. Relay 1180 at contacts 1181 now prepares a circuit for the ring up relay 1240, and at contacts 1182 and 1183 closes the previously traced multiple circuit to relays 1150 and 1280. Relay 1150 operates partly as before, and after 5 seconds relay 1280 also operates from the ground at make contacts 1183, through break contacts 1156, 1167, 1246 and 1265, and make contacts 1182.

The operator recall relay 1280 upon operating, at make contacts 1281 completes a direct current circuit to the lower winding of ring-up relay 1240 as follows: ground at make contacts 1181, conductor 1105, break contacts 1261, make contacts 1232 and 1281 and the lower winding of relay 1240 to battery. Relay 1240 upon operating, closes a locking circuit for itself through preliminary make contacts 1242 and break contacts 1261. Relay 1240 also at break contacts 1246 releases relays 1150 and 1280 and at make contacts 1245, lights the call lamp at the attendant's station. Both the call lamp and the busy lamp of this trunk are now lit, and the operator responds by operating the corresponding answer key.

Upon the operation of the answer key, connect relay 1250 operates as before and at contacts 1251 and 1252 connects the operator through to conductors 1107 and 1108. Relay 1260 also operates, and at make contacts 1264 causes the operation of busy relay 1615 at the attendant's position. The latter relay then puts warning tone on the connection as previously explained. Relay 1260 also at break contacts 1265 opens another point in the circuit of relay 1280, and at break contacts 1261 unlocks the ring up relay 1240 which releases and extinguishes the call lamp. The operator is now connected across the existing connection, with relay 1185 furnishing talking battery to both the local party and the operator, although the operator may if desired split the trunk and speak to the local party alone by pressing the grounding button momentarily to operate relay 1150.

In the case of an inward call wrongly extended, or a call transferred to the wrong local station, the operator may force the release of the connection by momentarily operating the release key 1660. Key 1660 thereupon closes a circuit to release relay 1140 in the trunk, by way of conductor 1298, make contacts 1263, and conductor 1279.

Release relay 1140 accordingly operates, and at preliminary make contacts 1141 closes the trunk holding bridge. Relay 1140 also splits the trunk at break contacts 1142 and 1143, at make contacts 1144 prepares a new source of busying ground for test conductor 82, and at break contacts 1144 removes holding ground from conductor 1284, to release the inward end of the connection. Relay 1140 further, at break contacts 1145 releases the busy relay 1615 at the attendant's cabinet to remove the busy tone, and at make contacts 1145 re-operates test relay 1620 thereby disconnecting relay 1615. Relay 1140 also, at make contacts 1146 operates set-up relay 1270 momentarily, and at make contacts 1147 operates relay 1160. Relay 1160 now releases relay 1150 to further open the inward connection, and at make contacts 1161 closes another multiple point in the holding bridge temporarily. Relay 1270, at make contacts 1271 connects the alternate source of busying ground from make contacts 1144 to test conductor 82, by way of conductor 1102 and make contacts 1211 on the hold relay. Set up relay 1270 also, at make contacts 1273 re-operates call switching relay 1120 momentarily, or holds it if it was already operated by reason of the previous call, but this is without significance.

Meanwhile, upon the removal of holding ground from conductor 1284 in the trunk, by the opening of break contacts 1144 on the release relay 1140, the incoming selector and connector engaged in the call both release in the manner already explained. The operated test relay, such as 1020 or 1040 also restores, and at make contacts 1025 or 1046 opens the locking circuit of the corresponding call switching relay. In the case of call switching relay 1055, this relay would thereupon release after a slight delay, but in the case of the call switching relay 1120, this relay is now held from set up relay 1270, and so would remain operated for the time being.

When now, the operator restores the release key, relay 1140 restores, and at break contacts 1142 and 1143 re-connects the inductive resistor IC4 across the trunk. Relay 1140 also, at make contacts 1141 opens one of the multiple paths for the holding bridge, at break contacts 1144 replaces the ground on conductor 1284, at make contacts 1146 opens the circuit to set up relay 1270 and at make contacts 1147 opens the circuit of the call pick up relay 1160. The release of break make contacts 1145 is without effect, and test relay 1620 at the attendant's position remains locked to break contacts 1145, by way of contacts 1235, 1264, 1658 or the equivalent, 1636, 1621, 1256, and 1651. Relays 1160 and 1270 now restore after a slight delay, and relay 1160 opens the holding bridge, while relay 1270 opens the circuit of relay 1120, which also restores, after an additional slight delay.

The operator may now set up a new inward connection in the usual way by operating the transfer key 1664 momentarily, and dialling the number of the proper local station. The operation of the transfer key causes control relay 1180 to operate, thereby re-operating relay 1150. Relay 1150 then operates the No. 1 finder start relay 1010 to set up the new connection through the first incoming finder. The finder then finds an idle incoming selector, and when the operator hears the dial tone she dials the new number and the new connection is completed the same as an original inward connection.

*Operator calls*

Any local station may call the operator over the local switch train, by merely removing the receiver and dialling the operator's number, which is here assumed to be "211." The seized local connector thereupon steps its wipers up one and in one, and wipers 90, 91 and 92 make connection, through the cable CA3, with the normal conductors 55, 56 and 57 of the operator's line circuit shown in the lower part of Figure 1. Conductors 55, and 56 are thus extended to the operator's line conductors 50 and 51 terminating in the keys 1665 and 1670 at the attendant's station.

If the operator is not using this line at the time, her line relay 150 now operates, over the test normal conductor 57, in series with the test relay 550 in the local connector, which thereupon locks itself operated, puts direct ground on the test wiper 92, and starts the ringing over wipers 90 and 91, normal conductors 55 and 56, and line conductors 50 and 51. Each pulse of ringing current now passes through break springs 1666 and 1675 on the operator and night service keys 1665 and 1670, and causes the operator relay 1625 to operate intermittently in response. At each operation of relay 1625, make contacts 1626 and 1627 light the operator and pilot lamps L5 and L6 briefly, and make contacts 1628 prepare the audible signal circuits, which are however ineffective unless one of the keys 1680 or 1681 is closed.

To answer such a call, the operator has only to close the operator key 1665. Break springs 1666 and 1667 on this key thereupon disconnect the operator relay 1625 to stop the slow flashing of the lamps, and make springs 1666 and 1667 connect the resistor R20 across conductors 50 and 51 to stop the ringing, by the operation of the connector ring-cutoff and back-bridge relays 540 and 530. Make springs 1668 on key 1665 also remove ground from conductor F leading to the next position, to disable the relay 1630 thereat, and make springs 1669 close a circuit from ground at make contacts 1643 to the switching relay 1630 at the first position. Relay 1630 now operates after a slight delay, due to being made slow to operate, as by the use of a copper slug on the armature end of the core. Relay 1630, at break contacts 1631 disconnects ground from the middle springs of the position's answer keys, in order to disable the circuits therefrom to the trunk connect relays, and thus prevent the operator from answering any trunk calls at the moment. Relay 1630 also, at make before break contacts 1632 and 1633 disconnects the resistor R20, and extends conductors 50 and 51 to the operator's telephone. As springs 1632 and 1633 change position, the resistor R20 is connected across the operator's circuit momentarily and helps to minimize the switching click in the operator's receiver. Upon the completion of the movement of springs 1632 and 1633 a talking circuit is completed between the calling station and the operator, by way of the talking condensers C3 and C4 in the local connector, make contacts 541 and 542 on the ring cutoff relay, wipers 90 and 91 and the engaged bank contacts, cable CA3 to Figure 1, normal conductors 55 and 56, line conductors 50 and 51 to Figure 16, break springs 1675 on the night service key, make springs 1666 and 1667 on the operator key, make contacts 1632 and 1633, and make contacts 1637 and 1638 to the operator's telephone. The connector back bridge relay 530 furnishes talking battery to the operator, while the line relay 410 furnishes talking battery to the calling station.

The operator, likewise, may call any local station over the local switch train, by first closing the operator key 1665, and then dialling the call number of the desired station. Upon the closing of the operator key, break-make springs 1666 and 1667 disconnect the operator relay 1625 from the line conductors 50 and 51 and connect resistor R20 across these conductors in its place, while make contacts 1669 close the circuit of switching relay 1630 as before. Upon the shorting of the line by resistor R20 the operator's line relay 150 operates in its first step to start a preselected local linefinder to hunting the operator's line, just as described for a local call. Switching relay 1630 also operates after the usual slight delay, and connects the operator's telephone to line conductors 50 and 51, disconnecting the resistor R20 at the same time, without interrupting the circuit of line relay 150.

Meanwhile the preselected local linefinder, in response to the partial operation of line relay 150, has stepped up one step to the first level where the vertical wiper 291 encounters the ground marking from relay 150 on conductor 54, and then stepped one step in on this level, where test wiper 62 encounters the battery marking from relay 150 on the test conductor 52. Test relay 815 in the distributor then operates, just as described for a local call, and switches the finder through. The finder thereupon operates line relay 150 in its second step, and seizes the associated local selector, which returns dial tone. The operator then dials, and the call is completed in the usual way.

Since the operator's line is connected to the first contacts of the first level in the line finders, vertical wiper 292 is grounded, and cam springs 239 are still closed. This permits the operator to cut in on a busy line if desired, by dialling an extra digit "1" to operate the monitor relay 520 in the connector, in the same manner as described in the section on "Local call right of way service."

To make a trunk call, the operator has only to select an idle trunk, whose busy lamp will be dark, operate the answer key thereof, and, upon receiving dial tone from the main office, dial the number of the wanted city subscriber. For this purpose, the operator will preferably select a trunk other than the eight reserved as first choice to the local selectors, although she may select any idle trunk as indicated by the condition of the corresponding trunk busy lamp.

Upon the operation of the associated answer key, the connect relay 1250 of the selected trunk operates, as previously described, and causes the operation of the pulsing, auxiliary-connect, and test relays 1185, 1260 and 1620 as before. Relay 1185 thereupon causes the operation of the hold relays 1210, 1220 and 1230. Relay 1220 closes the trunk loop through the resistor IC4 and pulsing contacts 1186 to seize an incoming selector at the main exchange, and at make contacts 1225 lights the trunk busy lamp. Relay 1230 makes the trunk busy to the local selectors and closes the holding circuit of relay 1620.

The incoming selector at the main exchange returns dial tone over the trunk to the operator, by way of condensers C6 and C7 and conductors 1107 and 1108, and the operator thereupon starts dialling. Relay 1185 follows the dial pulses and make contacts 1186 repeat them to the trunk, with relay 1130 operating at the start of each digit as usual to clear the pulsing circuit. Upon the conclusion of the pulsing, the distant switches ring the called party in the usual way and pass back ringing tone by way of break contacts 1131 and 1132 on the now normal pulse loop relay and condensers C6 and C7, and when the called party answers, the talking circuit is completed over the same path. Pulsing relay 1185 furnishes talking battery to the operator, and the distant connector switch furnishes talking battery to the called station. Release of the trunk is under the control of the operator, and is effected by the release of the answer key.

*Night service—General*

To set up night service, the operator merely unplugs her headset 1687 from the telephone jack 1678 and closes the night service key 1670. Upon the removal of the headset plug from the jack 1678, make springs 1679 open, and release the guard A and guard B relays 1635 and 1640, thereby disabling the busy, test, and switching relays 1615, 1620 and 1630. Upon the operation of the night service key 1670, break springs 1671 remove ground from the common conductor 1687 to disable the trunk call and trunk busy lamps, and the pilot relay 1610, break springs 1672 remove the resistor R19 ground from the answer keys to disable the trunk connect relays, break springs 1673 remove their ground from the generator start conductor, break springs 1675 disconnect one side of the operator's line to disable the operator relay 1625, and make springs 1674 connect negative battery through resistor R18 to the multipled conductor 1696 and the trunk terminals 1289 leading to the various night circuits, which are thus cut into service.

*Night service I*

The first form of night service, as shown in Figure 17, involves the assignment of a particular trunk to a particular local telephone so that any incoming night calls over that trunk will signal the particular station involved and no other. In this case, an equipment unit per Figure 17 is permanently connected to the proper night service terminals of each trunk so assigned. The actual connections may be readily seen by placing Figure 17 on the right of Figure 12, with terminal 1200 aligned with conductor 1700, and so on. It will be apparent that terminals 1203, 1204 and 1209 are not required with this circuit, and also that this circuit is dead and without effect on the normal operation of the trunk unless the night service key is operated to connect battery to relay 1730.

Assuming therefore that the trunk of Figures 10, 11 and 12 is connected to Figure 17 as indicated, and that a night call comes in over this trunk, which is assigned to the station A in Figure 1, the arrival of ringing current over the trunk conductors 1290 and 1291 will first operate ring up relay 1240 in the usual way. Relay 1240 thereupon, at preliminary make contacts 1242 locks to ground on terminal 1206, by way of break contacts 1232, at break contacts 1241 disconnects its upper winding from the trunk line, and at make contacts 1247 connects busying ground from terminal 1208 to test conductor 82 by way of break contacts 1272, to make the trunk busy in the banks of the local connectors. Relay 1240 further, at make contacts 1244 closes a circuit for the operation of signal relay 1730 as follows: ground at contacts 1244, terminal 1207, conductor 1707, winding of relay 1730, break contacts 1755, conductor 1789, terminal 1289, and conductor 1696 to battery through make springs 1674 on the night service key.

Signal relay 1730 upon operation, at make contacts 1731, 1732 and 1737 prepares a warning circuit for use in case the called line is busy, at make contacts 1736 grounds the ringing generator start lead, at make contacts 1735 shunts break contacts 1755 preparatory to the operation of test relay 1750, and at make contacts 1734 prepares a locking circuit for the test and ring cutoff relays 1750 and 1710 as well as an alternate source of busying ground for test conductor 82, in anticipation of the release of relay 1240. The signal relay 1730 further, at make contacts 1733 closes an obvious circuit to the time start relay 1740 from ground at break contacts 1721. Relay 1740 accordingly operates, and at make contacts 1741 and 1742 closes a holding circuit for itself and prepares a circuit for relay 1230. Relay 1740 also, at make contacts 1743 energizes the timing relay 1720, which however being a thermal relay with a time delay of 60 seconds, does nothing for the time being. Relay 1740 finally, at make contacts 1744, connects ground to the lower winding of test relay 1750, and if the station A is idle, test relay 1750 thereupon operates in series with this station's line relay over the test normal conductor 17' to Figure 1, and through the upper winding of line relay 110, which also operates to clear the called line for ringing.

Upon the operation of test relay 1750, preliminary make contacts 1754 close first and close a locking circuit for the upper winding which permits relay 1750 operate completely. Relay 1750 thereupon at break contacts 1756 disconnects the warning circuit, and at break contacts 1755 prepares the release of the signal relay now held through make contacts 1735. Relay 1750 further at make contacts 1753 puts direct ground on test conductor 17' to mark the called station busy, and at make contacts 1751 and 1752 closes the ringing circuits. Ringing current with superimposed battery now passes into the called line through the lower winding of the ring cutoff relay 1710, break contacts 1712, make contacts 1752, normal conductor 16', line conductor 11, the ringer not shown at station A, line conductor 10, normal conductor 15' back to Figure 17, and make contacts 1751 to ground at break contacts 1711.

When the called station A answers, in response to the ringing signals, ring cutoff relay 1710 operates over the line loop and the previously traced ringing circuit in known manner, and at preliminary make contacts 1713 closes the circuit to its upper winding, thus assuring its complete operation. Relay 1710 thereupon, at break make contacts 1711 and 1712 opens the ringing circuit and connects the called station loop to trunk pulsing relay 1185 over the following circuit: station A line conductors 10 and 11, conductors 15' and 16', make contacts 1751 and 1752, make contacts 1711 and 1712, conductors 1700 and 1701, terminals 1200 and 1201, conductors 80' and 81', break contacts 1056 and 1057, conductors 1004 and 1006, conductors 1107 and 1108, and the windings of relays 1180 and 1185 to ground and negative battery as shown.

Pulsing relay 1185 operates over this circuit, and causes the operation of hold relays 1210, 1220, and 1230. Hold relay 1210 thereupon at make contacts 1211 connects an alternate source of busying ground to test conductor 82, from break contacts 1144, over conductors 1283 and 1102 and break contacts 1271, while the hold A relay 1220, at make contacts 1221 and 1222 closes the trunk loop, through resistor IC4, and make contacts 1186, thereby switching the calling party through at the main exchange. Make contacts 1221 and 1222 at the same time complete the talking circuit between the calling party and the called party extending from the trunk conductors 1290 and 1291, through make contacts 1221 and 1222, conductors 1103 and 1106, break contacts 1152, 1153, 1142, 1143, 1131 and 1133, condensers C6 and C7, conductors 1004 and 1006, break contacts 1056 and 1057, and conductors 80' and 81' through Figure 17 to the called station A. Talking battery is furnished to station A from pulsing relay 1185.

The hold B relay 1230, which operates immediately after hold A relay 1220, now opens break contacts 1232, thereby unlocking and releasing the ring-up relay 1240. Relay 1240 in turn, at make contacts 1247 removes the original ground from test conductor 82 now grounded through make contacts 1211, at break contacts 1243 passes the last named ground on conductor 82 to terminal 1202 and conductor 1702 to hold the test and ring cutoff relays 1750 and 1710, and at make contacts 1244 opens the circuit of the signal relay 1730. Relay 1730 thereupon restores and releases time start relay 1740. Relay 1730 also at make contacts 1734 removes its locking ground from conductor 1702 but this is without effect, due to the ground now on conductor 1702 from the trunk circuit. Relay 1740 upon releasing, at make contacts 1743 opens the timing circuit.

In case station A is engaged at the time the trunk seizes the night service circuit of Figure 17, relays 1730 and 1740 will operate as described, but due to the presence of busying ground on conductor 17' from the line circuit, test relay 1750 is shunted and cannot operate. The ringing circuit therefore remain open, but ringing current from the generator now passes through make contacts 1737, break contacts 1756 and conductor 1763 to the primary of the common ringing tone induction coil IC17 shown enclosed by the dotted rectangle 1760. Ringing tone is thereby induced into the secondary winding IC18 of this coil and is passed to the station A over conductors 1761 and 1762, make contacts 1731 and 1732, break contacts, 1751 and 1752, and conductors 15' and 16'.

This ringing tone is heard at the station A, who recognizes it as the signal for a waiting incoming call. To accept the call, station A has only to hang up, whereupon test relay 1750 operates to disconnect the tone and start the ringing, and when the called station answers, the night circuit switches the call through in the manner already explained.

If the called station does not hang up however, on hearing the ringing tone, timing relay 1720 will operate, approximately one minute after the operation of relay 1740, and release the connection. Relay 1720 upon operating at break contacts 1721 opens the circuit of relay 1740, but this relay being made slow to release, remains operated for an instant. Relay 1720 then, at make contacts 1721 closes a momentary circuit to the upper winding of the hold B relay 1230 by way of make contacts 1742, conductor 1705 and terminal 1205. Relay 1230 thereupon operates and at break contacts 1232 unlocks and releases ring up relay 1240, which in turn opens the circuit of relay 1730. If the calling station has hung up in the meantime, the night circuit and relay 1230 will now restore. If the calling station remains on the line however relay 1240 will re-operate and the foregoing cycle will be repeated, until the called station hangs up, or the calling party either hangs up or is disconnected at the main exchange.

To make outward calls, station A dials through the local switch train as for a daytime outgoing call, and is automatically directed to the first available idle trunk. Night calls may also be transferred like day calls.

*Night service II*

The second form of night service as shown in Figures 18 and 19 involves the services of a night telephone operator at some central or otherwise convenient location where he is provided with a small cabinet containing a small number of keys and lamps and a signal bell, together with a telephone instrument which may be of any convenient type, with the keys connected as shown to a number of trunk finders, the respective bank contacts of which are connected in multiple to any required number of trunks. The actual connections for one trunk may be seen by placing Figures 18 and 19 to the right of Figure 12, with the terminal 1200 in line with the conductor 1800, and so on, it being understood that the conductors 1800, 1801, 1802 and 1804 are multipled also to corresponding bank contacts on the other trunk finders, such as those indicated in Figure 19, by the rectangles 1990 and 1991. Terminals 1205 and 1209 are not used, and conductors 1803 and 1807 should be multipled to all trunks assigned to this service.

Assuming now, that the trunk of Figures 10, 11 and 12 is connected to Figure 18 instead of to Figure 17, and that a night call comes in over this trunk, the trunk ring up relay 1240 will operate as before and lock to the ground at terminal 1206. Relay 1240 also as before at make contacts 1247 grounds test conductor 82 to busy the trunk. Relay 1240 further, at make contacts 1243 connects negative battery from terminal 1203 to terminal 1202 to mark the calling trunk in the test bank of the trunk finders and at make contacts 1244 closes a circuit for the operation of the call relay 1875 in each trunk finder, by way of the terminal 1207 and conductor 1807. The relays 1875 thereupon operate and at make contacts 1876 ground conductor 1902 to light the trunk call lamp L8 at the night operator's position, and to ring the night bell 1982, assuming that the cutoff key 1983 has its contacts closed as shown.

To answer the call, the night operator has only to remove his receiver, select any trunk finder by operating the corresponding answer key, such as the upper key 1910 for example, and upon receiving dial tone from the finder, pressing the grounding button 1981 associated with his telephone. Upon the operation of the answer key 1910, make springs 1912 close without effect but make springs 1911 and 1913 close a circuit for pulsing relay 1825, which may be traced from ground at the break off normal springs 1894, through the upper winding of relays 1825 and 1820 in series, break contacts 1811, conductor 1900, make springs 1911, break springs 1921 and 1931 and similar springs on any intervening keys, not shown, through the night operator's telephone, break springs 1933 and 1923 and similar springs on the intervening keys if any, make springs 1913, conductor 1901, break contacts 1812 and the lower and middle windings respectively of relays 1820 and 1825 to battery. Control relay 1820, being connected opposing, does not operate over this circuit, but pulsing relay 1825 does operate.

Pulsing relay 1825 thereupon operates the hold relay 1830 from make contacts 1826. Hold relay 1830, at make contacts 1831 operates the hold slave relay 1840. Relay 1840 thereupon, at make contacts 1847 grounds the generator start lead, at make contacts 1846 prepares locking circuits for the finder start and stepping relays 1850 and 1860, at make contacts 1845 prepares a locking circuit for the cut-through relay 1810, and at make 1844 connects dial tone from break contacts 1855 and 1866 to the lower winding of the line relay 1825 from where it is induced into the other windings and so back to the night operator. Relay 1840 also, at make contacts 1843 connects an alternate source of ground to the upper winding of pulsing relay 1825 preparatory to the starting of the finder, at make contacts 1842 prepares a pulsing circuit, which however, is not required for incoming calls, and at make contacts 1841 connects ground from make contacts 1877 through break contacts 1863 to the hunting relay 1870 which operates, and prepares the hunting circuit.

The night operator, upon hearing the dial tone, now closes the grounding button 1981 momentarily, thereby shunting the upper winding of control relay 1820 over conductor 1900. Relay 1820 now operates from the pull of its lower winding, and at make contacts 1821 closes a circuit to the upper winding of the finder start relay 1850 from ground at make contacts 1846 on the hold slave relay. Relay 1850 being a marginal relay thereupon operates partly and closes its preliminary make contacts 1856. This prepares a circuit to the lower winding, now shunted by ground from both sides of itself. As soon as the night operator releases the grounding button however, and control relay 1820 restores, the opening of make contacts 1821 removes this shunt, and relay 1850 operates completely, with both windings energized in series from ground from make contacts 1846 through make contacts 1850.

Finder start relay 1850 upon operating, at break contacts 1855 disconnects the dial tone, at break contacts 1854 disables the stepping relay 1860, at make contacts 1852 prepares the stopping circuit, and at make contacts 1853 closes a circuit to the finder motor magnet 1891, from ground at make contacts 1871 through interrupter springs 1892 and break contacts 1815. Motor magnet 1891 thereupon operates on a self interrupting basis and advances the finder wipers quickly over the bank contacts in search of the calling trunk. The off normal springs 1893 and 1894 operate in the usual manner on the first step. As soon as the finder reaches the calling trunk, wiper 1897 encounters the negative battery placed on terminal 1202 by the ring up relay 1240 thereof.

The trunk finder cut-through relay 1810 now operates, from negative battery on conductor 1802, wiper 1897, break contacts 1813, make contacts 1852, and the upper winding of relay 1810 to ground. Relay 1810 upon operating, at preliminary make contacts 1816 locks through its lower winding to ground at make contacts 1845, and at break contacts 1815 disconnects the motor magnet to stop the finder. Relay 1810 also, at make contacts 1814 grounds the EC conductor 1804, but this is without significance at this time. Relay 1810 further at break-make contacts 1813 opens the original circuit of relay 1810 and prepares an alternative locking circuit therefor, and at break-make contacts 1811 and 1812 disconnects and releases pulsing relay 1825, and connects the operator's telephone loop through to the trunk pulsing relay 1185, through the finder line wipers 1895 and 1896, conductors 1800 and 1801, terminals 1200 and 1201, conductors 80' and 81', break contacts 1056 and 1057, conductors 1004 and 1006, and conductors 1107 and 1108.

Pulsing relay 1185 accordingly operates, and causes hold relay 1210, 1220, and 1230 to operate in succession in the usual manner. Relay 1210 thereupon re-grounds test conductor 82 preparatory to the release of the ring-up relay, while relay 1220 at make contacts 1221 and 1222 closes the trunk loop through to make contacts 1186, to switch the call through at the main office, and thereby complete the talking circuit between the distant calling station and the night operator, by way of break contacts 1131 and 1133, condensers C6 and C7, conductors 1004 and 1006, break contacts 1056 and 1057, conductors 80' and 81', terminals 1200 and 1201, conductors 1800 and 1801, trunk finder wipers 1895 and 1896, make contacts 1811 and 1812 and conductors 1900 and 1901 to the night operator. Talking battery for the latter is of course furnished from the trunk pulsing relay 1185, the finder pulsing relay 1825 being now disconnected as stated, at break contacts 1811 and 1812.

The hold B relay 1230 upon operating, at break contacts 1232 unlocks and releases ring up relay 1240 as usual. Relay 1240 upon releasing, at make contacts 1247 removes the original ground from terminal 1208 from the test conductor 82, now grounded as previously mentioned from ground at break contacts 1144, over conductors 1283 and 1102 and break contacts 1271 and make contacts 1211. Relay 1240 also, at make contacts 1244 opens the circuit of call relay 1875 which restores and extinguishes the trunk call lamp LS and stops the ringing of the bell 1882. Relay 1240 further at break-make contacts 1243 disconnects negative battery from the terminal 1202 and replaces it with ground from conductor 82, to make this trunk busy to the other trunk finders, and to provide an alternate holding circuit for relay 1810 over conductor 1802, wiper 1897 and make contacts 1813, preparatory to the release of relay 1840. The slow to release hold relay 1830 then releases, after a suitable interval, following the release of pulsing relay 1825, and causes the release of relays 1840, 1850 and 1870, leaving only relay 1810 operated in the trunk finder circuit.

The night operator upon determining the identity of the wanted local station, may transfer the call thereto in the same manner as the day operator, by again operating the grounding button momentarily, and dialling the number of the wanted station through the incoming switch train. The operation of the grounding button causes the momentary operation of control relay 1180 in the trunk, whereupon call transfer A relay 1150 operates as before to seize an incoming selector through the No. 1 incoming finder 1070.

Briefly, the operation of relay 1050 puts a holding bridge on the trunk, transfers the pulsing contacts 1186 to conductors 1008 and 1009, and operates finder start relay 1010. The finder 1070 then finds an idle incoming selector, whereupon test relay 1020 operates and switches pulsing contacts 1186 through, to seize this selector, which returns dial tone. The night operator then dials, and in response to the first digit the selector switches through to an idle incoming connector, which responds to the final digits to select and ring the called line. When the called station answers, the ring cut-off relay 1540 in the connector operates and completes the talking circuit between the night operator and the called station which may be seen to extend from conductors 80' and 81', through break contacts 1056 and 1057, conductors 1004 and 1006, condensers C6 and C7, break contacts 1131, 1133, 1142 and 1143, make contacts 1152 and 1153, break contacts 1121 and 1122. Talking battery for the operator is from relay 1185 and for the called station from the connector line relay 1425.

To accept the call, the called station presses his grounding button momentarily, thereby operating control relay 1420 in the connector momentarily. Upon the operation of relay 1420, cut through relay 1410 operates partly, and the call passing relay 1110 in the trunk also operates from the same source, by way of conductors 1487, 1303, 1214 and 1215. Relay 1110 thereupon operates relays 1160 and 1270, and relay 1160 releases 1150 to prepare the final talking circuit, while holding the trunk momentarily at contacts 1161. Relay 1270 at make contacts 1273 operates call switching relay 1120 which locks as before to relay 1020, and switches the trunk through. Relay 1270 also, at break contacts 1271 removes the ground from break contacts 1144 from the test conductor 82 momentarily, and consequently, from the terminal 1202 and conductor 1802. This opens the holding circuit for cut-through relay 1810 in the trunk finder circuit and this relay promptly restores and closes a homing circuit for the finder switch 1890. This circuit is from ground through break contacts 1826, break contacts 1842, off normal make springs 1893, interrupter springs 1892, break contacts 1815 and the winding of motor magnet 1891 to battery. The switch 1890 thereupon speeds back to its home position, when off normal springs 1893 open and stop further movement.

Upon the release of the connector control relay 1420 following the release of the grounding button at the called station, cut through relay 1410 operates completely and disconnects line relay 1425 as previously explained. Relay 1110 in the trunk now also releases after a slight delay and releases relays 1160 and 1270. Relay 1160 then opens the holding bridge, and relay 1270 re-connects ground to test conductor 82. The talking connection is now complete between the called station and the trunk, by way of conductors 1008 and 1009, make contacts 1123 and 1124 and condensers C6 and C7, with talking battery now furnished to the called party from relay 1185 in the trunk circuit. Upon the completion of the call, the night operator retires from the connection by releasing the answer key and restoring the receiver.

If a second call comes in before the night operator has completed the first, he may hold the first call by closing the associated hold key, such as key 1940, releasing the associated answer key, and then operating a new answer key, to seize a different trunk finder. This finder then returns dial tone and the operator again operates button 1981 momentarily to cause the second trunk finder to find the new call. He may then hold this call and return to the first call, or complete the second call first, as considered desirable. As many calls may be held in this way as there are trunk finders. However, no two answer keys should ever be in the operated position at the same time, as otherwise, the chain circuit through the keys may be broken and release an uncompleted call upon the release of a hold key. The night operator should also remain on the line after the completion of dialling until the called station answers, in order to hold the trunk pulsing and hold relays, although he can if desired, hold them with the hold key, in order to answer another call before the first station has answered. Otherwise, the release of relay 1185 will cause the release of the connector relays 1425, 1430 and 1440, the release of relay 1210 will remove ground from test conductor 82 and terminal 1202, thus causing the release of the trunk finder involved, the release of relay 1220 will disconnect the trunk line and the calling party, and the release of relay 1230 will remove ground from conductor 1284, thus releasing the incoming switches. The night operator may cut in on a busy called line to offer a call, by dialling an extra digit "1," the same as the day operator.

To make an outgoing call, the night operator, after removing his receiver, operates any answer key to seize the associated trunk finder, which operates its relays 1825, 1830 and 1840 as before and returns dial tone to the operator. Upon hearing the dial tone, the operator then operates the grounding key 1981 momentarily as before to operate control relay 1820. Upon the operation of relay 1820 the finder start relay 1850 operates in its first step, and on the release of relay 1820 start relay 1850 operates fully. At this time, neither of the relays 1870 or 1875 is operated, so that when relay 1850 operates in its second step, the finder switch 1890 starts in search of an idle trunk.

For each busy trunk connected to this night circuit, ground from the trunk test conductor 82 through break contacts 1243 on the ring-up relay will be on the corresponding contact in the bank associated with the finder switch wiper 1897. The bank contacts associated with idle trunks on the other hand will have no potential on them. If therefore, the trunk connected to the normal contacts of the switch 1890 is busy at the time relay 1850 operates the presence of ground on test wiper 1897 shunts the upper winding of cut through relay 1810 to prevent its operation, and causes the operation of the motor magnet 1891, through make contacts 1852, break contacts 1862 and 1871, make contacts 1853, and the interrupter springs 1892 and break contacts 1815. The motor magnet thereupon interrupts its own circuit as before and advances the wipers to the next contacts, and this action continues until test wiper 1897 encounters an idle trunk, which may again be assumed to be that of Figures 10, 11 and 12.

When therefore this idle trunk is found, the absence of shunting ground on wiper 1897 permits relay 1810 to operate in series with the finder motor magnet over the following circuit: ground through the upper winding of relay 1810, break contacts 1862 and 1871, make contacts 1853, interrupter springs 1892, break contacts 1815, and the winding of magnet 1891 to battery. The motor magnet will not operate in this circuit, but relay 1810 closes its contacts 1816 to cut in its lower winding, and then operates fully. Relay 1810 thereupon, at break contacts 1815 disconnects the motor magnet, and at make contacts 1814 connects marking ground through resistor R23 to the upper winding of restrict relay 1050 in the trunk, by way of finder wiper 1898, conductor 1804, terminal 1204, and conductors 83'. This circuit is without effect at the moment however due to the high resistance of resistor R23. Relay 1810 also, at break make contacts 1813 transfers wiper 1897 to its lower winding to prepare another holding circuit for itself, and at contacts 1811 and 1812 disconnects relay 1825 as before, and connects the night operator's telephone through to the trunk pulsing relay 1185 as before, over conductors 1800 and 1801, 80' and 81', 1004 and 1006, and 1107 and 1108.

Relays 1185, 1210, 1220 and 1230 in the trunk now operate as before to complete the connection. Thus, relay 1185 prepares to close the trunk loop, while relay 1210 grounds the test conductor 82 to make this trunk busy. This ground also passes through break contacts 1243 on the unoperated ring-up relay to the lower winding of cut-through relay 1810, by way of terminal 1202, conductor 1802, wiper 1897 and make contacts 1813, and holds relay 1810 following the release of hold slave relay 1840 which occurs after a short delay following the disconnection and release of pulsing relay 1825. Relay 1220 at contacts 1224 energizes the lower winding of restrict relay 1050 which relay being now unbalanced, operates and grounds the positive trunk conductor to permit through toll dialling, if desired. Relay 1220 further, at contacts 1221 and 1222 completes the trunk loop, through pulsing contacts 1186. The operation of relay 1230 is without special significance at this time.

The completion of the trunk loop through contacts 1186 now causes the seizure of an incoming switch at the main exchange. The main exchange then returns dial tone over the trunk which passes to the night operator by way of condensers C6 and C7, conductors 1004 and 1006, break contacts 1056 and 1057, and conductors 80' and 81'. The night operator upon hearing the dial tone, then dials the number of the wanted distant station in the usual way. Relay 1185 responds and at make contacts 1186 repeats the pulses over the trunk loop to operate the distant switches, which complete the connection in known manner. When the called station answers conversation proceeds, with talking battery for the night operator supplied as usual from relay 1185.

The night operator may also make an outgoing call over a particular trunk by driving the finder switch 1890 to the corresponding position before operating the grounding button. To do this, the night operator must of course, know the location of the trunks on the finder banks, or have this information at hand, and must then dial one or more successive digits as required to set the switch wipers to the required position. To select the first trunk for example the operator would simply dial a "1," whereas for the 15th trunk he would probably dial an "0" and a "5."

Assuming for example that the night operator wished to make an outgoing call over the trunk of Figures 10, 11 and 12 which is shown connected to the 6th contacts, the night operator will, after removing the receiver and closing an answer key, dial the digit "6." Upon the removal of the receiver and the closing of the answer key, relays 1825, 1830 and 1840 of the selected trunk finder operate as before, and return dial tone. Upon hearing the dial tone, the operator dials the digit "6" as stated. Pulsing relay 1825 follows the dial pulses, and repeats them to the motor magnet 1891 by way of break contacts 1826, make contacts 1842 and break contacts 1815. The motor magnet thereupon advances the switch wipers to the 6th contacts. The off-normal springs 1893 and 1894 operate on the first step as before, but this is without effect. Stepping relay 1860 operates on the first pulse also, in two steps. Thus, on the first release of relay 1125, the upper winding of relay 1860 is energized, in multiple with the motor magnet, by way of make contacts 1842, break contacts 1854 and break contacts 1864. Relay 1860 partly operates over this circuit and closes its preliminary make contacts 1867, thereby placing ground on both sides of its lower winding, preparatory to full operation. Upon the reoperation of relay 1825 therefore, the original circuit is opened and relay 1860 operates in its second step, with both windings energized in series, from ground at make contacts 1846, through make contacts 1867. Relay 1860 upon full operation, at break contacts 1866 opens the dial tone circuit, at make contacts 1865 prepares the busy tone circuit, at break contacts 1864 disconnects itself from the pulsing circuit, at break contacts 1863 disconnects the in-hunting relay 1870, at break contacts 1862 opens the out-hunting circuit, and at make contacts 1861 prepares a new testing or cut through circuit.

After dialling the trunk number in the foregoing fashion, the night operator then operates the grounding button 1981 momentarily. Control relay 1820 is thereby again unbalanced and operates momentarily, causing relay 1850 to operate in two steps, and likewise lock to make contacts 1846. Relay 1850 upon full operation closes make contacts 1855 to complete the busy tone circuit, operates contacts 1854 and 1853 without effect, and at make contacts 1852 and 1851 completes the cut-through circuit. If the called trunk is idle, cut-through relay 1810 now operates, from ground through its upper winding, through make contacts 1852, 1851 and 1861, and the resistor R24 to battery. Relay 1810 thereupon switches through to the trunk, cuts off the busy tone before it can be effective, and causes the release of relays 1825, 1830, 1840, 1850 and 1860. The trunk then extends the call to the central office as previously explained. If the called trunk is busy however, busying ground therefrom on test wiper 1897 shunts the upper winding of relay 1810 and prevents the latter from operating. Busy tone is accordingly passed back to the operator as an indication of the busy condition.

The night operator may also seek an idle trunk in a particular group of trunks connected to successive contacts by dialling the first trunk in the manner stated, and then if the first trunk of the group is busy, dialling a "1" or a series of "1's" until an idle trunk is found. Since the relays 1850 and 1860 are already operated, it is not necessary to reoperate the grounding button, and the trunk finder will cut-through automatically as soon as an idle trunk is found.

If an incoming call occurs on any of the trunks associated with this night circuit while the operator is hunting an outlet by stepping a finder motor magnet in this manner, the various call relays 1875 will operate, and operate the trunk call signals. The operator may then place the outgoing call in abeyance by operating the associated hold key, and pick up the incoming call on one of the other trunk finders. Or he may release the trunk finder involved in the outgoing call by releasing the answer key momentarily, and then reoperating it to pick up the new call on the same finder.

If an incoming call to this general group of trunks occurs while a finder is engaged in hunting an idle trunk for an outgoing call by the method first described, rather than by dialling, the incoming call will seize that finder and cause it to find the new call. Thus assuming that the operator has closed answer key 1910 to seize the finder of Figure 18 for an outgoing call, the operation of grounding key 1981 will operate finder start relay 1850 as before, and the finder will again start hunting for absence of ground to find an idle trunk. If an incoming call arrives while the finder is still hunting, the operation of call relay 1875 will immediately operate the in-hunting relay 1870. Relay 1875 brings in the trunk call signals as before, and relay 1870, at break contacts 1871 opens the out-hunting circuit, and at make contacts 1871 closes the motor magnet interrupter circuit. The finder switch thereupon continues to step independently of ground or absence of ground on test wiper 1897. When the test wiper 1897 however encounters the negative battery placed by the calling trunk on the corresponding test bank terminal, by way of make contacts 1243 on the ring-up relay, cut-through relay 1810 immediately operates to stop the hunting, and switches the operator through to the incoming call. Relays 1825, 1830, 1840, 1850, 1870 and 1875 thereupon release and disconnect the trunk call signals.

To make a local call, the night operator has only to remove the receiver of his telephone and dial the number of the wanted local station. Thus assuming that the day operator's line is used also by the night operator, and that all of the answer keys in Figure 19 are normal, the removal of the receiver from the telephone 1980 closes the operator's loop through the break contacts of the answer keys in series, to conductors 55 and 56 and so to the line relay 150 in Figure 1. Line relay 150 thereupon operates in its first step and starts a local finder in the regular way. When the finder has found this line it switches through to the associated selector which returns dial tone. The night operator then dials the wanted station's number and the call is completed in the usual way. The night operator may cut in on a busy connection when calling through the local switch train in this manner the same as the day operator.

A local station may also call the night operator over the local switch train by dialling "211" as for the day operator. The local connector thereupon places ringing current on conductors 55 and 56, and if the answer keys are all normal and the night operator's telephone not in use, the ringer of the latter instrument will be rung in the usual way, and the night operator will answer by merely removing the receiver. If one of the answer keys is operated however there will be no bell circuit, but the line will test idle, and the test relay 550 in the connector will operate to start the ringing, and will ground the test conductor 57. This ground passing through make contacts such as 1912 on the operated answer key, will light the local call lamp L7, and the operator on completing the trunk call, may answer the local call merely by releasing the operated answer key. The local connector will then cut off the ring and switch through.

*Night service III*

The third form of night service, as shown in Figure 20, is a form of group service in which a certain number of trunks are arranged to operate one or more general signals such as loud ringing bells, on an incoming call over these trunks, which signals may then be answered by any station privileged to make outgoing calls, by dialling "0" over the local switch train. Means are also provided whereby a predetermined station may cut out the general signal and cause all calls over these trunks to ring a local signal individual to that station. This station will then answer all calls over these trunks, and transfer them as required. If a general signal remains unanswered for a given time, a master signal at some strategic location such as a watchman's station will be operated briefly, after which the trunk will be released. The connections between the trunks and this equipment may be seen by placing Figure 20 on the right of Figure 12, with the terminal 1206 aligned with conductor 2006, and so on. It will be immediately apparent that this equipment provides no means for making connection with the trunk, but does control the locking ground for the ring up relay as well as the busying ground for test conductor 82. Similar connections to other trunks of the group are indicated at the upper left of this figure, together with the connections for busying the remaining trunks also.

Assuming therefore that the truck circuit of Figures 10, 11 and 12 is one of the trunks associated with Figure 20, over the conductors 2006, 2007, 2008, 2009 and 2089, and that a call comes in over this trunk, ring up relay 1240 operates from ringing current on the trunk line, and now locks over conductor 2006 to ground at break contacts 2074. Relay 1240 also, at make contacts 1247 grounds test conductor 82 from ground at break contacts 2054, by way of conductor 2008, terminal 1208, make contacts 1247 and break contacts 1272. Relay 1240 further, at make contacts 1244 closes a circuit for the operation of the signal relay 2010 as follows: ground at contacts 1244, terminal 1207, conductor 2007, break contacts 2032, 2041 and 2023, winding of relay 2010, conductor 2089, terminal 1289, and conductor 1696 to battery at the night service key 1670.

Signal relay 2010 upon operating over this circuit, at make contacts 2011 causes the operation of the busying relays, such as 2050 and 2060 in obvious manner. These relays thereupon, at their break make contacts such as 2052, 2053, 2054 etc. remove ground from the terminals 1208 of all of the associated trunks and connect ground to their terminals 1209. In this way, the test conductor 82 of the calling trunk is no longer grounded, but the test conductors of all of the other trunks are grounded, by way of their terminals 1209, break contacts 1247 and break contacts 1272. If they are already busy, this ground will of course be superfluous.

The signal relay 2010 also, at make contacts 2012 prepares a circuit for trip relay 2020, at make contacts 2013 closes a locking circuit for itself through break contacts 2023 on the trip relay, at make contacts 2014 prepares a circuit for the master alarm relay 2030, and at make contacts 2015 closes a circuit for the energization of the timing A relay 2040 which is set for a delay period of 60 seconds. Relay 2010 finally at make contacts 2016 closes a circuit to the general signal or signals 2093.

Any station qualified may answer, by removing their receiver to seize a local link in the manner previously described for outgoing trunk calls, and then dialling an "0" upon receiving dial tone from the local selector. The local selector thereupon cuts in on the tenth level and hunts the calling trunk. Since all trunks save the trunk mentioned are now marked busy in one way or another, the local selector and the associated overflow switches if necessary, will be automatically stepped over their contacts until the calling trunk is found, when the absence of ground on the test circuit will cause the answering station to be switched through to this trunk.

When the answering station is switched through to the trunk, the trunk pulsing relay 1185 is operated over the conductors 80 and 81, by way of break contacts 1056 and 1057 and conductors 1004 and 1006, and causes the operation of the hold relays 1210, 1220 and 1230 which complete the connection with the trunk, and release ring up relay 1240, in the usual manner. Relay 1240 thereupon opens the circuit of signal relay 2010 which also restores after a slight delay, to stop the general signal. Relay 2010 at the same time, at make contacts 2015 stops the timing, and at make contacts 2011 releases the busying relays 2050 etc., to unbusy the other trunks.

Should two incoming calls come in over this group of trunks at the same time, or should a second call arrive any time before the first has been disposed of, the release of the first ring-up relay will not release the signal relay 2010, which is now held from the second trunk, and the bell 2093 will thus continue to ring. If another station now decides to answer, the second call will be found in the same manner as the first and will be switched through to the second answering station. In the case of simultaneous calls, the trunk having the first appearance in the switch banks will be found first. The answering station can of course transfer such calls to any other privileged station at will, through the incoming switch train, just as for any other trunk call.

In case a general signal is not answered within 60 seconds, the timing A relay 2040 will operate, from the ground at break contacts 2024. Relay 2040 thereupon at break contacts 2041 opens the original circuit to signal relay 2010 now held through its own springs 2013, and at make contacts 2041 closes a circuit for master relay 2030 as follows: ground from conductor 2007, break contacts 2032, make contacts 2041, break contacts 2026, make contacts 2014, and the winding of relay 2030 to battery.

Master relay 2030 now operates, and at preliminary make contacts 2033 locks itself up through make contacts 2014. Relay 2030 also, at make contacts 2031 prepares a second circuit for trip relay 2020, at break contacts 2032 opens a second point in the original circuit of relay 2010, at break-make contacts 2034 releases the timing A relay 2040 and energizes the timing B relay 2045 whose delay period is set for 5 seconds, and at break-make contacts 2035 opens the general signal circuit and closes the master signal circuit, which remains closed for 5 seconds. After 5 seconds the timing B relay 2045 operates and at make contacts 2046 closes the circuit of trip relay 2020, through make contacts 2012 and 2031 in parallel. Trip relay 2020 thereupon operates and at preliminary make contacts 2022 locks itself operated independently of contacts 2046. Relay 2020 also, at break contacts 2024 releases the timing B relay 2045, at break contacts 2023 opens the circuit of signal relay 2010 which is made slow to release, and at make contacts 2021 operates the release relays such as 2070 and 2080. The release relays thereupon remove locking ground from the terminals 1206 of all the trunks of the group, thereby releasing the ring-up relay 1240 in the calling trunk or trunks. Relay 2010 now restores after the usual slight delay, and at make contacts 2011 releases the busying relays. Relay 2010 also at make contacts 2012 opens a point in the circuit of the slow to release trip relay 2020 now held through make contacts 2031. Relay 2010 further, at make contacts 2014 opens the circuit of the slow to release master relay 2030. Relay 2030 thereupon releases after a slight delay, and opens the circuit of the trip relay which also releases after an additional slight delay, and releases the release relays. If the calling station has hung up in the meanwhile, the equipment will remain at normal, but if the calling party is still on the trunk, ring-up relay 1240 will again operate, since the ring has not been cut off, and the foregoing cycle will be repeated until someone answers, or the calling party abandons the call, or is otherwise disconnected.

To direct all incoming calls for this group of trunks to the special station previously mentioned, the person at this station has only to close the key 2091 provided at this point for this purpose. The local signal relay 2025 thereupon operates and at break-make contacts 2026 disconnects the master relay 2030 and prepares a new circuit for the trip relay 2020. Relay 2025 also at break make contacts 2027 disconnects the general and master signals 2093 and 2094 and prepares a circuit for the local signal 2092 at the special station.

Now, when a trunk call for this group of trunks is received, signal relay 2010 operates and closes the circuit of local signal 2092. Relay 2010 also at make contacts 2015 starts the timing cycle, at make contacts 2013 closes its locking circuit, at make contacts 2012 closes another point in the circuit of trip relay 2020, and at make contacts 2011 operates the busying relays. The special station, on hearing the local signal, answers by removing his or her receiver and dialling the trunk calling digit "0" through the local switch train, as just described, and when the calling trunk is found, relay 2010 is released as before to stop the signal and restore the busying relays. The special station then transfers the call as required.

Should the special station fail to answer a call within a minute after the signal is operated, timing relay 2040 will operate as before and will close a circuit to trip relay 2020, from ground on conductor 2007, by way of break contacts 2032, make contacts 2041, 2026 and 2012. Trip relay 2020 now operates and locks through make contacts 2012 to ground at its own preliminary make contacts 2022, and at make contacts 2021 operates the release relays as before to unlock the calling trunk's ring up relay as before. Relay 2020 at the same time releases the timing relay and opens the circuit of signal relay 2010 which also restores after a short delay and releases the trip relay. If the calling party is still on the trunk the ring up relay re-operates, and the cycle repeats as before.

The description of the invention having been completed, what is considered new and is desired to have protected by Letters Patent is set forth in the following claims.

What is claimed is:

1. In a telephone system, local lines and trunk lines, two line conductors leading to each of said local lines, a repeater for each of said trunk lines, a local switch train for extending calls from said local lines, an incoming switch train, an operator's position for receiving incoming calls from any one of said trunk lines and the associated repeater for extension to a called one of said local lines, two line conductors leading to said operator's position, means for controlling said associated repeater over said operator's two line conductors to extend such incoming call to said called one of said local lines, the connection between the trunk line and the called local line being completed automatically when the called line answers, means for controlling said repeater over said called line's two line conductors to disconnect said called line from said trunk and connect said called line to a different local line, means for further controlling said repeater over said called line's two line conductors to disconnect said different line and re-connect said called line to said trunk line, and means for controlling said repeater over said different line's two line conductors to disconnect said called line and connect said different line to said trunk line, all of the foregoing connections being made over said incoming switch train, independently of said local switch train.

2. In a telephone system, local lines each having only two line conductors, a trunk line and a repeater therefor, a local switch train and an incoming switch train, means for extending a call from a calling local line to said trunk line through said local switch train and said repeater, a first and a second path through said repeater to said incoming switch train, means for controlling said repeater over said calling line conductors to connect said calling line to another local line through said repeater and said first path to the incoming switch train, means for there controlling said repeater over the line conductors of said other line to connect said other line to said trunk line, means for further controlling said repeater over the line conductors of said other line to connect said other line to a different local line through said repeater and said second path to said incoming switch train, means for there controlling said repeater from said different line to connect said different line to said trunk line, and means for making further transfers of said trunk line from one local line to another in the last stated manner, by using said two repeater paths alternately.

3. In a telephone system, local lines each having two line conductors, a trunk line, a trunk repeater, a first and a second finder switch in said repeater and incoming switch train including impulse responsive switches accessible to said finders, an attendant's position having two line conductors, means for signalling said attendant from said repeater on an incoming call over said trunk line, means for then controlling said repeater over said attendant's line conductors to connect said repeater to a wanted local line over said first finder and certain of said impulse responsive switches, and to signal said wanted line, means for connecting said wanted line to said trunk line through said first finder in response to said wanted line answering, means for controlling said repeater over said wanted line's line conductors to connect said wanted line to another local line through said second finder and others of said impulse responsive switches, means for further controlling said repeater over said other line's line conductors to connect said other line to said trunk line through said second finder, and means for further connecting said trunk line to others of said local lines over said incoming switch train by employing said two finders alternately for making the successive connections.

4. In a telephone system as in claim 3 means responsive to each of said successive connections over either of said finders for advancing the other finder and releasing the portion of the switch train associated therewith in the previous connection.

5. In a telephone system, local lines and trunk lines, a trunk repeater for each said trunk line, an impulsing relay in each said repeater, a control relay in series with said impulsing relay, an incoming switch train, an operator's position having two line conductors, a ring-up relay in each repeater for signalling said operator on incoming calls over one of said trunk lines, operator controlled means for operating the impulsing relay in the associated repeater over said two line conductors to cause said conductors to be extended to said one trunk line, means for operating said control relay over said two line conductors without affecting said impulsing relay to cause said repeater to seize said incoming switch train, means for then pulsing said impulsing relay over said two line conductors without affecting said control relay to cause said incoming switch train to select and signal the wanted local line, means for automatically connecting said wanted local line to said trunk line in response to said line answering, and automatic means for signalling the operator when the local line answers, in cases where said operator has retired from the connection before said local line has answered.

6. In a telephone system as in claim 5, two line conductors leading to the called local line, and means for operating the control relay in the repeater from said local line over said two line conductors to cause said repeater to re-signal the operator.

7. In a telephone system as in claim 5, two line conductors for said wanted local line, and means for re-operating the control relay in the repeater over said line's two line conductors without affecting said pulsing relay, to cause said repeater to re-operate said ring-up relay.

8. In a telephone system as in claim 5, a release relay in said repeater, and means for operating said release relay from said operator's position to release said incoming switch train without releasing said trunk line, thereby to permit said operator to establish a different inward connection for said trunk line, over said incoming switch train.

9. In a telephone system, privileged and restricted local lines, a trunk line and an associated repeater, a control relay and a pulsing relay in said repeater, an operator's position having two line conductors, an incoming switch train including a connector switch for establishing connections from said trunk line to wanted ones of said local lines, a restrict relay in said connector, line marking means for operating said restrict relay only when said connector has selected a privileged local line, signals at said operator's position operated in response to an incoming call over said trunk line, operator controlled means for completing a talking connection over said operator's line conductors to said trunk line through said repeater, means for operating said control relay over said line conductors to cause the seizure of said incoming switch train, means for operating said pulsing relay over said line conductors to cause said incoming switch train to select and signal any one of said local lines, and means for completing a talking connection between said selected local line and said trunk line when said selected line answers, only in case said restrict relay is operated.

10. In a telephone system, privileged and restricted local lines, a trunk line and an associated trunk repeater, a control relay and a pulsing relay in said repeater connected in series, an incoming switch train for setting up connections from said trunk line to said local lines, an operator's position, signals at said operator's position for automatically indicating an incoming call over said trunk line, means for operating said pulsing relay from said operator's position without operating said control relay to establish a talking connection between said operator and said trunk line, means for operating said control relay momentarily from said operator's position without releasing said pulsing relay to cause said repeater to open said talking connection and seize said incoming switch train, means for pulsing said pulsing relay from said operator's position without operating said control relay to cause said switch train to select and signal any one of said local lines, means to connect said selected local line to said trunk line when said selected line answers only when such selected line is a privileged line, and means to give a special warning signal to said operator when such selected line is a restricted line.

11. In a telephone system as in claim 10, means for giving an audible warning signal to the operator in the case of an attempted passage of a trunk call to a restricted station if the operator remains on the connection, means for giving a visual warning signal to the operator if the operator retires from the connection before the restricted line answers, and means for disconnecting the restricted line in either case when the operator retires from the connection.

12. In a telephone system, privileged and restricted local lines, trunk lines, a local switch train for extending outgoing calls from any of said privileged local lines to any of said trunk lines, an incoming switch train for extending incoming calls from any of said trunk lines to any of said privileged lines, means for transferring any of said outgoing and incoming trunk calls from any of said privileged stations to any other of said privileged stations over said incoming switch train, and means responsive to a privileged station calling a restricted station over said incoming switch train for giving a special warning signal to such privileged station.

13. In a telephone system, privileged and restricted local lines, trunk lines, impulse responsive switches for extending outgoing and incoming calls from said privileged lines to said trunk lines and from said trunk lines to said privileged lines, means controlled over said privileged lines for transferring said incoming and outgoing calls from one privileged line only to another privileged line, and automatic means for connecting a special tone signal to a privileged line attempting to transfer such a call to one of said restricted lines.

14. In a telephone system, privileged and restricted local lines each having only two line conductors, trunk lines, a switch train for extending incoming calls from any of said trunk lines to any of said privileged lines, means controlled over the line conductors of said privileged lines for transferring any of said incoming calls from any of said privileged lines to any other of said privileged lines over said switch train, a ring-back tone circuit and a busy tone circuit for said switch train, and automatic means for impressing busy tone superimposed on ring-back tone from said tone circuits on any privileged line attempting to transfer such trunk call to one of said restricted lines.

15. In a telephone system, local lines and trunk lines, a key and a dial and two line conductors for each said local line and a repeater for each said trunk line, a control relay and a pulsing relay connected in series in each said repeater, a local switch train for extending outgoing trunk calls from a calling local line to one of said trunk lines through the corresponding repeater, an incoming switch train, an operator's position for intercepting incoming trunk calls and extending them through said repeaters and said incoming switch train to a called local line, a key and a dial and two line conductors for said operator's position, means for connecting such a calling local line to a different local line over said local and incoming switch trains while holding the trunk line involved, means for connecting such a called line to a different local line over said incoming switch train while holding the trunk line involved, means for operating the control relays in the respective repeaters from the said keys at said operator's position and at said calling and called lines over the respective line conductors thereof to cause said respective repeaters to seize said incoming switch train, and means for then pulsing the pulsing relays in the respective repeaters from the said dials over the same line conductors for causing said incoming switch train to select and signal such called local line or such different local lines.

16. In a telephone system, local lines and trunk lines, a key and a dial and two line conductors for each said local line and a repeater for each said trunk line, a control relay and a pulsing relay connected in series in each said repeater, a first and a second incoming connector, a control relay and a pulsing relay connected in series in each said connector, means for operating said first connector's pulsing relay from one of said repeaters for extending an incoming call from one of said trunk lines to a called local line, means for completing the connection between said one trunk line and said called line, means for operating said one repeater's control relay from said called line's key over said line's line conductors to cause said repeater to seize said second connector, means for then pulsing said one repeater's pulsing relay from said called line's dial over said line's conductors to control said second connector's pulsing relay and thereby connect said called local line to a different local line, and means for operating said second connector's control relay from said different line's key over said different line's conductors to cause said second connector and said one repeater to connect said different line to said one trunk line.

17. In a telephone system, local lines and truck lines, two line conductors for each said local line and a repeater for each said trunk line, a control relay and a pulsing relay in each said repeater, an incoming switch train, two finders in each said repeater for giving access to said switch train, means for connecting any one of said trunk lines through the associated repeater and one of the two finders thereof and a portion of said switch train to a called one of said local lines, means for operating such repeater's control relay over said called line's two line conductors for causing said repeater to seize a different portion of said switch train over the other of said two finders, means for operating said repeater's pulsing relay over said called line's two line conductors to cause said called line to be connected through said other finder and said different portion of said switch train to a different local line for an information call, means for re-operating said repeater's control relay over said called line's two line conductors to cause said called line to be disconnected from said different line and re-connected to said trunk line, and means for making further such information calls in similar manner over said other finder to other different ones of said local lines.

18. In a telephone system as in claim 17, means for releasing said different portion of said switch train and advancing said other finder in response to said called line re-operating said repeater control relay to disconnect from an information call.

19. In a telephone system as in claim 17, means for causing said trunk line to be connected to any one of said different lines over said other finder, and means to permit such different line to make repeated information calls in like manner over said one finder.

20. In a telephone system, a local line, a trunk line and an associated repeater means for seizing said repeater over said trunk, a night circuit inserted between said local line and said repeater, manual means for activating said night circuit, a signal relay in said night circuit operated responsive to seizure of said repeater on all incoming calls over the associated trunk while said night circuit is activated, means responsive to the operation of said signal relay for impressing ringing current said local line from said night circuit if said local line is idle, means responsive to the operation of said signal relay for impressing a tone signal on said local line from said night circuit if said local line is busy, and means reponsive to said local line answering for completing a talking connection between said local line and said trunk line through said night circuit and said repeater.

21. In a telephone system, a local line, a trunk line and an associated trunk repeater, a night circuit inserted between said local line and said repeater, a ring-up relay in said repeater operated by incoming calls over said trunk line, means for activating said night circuit, a signal relay in said night circuit operated responsive to the operation of said ring-up relay only if said night circuit is activated, means responsive to the operation of said signal relay for signalling said local line both if idle and if busy, and timing means for automatically releasing said ring-up relay and said night circuit if said local line does not answer within a given time interval.

22. In a telephone system, local lines and trunk lines, a trunk repeater for each said trunk line, two line conductors for each said local line; a night circuit including a trunk finder, a finder circuit and a night operator's telephone, and two line conductors to said telephone; a control relay and a pulsing relay in series in said finder circuit, a call relay in said finder circuit operated from any calling one of said repeaters in response to an incoming call over the associated trunk line whenever said night circuit is in service for signalling said operator, means for connecting said operator's telephone to said finder circuit over said two line conductors, thereby to operate said pulsing relay to prepare the operation of said finder and return dial tone to said operator, means for then operating said control relay over said line conductors to start the finder switch, means responsive to said finder's finding the calling repeater for stopping said finder switch, disconnecting said control and pulsing relays and extending said operator's telephone to said repeater, means in said repeater responsive to such extension for completing a talking connection between said operator and the calling trunk line, means for controlling said repeater over said operator's two line conductors to cause said operator's telephone to be connected to a wanted one of said local lines, and means for controlling said repeater over said wanted line's two line conductors for establishing a talking connection between said wanted line and said calling trunk line.

23. In a telephone system as in claim 22, a home position for said finder switch and a relay in said trunk repeater, and means for operating said relay in response to the establishment of said talking connection between said wanted local line and said trunk line to release said night circuit and cause the finder switch thereof to return automatically to said home position.

24. In a telephone system as in claim 22, a plurality of said trunk finders and associated finder circuits included in said night circuit, means for connecting said operator's telephone to any one of said finder circuits for answering an incoming call over any one of said trunk lines, and means for holding a call on any one of said circuits while answering another call over a different one of said circuits.

25. In a telephone system, a plurality of trunk lines, a trunk repeater for each said trunk line, a night circuit including a finder switch, a finder circuit and a night operator's telephone, two line conductors leading to said telephone, a control relay and a pulsing relay in said finder circuit, means for operating said pulsing relay over said two line conductors without operating said control relay to seize said finder circuit for an outgoing call, means in said finder circuit responsive to said seizure for impressing dial tone on said line conductors, means for then operating said control relay momentarily over said conductors without releasing said pulsing relay to cause said finder switch to hunt for an idle one of said repeaters, a cut-through relay in said finder circuit operated in response to said finder switch finding an idle repeater, and means responsive to the operation of said cut-through relay for causing said night operator's telephone to be connected over said line conductors and through said found idle repeater to the trunk line associated with such repeater.

26. In a telephone system as in claim 25, a trunk call signal, and means responsive to the receipt of an incoming call on any of said trunk lines while said finder switch is hunting an idle repeater for an outgoing call for operating said signal and for causing said finder switch to abandon said outgoing call and find said incoming call.

27. In a telephone system, a plurality of trunk lines, a trunk repeater for each of said trunk lines, a trunk finder, a finder circuit, and a night operator's telephone, two line conductors for said telephone, a control relay and a pulsing relay in said finder circuit, means for seizing said finder circuit for an outgoing trunk call by operating said pulsing relay over said line conductors, means responsive to such seizure for returning dial tone to said operator's telephone, means for pulsing said pulsing relay over said line conductors to cause said finder to make connection with any desired one of said repeaters, means for then operating said control relay over said line conductors to complete a test circuit, a cut-through relay in said finder circuit operated in response to the completion of said test circuit if said repeater is idle to extend said line conductors to said repeater, means responsive to such extension to complete a talking circuit from said operator's telephone through said idle repeater to the associated trunk line, and means for preventing the operation of said cut-through relay and returning busy tone to said operator's telephone if said repeater is busy.

28. In a telephone system, local lines and trunks, a local switch train for extending calls between said local lines, an incoming switch train for extending calls between said trunks and said local lines, a trunk finder, a night operator's position comprising a telephone, a ringer, a trunk signal, a local signal and an answer key, two line conductors for said telephone normally connected to said local switch train, means for operating said trunk signal in response to an incoming call over any of said trunks, means responsive to the operation of said answer key for disconnecting said line conductors from said local switch train and extending them to said trunk finder, means for then controlling said finder entirely over said two line conductors to cause said finder to extend said line conductors to the calling trunk, means for then controlling said trunk over said line conductors to extend the call to a wanted local station over said incoming switch train, means for operating said operator's ringer in response to a call from a local line to the operator if said answer key is normal, and means for operating said local signal in response to such call when said answer key is operated.

29. In a telephone system, local lines and trunk lines, a common call number for said trunk lines, an outgoing switch train for extending calls to said trunk lines, an incoming switch train for extending calls from said trunk lines, a night circuit associated with certain of said trunk lines, means for activating said night circuit, a signal relay in said night circuit operated in response to an incoming call over any of said certain trunk lines only when said night circuit is activated, a group signal operated in response to the operation of said signal relay, means responsive to an incoming call over any of said trunk lines for normally marking such trunk line busy to said outgoing switch train, and means responsive to the operation of said signal relay for removing such busy marking from said certain trunk line on which an incoming call is waiting and for making all unbusy trunk lines artificially busy to said switch train, to enable any of said local lines to answer said signal and make connection with said certain calling trunk line by dialling said common trunk call number over said local switch train, independently of said incoming switch train.

30. In a telephone system as in claim 29, means responsive to the completion of the connection between the answering local line and said certain calling trunk line for causing said certain calling trunk line to be again marked busy to the local switch train.

31. In a telephone system as in claim 29, means responsive to the completion of the connection between the answering local line and said certain calling trunk line for releasing said night circuit to stop said signal and remove the artificial busy condition from said unbusy trunk lines only in case no other incoming call is waiting on another of said certain trunk lines.

32. In a telephone system, local lines and trunk lines, a common call number for said trunk lines, a repeater for each said trunk line, a ring-up relay in each said repeater operated by incoming calls over the associated trunk line, a night circuit associated with said trunk lines, a signal relay in said night circuit operated in response to the operation of any of said ring-up relays whenever said night circuit is in service, a group signal, an outgoing switch train for making outgoing calls over said trunk lines, a circuit responsive to the operation of said signal relay for causing the operation of said group signal and for marking the calling trunk line idle and all unengaged trunk lines busy to thereby permit any one of said local lines to answer such incoming call by causing said outgoing switch train to find said calling trunk line in response to said one local line's dialling said common call number, a master signal, timing means operated responsive to operation of said signal relay in case no said local line so answers within a given time interval for operating said master signal, and means responsive to operation of said timing means for automatically disconnecting said master signal and releasing said night circuit after a further time interval.

33. In a telephone system, local lines and trunk lines, a common call number for said trunk lines, a ring-up relay for each said trunk line operated by incoming calls over the corresponding trunk line, a night circuit associated with said trunk lines, manual means for putting said night circuit in service, a group signal, an outgoing switch train for making outgoing calls over said trunk lines, means for seizing said night circuit in response to the operation of any of said ring-up relays by an incoming call only when said night circuit is in service, means responsive to such seizure for operating said group signal, for marking such calling trunk line idle, and for marking all unengaged trunk lines busy, thereby to enable any one of said local lines to answer such incoming call by causing said outgoing switch train to find said calling trunk line in response to said one line's dialling said trunk call number, means responsive to said switch train's finding said calling trunk line for releasing the associated ring-up relay, thereby to also release said night circuit provided no other of said ring-up relays is operated, and timing means operated in case no said local line answers within a given time interval, for releasing any such operated ring-up relays and said night circuit.

34. In a telephone system, local lines and trunk lines, said local lines including a group of lines privileged to make outgoing calls over said trunk lines, a local switch train including a linefinder and a two-motion selector, a trunk hunting level for said selector, a restrict relay in said selector, a control bank for said linefinder including a terminal for each said local line, a marking on certain of said finder terminals corresponding to said privileged lines, means for driving said selector to said trunk hunting level for an outgoing call, means to cause said restrict relay to be operated from said markings when said selector reaches said trunk hunting level only in case such call is from one of said privileged lines, and means to enable said selector to hunt on said trunk hunting level only in case said restrict relay is in an operated condition.

35. In a telephone system, local lines and trunk lines, said local lines including a first group of lines privileged to make outgoing trunk calls and a second group of lines privileged to receive incoming trunk calls, a local switch train including a linefinder and a two-motion selector for setting up such outgoing calls and an incoming switch train including a two-motion connector for setting up such incoming calls, a trunk hunting level and a restrict relay for said selector, a control bank for said finder including a contact for each of said local lines, a marking on certain of said contacts associated with said first group of privileged lines for causing said selector restrict relay to be operated from said markings when said selector reaches said trunk hunting level for an outgoing call, a restrict relay and a control bank for said incoming connector, said control bank also including a contact for each of said local lines, a marking on certain of said last named contacts for operating said connector restrict relay from said markings when said connector has selected one of said second group of privileged lines for an incoming call, and means to cause completion of said outgoing and incoming calls only in case said respective restrict relays are operated.

36. In a telephone system, local lines including a number of privileged lines, a group of trunk lines, a local switch train including a two-motion linefinder and a two-motion selector for extending local calls and outgoing trunk calls, local levels and a trunk hunting level for said selector, a vertical bank and a rotary hunting circuit for said selector, a restrict relay in said selector for preparing said hunting circuit, means for operating said restrict relay direct from said vertical bank on all local levels to enable said selector to hunt on a local call regardless of the classification of the calling line, a control bank for said linefinder having a contact for each of said local lines, a marking on certain of said bank contacts corresponding to said privileged lines, means for operating said restrict relay on said trunk hunting level only from said markings extended through said vertical bank, thereby to enable said selector to hunt for a trunk on said level for an outgoing call only in case such call is from one of said privileged lines.

37. In a telephone system, local lines including a small number of special lines privileged to cut-in on a busy connection, a switch train including a two-motion linefinder, a two motion selector and a two-motion connector for extending local calls, a line bank for said finder, said privileged lines being connected only to the first contact of their respective level in said line bank, a vertical bank in said finder and a vertical bank in said selector, a marking on certain of the contacts of said finder vertical bank corresponding to the levels to which said privileged lines are connected, cam springs for said finder for forwarding such markings to said selector only in case said finder has rotated but one step on a marked level, means for forwarding said forwarded markings through said selector vertical bank to said connector whenever said selector has switched through to said connector on a call from such a privileged line, a monitor relay in said connector, and means for operating said monitor relay from such extended marking in response to said privileged line dialling a suffix digit to complete a talking connection between said privileged line and a busy called line.

38. In a telephone system, local lines and trunk lines, said local lines including a first group of lines privileged to make direct toll calls and a second group of lines privileged to make trunk calls but not toll calls, a linefinder and a two-motion selector for extending such calls, a line bank and a first and a second vertical bank for said selector, a trunk hunting level in said line bank, a restrict relay in said selector, a control bank for said linefinder including a terminal for each of said local lines, a first potential marking on certain of said terminals corresponding to said first group of privileged lines, a second potential marking on others of said terminals corresponding to said second group of privileged lines, means for operating said selector restrict relay from any of said markings extended through said first vertical bank when said selector reaches said trunk hunting level on an outgoing call, means for enabling said selector to hunt for an idle trunk on said level only in case said restrict relay is operated, means responsive to said selector's finding an idle trunk for forwarding said markings to said trunk through said second vertical bank, and means in said trunk responsive to such extended markings to enable the calling line to make direct toll calls only when such extended marking is said first marking.

39. In a telephone system, a trunk line, subscriber lines, an individual outgoing terminal for each of said lines, an individual incoming terminal for each of said lines, a predetermined marking potential connected to the individual outgoing terminals of certain of said lines to enable such certain lines to originate outgoing trunk calls over said trunk line and said marking potential connected to the individual incoming terminals of said certain lines to enable such certain lines to answer incoming trunk calls over said trunk line, and means controlled by said lines for completing outgoing trunk calls over said trunk line only in case the calling line's individual outgoing terminal is marked with said marking potential and for completing incoming trunk calls over said trunk line only in case the answering line's individual incoming terminal is marked with said marking potential.

40. In a telephone system including switching appartus for completing local calls, for completing trunk calls, for completing toll calls, and for transferring calls, subscribers' lines each having an individual outgoing terminal and an individual incoming terminal for marking the class of service such lines are entitled to; a first group of said lines having a first predetermined marking on their individual outgoing terminals for enabling such lines to make outgoing local, trunk and toll calls and having a second predetermined marking on their individual incoming terminals for enabling such lines to receive incoming local, trunk and toll calls; a second group of said lines having said second predetermined marking on their individual outgoing terminals for enabling such lines to make outgoing local and trunk calls but not toll calls and having said second predetermined marking on their individual incoming terminals for enabling such lines to receive incoming local, trunk and toll calls; a third group of said lines having said second predetermined marking on only their individual incoming terminal for enabling such lines to make only outgoing local calls and to receive incoming local, trunk and toll calls; a fourth group of said lines having no markings on their individual incoming and outgoing terminals to restrict such lines to making and receiving only local calls; and means associated with the lines in said first, second and third groups for enabling such lines to transfer calls within said first three groups.

RUDOLPH FRANK STEHLIK.

REFERENCES CITED

The following references are of record in the file of this patent:

UNITED STATES PATENTS

| Number | Name | Date |
|---|---|---|
| 1,278,330 | Goodrum | Sept. 10, 1918 |
| 1,693,599 | Gillings | Dec. 4, 1928 |
| 1,925,681 | Uda | Sept. 5, 1933 |
| 2,087,930 | Voss | July 27, 1937 |